United States Patent
Inoue et al.

(10) Patent No.: US 6,937,300 B2
(45) Date of Patent: Aug. 30, 2005

(54) LIQUID CRYSTAL DISPLAY DEVICE AND METHOD OF FABRICATING THE SAME

(75) Inventors: Hiroyasu Inoue, Kawasaki (JP); Yuji Nakahata, Kawasaki (JP); Yoji Taniguchi, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 64 days.

(21) Appl. No.: 10/892,766

(22) Filed: Jul. 16, 2004

(65) Prior Publication Data

US 2004/0263719 A1 Dec. 30, 2004

Related U.S. Application Data

(60) Division of application No. 10/263,257, filed on Oct. 2, 2002, now Pat. No. 6,778,229, which is a continuation-in-part of application No. 10/107,989, filed on Mar. 27, 2002, now abandoned.

(30) Foreign Application Priority Data

Oct. 2, 2001 (JP) ........................................ 2001-306906
May 10, 2002 (JP) ........................................ 2002-136128

(51) Int. Cl.[7] ........................ G02F 1/1333; G02F 1/13; G02F 1/1343; G02F 1/1335

(52) U.S. Cl. ........................ 349/93; 349/187; 349/143; 349/99

(58) Field of Search ................................. 349/187, 143, 349/93, 178, 99

(56) References Cited

U.S. PATENT DOCUMENTS

| | | | | |
|---|---|---|---|---|
| 5,859,683 A | | 1/1999 | Tagusa et al. | 349/138 |
| 5,877,830 A | | 3/1999 | Shimada et al. | 349/110 |
| 5,929,960 A | * | 7/1999 | West et al. | 349/156 |
| 6,108,061 A | | 8/2000 | Sako et al. | |
| 6,396,077 B1 | | 5/2002 | Kubota et al. | |
| 6,628,362 B2 | | 9/2003 | Seo et al. | 349/141 |
| 6,657,686 B2 | | 12/2003 | Choi | |
| 6,657,695 B1 | * | 12/2003 | Song et al. | 349/143 |
| 6,771,344 B2 | * | 8/2004 | Lyu et al. | 349/143 |
| 6,778,244 B2 | * | 8/2004 | Song et al. | 349/129 |

FOREIGN PATENT DOCUMENTS

| | | |
|---|---|---|
| JP | 8-62606 | 3/1996 |
| JP | 11-95221 | 4/1999 |
| JP | 2001-91974 | 4/2001 |

* cited by examiner

*Primary Examiner*—Toan Ton
(74) *Attorney, Agent, or Firm*—Greer, Burns & Crain, Ltd.

(57) ABSTRACT

When radiating light onto a liquid crystal composition containing a photosensitive material, the alignment of liquid crystal molecules is adjusted by applying a voltage to the liquid crystal composition layer, to achieve substantially orderly alignment of the liquid crystal molecules, or the alignment of the liquid crystal molecules is made uniform by adjusting the structure of the liquid crystal display device, or any display defect is driven out of the display area. When radiating light to the liquid crystal composition containing the photosensitive material, the alignment of the liquid crystal molecules can be adjusted so as to achieve substantially orderly alignment of the liquid crystal molecules, and the liquid crystal display device can thus be driven stably.

1 Claim, 43 Drawing Sheets

☐ IS HIGH RESISTANCE CONNECTION USING
TFT OR THE LIKE

DC VOLTAGE IS APPLIED BETWEEN
▨ AND ▧

LIGHT RADIATION

LIQUID CRYSTAL DISPLAY DEVICE AND METHOD OF FABRICATING THE SAME

CROSS-REFERENCE TO RELATED APPLICATION

This application is a division of application Ser. No. 10/263,257 filed Oct. 2, 2002, now U.S. Pat. No. 6,778,229.

This application is a continuation-in-part of application Ser. No. 10/107,989, filed Mar. 27, 2002, now abandoned.

BACKGROUND OF THE INVENTION

1. Field of the Invention

The present invention relates to a liquid crystal display device to be used for television and other display apparatuses, to a method of fabricating the same and, more particularly, to a liquid crystal display device that uses a liquid crystal material containing a photosensitive material and a method of fabricating the same.

2. Description of the Related Art

A liquid crystal display device is a display device that comprises a liquid crystal sealed between two opposing substrates and that uses electrical stimulus for optical switching by exploiting the electro-optical anisotropy of a liquid crystal. Utilizing the refractive index anisotropy that the liquid crystal possesses, the brightness of the light transmitted by the liquid crystal panel is controlled by applying a voltage to the liquid crystal and thereby reorienting the axis of the refractive index anisotropy.

In such a liquid crystal display device, it is extremely important to control the alignment of liquid crystal molecules when no voltage is applied to the liquid crystal. If the initial alignment is not stable, when a voltage is applied to the liquid crystal, the liquid crystal molecules do not align in a predictable manner, resulting in an inability to control the refractive index. Various techniques have been developed to control the alignment of liquid crystal molecules, representative examples including a technique that controls the initially formed angle (pretilt angle) between the alignment film and the liquid crystal and a technique that controls the horizontal electric field formed between the bus line and the pixel electrode.

The same can be said of a display device that uses a liquid crystal material containing a photosensitive material; specifically, in a liquid crystal display mode in which the initial alignment is controlled by radiation of light in the presence of an applied voltage, the voltage application method during the radiation becomes important. The reason is that, if the magnitude of the applied voltage differs, a change will occur in the initially formed pretilt angle, resulting in a change in transmittance characteristics.

In connection with a first aspect of the invention, techniques called passive matrix driving and active matrix driving have usually been used to drive liquid crystals; nowadays, with an increasing demand for higher resolution, the active matrix display mode that uses thin-film transistors (TFTs) is the dominant liquid crystal display mode. In a liquid crystal display having such TFTs, when radiating light onto the liquid crystal while applying a voltage to it, it is usually practiced to expose the liquid crystal to light radiation while applying a TFT ON voltage to each gate bus line and a desired voltage to each data bus line, as shown in FIGS. 1 and 2.

However, when such a liquid crystal exposure method is employed, if there is a line defect due to a bus line break or short, as shown in FIG. 3, the liquid crystal will be exposed to light when the liquid crystal in the affected area cannot be driven, and a pretilt angle different from that in other areas will be formed in this defect area, resulting in the problem that the brightness in this area differs from the brightness in other areas.

Or, in the TFT channel ON state, a shift in the TFT threshold value can occur due to exposure to ultraviolet radiation, as shown in FIG. 4, resulting in the problem that the region where the TFTs can be driven stably shifts from the desired region.

On the other hand, in connection with a second aspect of the invention, displays using the TN mode have been the predominant type of active matrix liquid crystal display, but this type of display has had the shortcoming that the viewing angle is narrow. Nowadays, a technique called the MVA mode or a technique called the IPS mode is employed to achieve a wide viewing angle liquid crystal panel.

In the IPS mode, liquid crystal molecules are switched in the horizontal plane by using comb-shaped electrodes, but a strong backlight is required because the comb-shaped electrodes significantly reduce the numerical aperture. In the MVA mode, liquid crystal molecules are aligned vertically to the substrates, and the alignment of the liquid crystal molecules is controlled by the use of protrusions or slits formed in a transparent electrode (for example, an ITO electrode). The decrease in the effective numerical aperture due to the protrusions or slits used in MVA is not so large as that caused by the comb-electrodes in IPS, but compared with TN mode displays, the light transmittance of the liquid crystal panel is low, and it has not been possible to employ MVA for notebook computers that require low power consumption.

When fine slits are formed in the ITO electrode, the liquid crystal molecules tilt parallel to the fine slits, but in two different directions. If the fine slits are sufficiently long, liquid crystal molecules located farther from a structure such as a bank that defines the direction in which the liquid crystal molecules tilt are caused to tilt randomly in two directions upon application of a voltage. However, the liquid crystal molecules located at the boundary between the liquid crystal molecules caused to tilt in different directions, cannot tilt in either direction, resulting in the formation of a dark area such as that shown in FIG. 29. Further, in a structure where the liquid crystal molecules are caused to tilt in two different directions in order to improve viewing angle, if there are liquid crystal molecules that are caused to tilt in the opposite direction, as shown in FIG. 29, the viewing angle characteristics degrade.

In connection with a third aspect of the invention, in an LCD (MVA-LCD) in which an N-type liquid crystal is aligned vertically and in which, upon application of a voltage, the molecules of the liquid crystal are caused to tilt in a number of predefined directions by using alignment protrusions or electrode slits, the liquid crystal molecules are almost completely vertically aligned in the absence of an applied voltage, but are caused to tilt in the various predefined directions when a voltage is applied. The tilt directions of the liquid crystal molecules are controlled so that they always make an angle of 45° to the polarizer absorption axis, but the liquid crystal molecules as a continuum can tilt in a direction intermediate between them. Furthermore, areas where the tilt direction of the liquid crystal molecules is displaced from the predefined direction inevitably exist because of the effects of the horizontal electric field, etc. at the time of driving or irregularities in the structure. In normally black displays where the polarizers are arranged in a crossed Nicol configuration, this means that dark areas appear when the display is driven in the white display state, and the screen brightness thus decreases. To address this problem, in a liquid crystal display device constructed by sandwiching between two substrates a liquid crystal composition containing a photopolymerizable or thermally polymerizable component, there is employed a technique that polymerizes the polymerizable component while applying a voltage, thereby defining the direction in which the liquid crystal molecules tilt in the presence of an applied voltage.

With this technique, however, if the polymerization is insufficient, image sticking can occur. This is believed to occur because the rigidity of the polymerized polymer is insufficient and deformation occurs due to the realignment of the liquid crystal molecules at the time of voltage application. On the other hand, to sufficiently polymerize the polymer, the duration of light radiation must be increased, but in that case, takt time at the time of volume production becomes a problem.

In connection with a fourth aspect of the invention, conventional liquid crystal display devices predominantly use the TN mode in which horizontally aligned liquid crystal molecules are twisted between the top and bottom substrates, but gray-scale inversion occurs in the mid gray-scale range because the tilt angle of the liquid crystal differs depending on the viewing direction, that is, the viewing angle. To address this, a technique called the MVA mode has been proposed in which vertically aligned liquid crystal molecules are tilted symmetrically in opposite directions to compensate for the viewing angle. In this technique, alignment control members made of an insulating material are formed on electrodes to control the liquid crystal tilt directions. However, since the liquid crystal molecules tilt in 180° opposite directions on both sides of each alignment control member, a dark line is formed and transmittance decreases. To obtain sufficient transmittance, it is preferable to reduce the area occupied by the alignment control members by forming them spaced farther apart, but this would in turn slow the propagation speed of the tilt, resulting in a slow response speed.

To address this, a technique has been proposed in which a liquid crystal composition containing a polymerizable component is sandwiched between substrates and, while applying a voltage, the polymerizable component is polymerized, thereby defining the tilt direction of the liquid crystal molecules. This achieves a faster response speed while retaining the transmittance.

However, in the case of a liquid crystal display device in which the tilt direction of the liquid crystal molecules is defined by polymerizing the polymerizable component in the liquid crystal while applying a voltage, there arises the problem that display unevenness occurs after the polymerization of the polymerizable component, because of the separation of the liquid crystal and the polymerizable component which occurs when the liquid crystal material is injected at high speed at the initial stage of injection or when there is an abrupt change in speed near a frame edge.

In connection with a fifth aspect of the invention, in a liquid crystal display device, it has traditionally been practiced to control the alignment direction of the vertically aligned panel by a TFT substrate having slits in pixel electrodes and a color filter substrate having insulating protrusions, and it has therefore been necessary to form the dielectric protrusions on one of the substrates. Fabrication of such a liquid crystal display device therefore has involved the problem that the number of processing steps increases.

Furthermore, forming the protrusions within display pixels leads to the problem that the numerical aperture decreases, reducing the transmittance. In view of this, it has been proposed to control the alignment of the liquid crystal molecules by a polymerizable component added in the liquid crystal, in order to achieve multi-domains without using dielectric layer protrusions. That is, the liquid crystal to which the polymerizable component is added is injected into the panel and, while applying a voltage, the polymerizable component is polymerized, thereby controlling the alignment of the liquid crystal molecules.

However, if the polymer composition that defines the alignment direction does not have a sufficient cross-linked structure, the polymer becomes flexible, and its restoring force weakens. If the polymer has such properties, then, when a voltage is applied to the liquid crystal to cause the liquid crystal molecules to tilt, and the liquid crystal is still held in that state, the pretilt angle of the liquid crystal does not return to its initial state even after the applied voltage is removed. This means that the voltage-transmittance characteristic has changed, and this defect manifests itself as a pattern image sticking.

In connection with a sixth aspect of the invention, in an MVA-LCD in which liquid crystals having a negative dielectric anisotropy are vertically aligned, and in which the alignment of the liquid crystal in the presence of an applied voltage is controlled in a number of predefined directions, without using a rubbing treatment but by utilizing the banks or slits formed on the substrates, the LCD provides excellent viewing angle characteristics compared with conventional TN mode LCDs, but there is a disadvantage that white brightness is low and the display is therefore relatively dark. The major reason is that portions above the banks or slits correspond to the boundaries across which the liquid crystal alignment changes, and these portions appear optically dark, reducing the transmittance of white. To improve this, the spacing between the banks or slits should be made sufficiently wide, but in that case, as the number of banks or slits for controlling the liquid crystal alignment decreases, it takes time until the alignment stabilizes, thus slowing the response speed.

To obtain a brighter, faster response MVA panel by alleviating the above deficiency, it is effective to use a technique in which a liquid crystal composition containing a polymerizable component is sandwiched between substrates and, while applying a voltage, the polymerizable component is polymerized, thereby defining the tilt direction of the liquid crystal molecules. For the polymerizable component, a monomer material that polymerizes by ultraviolet radiation or heat is usually used. It has, however, been found that this method has a number of problems associated with display unevenness.

That is, as this method is a rubbing-less method, if there occurs even a slight change in the structure or in electric lines of force, the liquid crystal molecules may not align in the desired direction. As a result, there are cases where a contact hole or the like formed outside the display area disrupts the alignment of the liquid crystal molecules and the disruption affects the alignment of the liquid crystal molecules within the display area, resulting in the formation of an abnormal domain and causing the alignment to be held in that state. Furthermore, if structures that cause such disruptions in liquid crystal molecular alignment are located in the same alignment sub-region, abnormal domains formed from the respective structures are concatenated, forming a larger abnormal domain. This causes the liquid crystal molecules outside and inside the display area to be aligned in directions other than the desired directions, and the polymerizable component is polymerized in that state, resulting in such problems as reduced brightness, slower response speed, and display unevenness. FIG. 44 is a plan view showing a pixel in the prior art. In the pixel shown here, contact holes that cause variations in cell thickness are not located at liquid crystal domain boundaries, and two contact holes are located within the same alignment sub-region. As a result, an abnormal domain is formed in such a manner as to connect the two contact holes and, with the alignment held in this state, the polymerizable component is polymerized, resulting in display performance degradations such as reduced brightness, slower response speed, and display unevenness.

Further, when a metal electrode such as a source electrode or a Cs intermediate electrode is extended into the display pixel, there occurs the problem of reduced numerical aperture, and hence, reduced brightness. Moreover, if an electrode with the same potential as the pixel electrode is extended into the display pixel, this also causes reduced brightness, slower response speed, and display unevenness.

In connection with a seventh aspect of the invention, while conducting studies on the technique in which a liquid crystal composition containing a polymerizable component is sandwiched between substrates and, while applying a voltage, the polymerizable component is polymerized, thereby defining the tilt direction of the liquid crystal molecules, the inventor et al. encountered the problem that when the same pattern was displayed for a certain length of time, image sticking occurred in the portion where the pattern was displayed. This is believed to occur because the polymerization is insufficient and the polymer deforms. On the other hand, to sufficiently polymerize the polymer, the duration of light radiation or heating must be increased, but in that case, tact time at the time of volume production becomes a problem.

BRIEF SUMMARY OF THE INVENTION

The present invention aims to solve the above-enumerated problems of the prior art and to provide a method of fabricating a liquid crystal display device which, during fabrication of the liquid crystal display device, controls the alignment of liquid crystal molecules when radiating light onto a liquid crystal composition containing a photosensitive material, and thereby achieves substantially uniform alignment of the liquid crystal molecules and ensures stable operation. The invention also aims to provide such a liquid crystal display device.

To solve the above-enumerated problems, the first aspect of the invention provides methods based on the following three major concepts.

1. Avoid the effects of wiring defects by driving the liquid crystal by applying an AC voltage and using an electrical capacitance.

2. Avoid the effects of wiring defects by holding the wiring lines and electrodes on the second substrate at the same potential.

3. Avoid the effects of wiring defects while screening TFT channel portions from light.

More specifically, based on the first concept, the first aspect of the invention provides (1) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween; and radiating light to the liquid crystal layer while applying an AC voltage between the common electrode and the pixel electrode by applying AC voltages to the common electrode and the Cs bus line.

Based on the second concept, the invention provides (2) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween;

insulating the common electrode from the three bus lines, or connecting the common electrode to the three bus lines via high resistance; and radiating light to the liquid crystal layer while applying a DC voltage between the common electrode and the pixel electrode by applying a DC voltage between the common electrode and the three bus lines (the gate bus line, the data bus line, and the Cs bus line) formed on the second substrate, or (3) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, a Cs bus line that forms an electrical capacitance to the pixel electrode, and a repair line intersecting with at least one of the data bus and gate bus lines;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween; and radiating light to the liquid crystal layer while applying a DC voltage between the common electrode and the pixel electrode by applying a DC voltage between the common electrode and the four bus lines (the gate bus line, the data bus line, the Cs bus line, and the repair line) formed on the second substrate, or (4) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween; and connecting the common electrode, via high resistances, to the three bus lines (the gate bus line, the data bus line, and the Cs bus line,) formed on the second substrate, and radiating light to the liquid crystal layer while applying a DC voltage between the common electrode and the pixel electrode by applying a DC voltage between the common electrode and at least one of the bus lines.

Based on the third concept, the invention provides (5) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a CF resin or a light blocking pattern on a channel portion of the thin-film transistor;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween;

electrically connecting adjacent data bus lines at both ends thereof; and radiating light to the liquid crystal layer while applying an AC voltage between the common electrode and the pixel electrode by applying a transistor ON voltage to the gate bus line and an AC voltage between the common electrode and the data bus line, or (6) a method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, a Cs bus line that forms an electrical capacitance to the pixel electrode, and a repair line intersecting with the data bus line;

forming a CF resin or a light blocking pattern on a channel portion of the thin-film transistor;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween;

connecting at least one data bus line with at least one repair line by laser radiation or another method; and radiating light to the liquid crystal layer while applying an AC voltage between the common electrode and the pixel electrode by applying a transistor ON voltage to the gate bus line and an AC voltage between the common electrode and the data bus line and repair line (the repair line is at the same potential as the data bus line).

In the second aspect of the invention, there is provided (7) a method of fabricating a vertical alignment liquid crystal display device, comprising:

forming a liquid crystal layer by filling a liquid crystal composition into a gap between two substrates each having a transparent electrode and an alignment control film for causing liquid crystal molecules to align vertically, the liquid crystal composition having a negative dielectric anisotropy and containing a polymerizable monomer; and polymerizing the monomer while applying a voltage between opposing transparent electrodes, and thereby providing a pretilt angle to the liquid crystal molecules, and wherein:

before polymerizing the monomer, a constant voltage not smaller than a threshold voltage but not greater than a saturation voltage is applied between the opposing transparent electrodes for a predetermined period of time, and thereafter, the voltage is changed to a prescribed voltage and, while maintaining the prescribed voltage, ultraviolet radiation or heat is applied to the liquid crystal composition to polymerize the monomer.

That is, when polymerizing the polymerizable monomer, a voltage slightly higher than the threshold voltage is applied and, after the liquid crystal molecules are tilted in the right direction, the voltage is raised to a higher level; then, while maintaining the voltage at the higher level, the polymerizable monomer is polymerized.

In the third aspect of the invention, there is provided (8) a method of fabricating a liquid crystal display device, comprising:

forming a liquid crystal layer by filling a liquid crystal composition containing a polymerizable monomer into a gap between two substrates each having a transparent electrode; and polymerizing the monomer while applying a voltage between opposing transparent electrodes, and thereby providing a pretilt angle to liquid crystal molecules while, at the same time, controlling the direction in which the liquid crystal molecules tilt in the presence of an applied voltage, and wherein:

light radiation for polymerizing the polymerizable monomer is performed in at least two steps.

In the fourth aspect of the invention, there is provided (9) a liquid crystal display device in which a liquid crystal composition containing a photopolymerizable or thermally polymerizable component is sandwiched between substrates and the polymerizable component is photopolymerized or thermally polymerized while applying a voltage, thereby defining the direction in which liquid crystal molecules tilt in the presence of an applied voltage, wherein a plurality of injection ports for injecting therethrough the liquid crystal composition containing the polymerizable component are formed in one side of the liquid crystal display device, and spacing between the respective injection ports is not larger than one-fifth of the length of the side in which the injection ports are formed, or

(10) a liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein a cell gap in a frame edge BM area is not larger than the cell gap of a display area, or

(11) a liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein a main seal or an auxiliary seal is formed in a frame edge BM area to eliminate a cell gap in the frame edge BM area, or

(12) a liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein an auxiliary seal is formed so that a material whose concentration of the polymerizable material relative to liquid crystal is abnormal is guided into a BM area.

In the fifth aspect of the invention, there is provided

(13) a method of fabricating a liquid crystal display device, comprising:

forming a common electrode and a color filter layer on a first substrate;

constructing a second substrate from an array substrate on which are formed a gate bus line layer, a gate insulating film layer, a drain bus line layer, a protective film layer, and a pixel electrode layer;

forming fine slits in the pixel electrode layer in such a direction that a pixel is divided by the slits into at least two sub-regions;

forming on each of the two substrates a vertical alignment film for vertically aligning liquid crystal molecules;

forming a liquid crystal layer by filling an n-type liquid crystal composition having a negative dielectric anisotropy into a gap between the two substrates, the liquid crystal composition containing an ultraviolet curable resin having a liquid crystal backbone;

radiating ultraviolet light while applying to the liquid crystal molecules a voltage not smaller than a threshold value of the liquid crystal molecules, thereby defining the direction in which the liquid crystal molecules tilt in the presence of an applied voltage; and arranging two polarizers on top and bottom surfaces of the liquid crystal display device in a crossed Nicol configuration with the absorption axes thereof oriented at an angle of 45 degrees to the alignment directions of the liquid crystal molecules.

In the sixth aspect of the invention, there is provided

(14) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein any portion where cell thickness varies by 10% or more due to design constraints is located at a liquid crystal domain boundary, or

(15) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a contact hole that connects between a source electrode and a pixel electrode is formed at a liquid crystal domain boundary, or

(16) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a contact hole that connects between a Cs intermediate electrode and a pixel electrode is formed at a liquid crystal domain boundary, or

(17) a liquid crystal display device in which a liquid crystal layer is sandwiched between a pair of substrates having electrodes, a pretilt angle of liquid crystal molecules and a tilt direction thereof in the presence of an applied voltage are controlled by using a polymer that polymerizes by heat or light radiation, and liquid crystal alignment is divided between two or more sub-regions, wherein more than one portion where cell thickness varies by 10% or more due to design constraints does not exist, or

(18) a liquid crystal display device in which a liquid crystal layer is sandwiched between a pair of substrates having electrodes, a pretilt angle of liquid crystal molecules and a tilt direction thereof in the presence of an applied voltage are controlled by using a polymer that polymerizes by heat or light radiation, and liquid crystal alignment is divided between two or more sub-regions, wherein more than one contact hole is not formed in the same sub-region, or

(19) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a pixel electrode, a source electrode, and a Cs intermediate electrode are connected by a single contact hole, or

(20) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a metal electrode is wired along a liquid crystal domain boundary within a display pixel, or

(21) a liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein an electrode having the same potential as a pixel electrode is not wired in a slit portion of the pixel electrode within a display pixel.

In the seventh aspect of the invention, there is provided a

(22) a method of fabricating a liquid crystal display device, comprising: forming a liquid crystal layer by filling a liquid crystal composition containing a polymerizable monomer into a gap between a pair of substrates having electrodes; and polymerizing the monomer by radiating ultraviolet light to the liquid crystal composition while applying a prescribed liquid crystal driving voltage between opposing electrodes, and wherein: after polymerizing the monomer, additional ultraviolet radiation is applied to the liquid crystal composition without applying the liquid crystal driving voltage or while applying a voltage of a magnitude that does not substantially drive the liquid crystal.

DETAILED DESCRIPTION OF THE INVENTION

The first aspect of the invention discloses the following methods as specific implementations thereof.

1) The method described in above item (1), wherein the common electrode and the Cs bus line are insulated from each other or connected via high resistance when radiating the light to the liquid crystal layer.

2) The method described in above item (1), wherein after radiating the light to the liquid crystal layer, the common electrode and the Cs bus line are electrically connected together.

3) The method described in above item (1), wherein a transistor OFF voltage is applied to the gate bus line.

4) The method described in above item (1), wherein initially the liquid crystal layer is vertically aligned and, by radiating the light while applying a voltage to the liquid crystal composition containing the photosensitive material, the average angle of the liquid crystal to an alignment film is set smaller than a polar angle of 90°.

5) The method described in above item (1), wherein the AC frequency, when applying the AC voltage, is set within a range of 1 to 1000 Hz.

6) The method described in above item (2), wherein adjacent gate bus lines or data bus lines are electrically connected together at both ends thereof.

7) The method described in above item (2), wherein after radiating the light to the liquid crystal layer, the common electrode and the Cs bus line are electrically connected together.

8) The method described in above item (2), wherein initially the liquid crystal layer is vertically aligned and, by radiating light while applying a voltage to the liquid crystal composition containing the photosensitive material, the average angle of the liquid crystal to the alignment film is set smaller than a polar angle of 90°.

Figure 5:
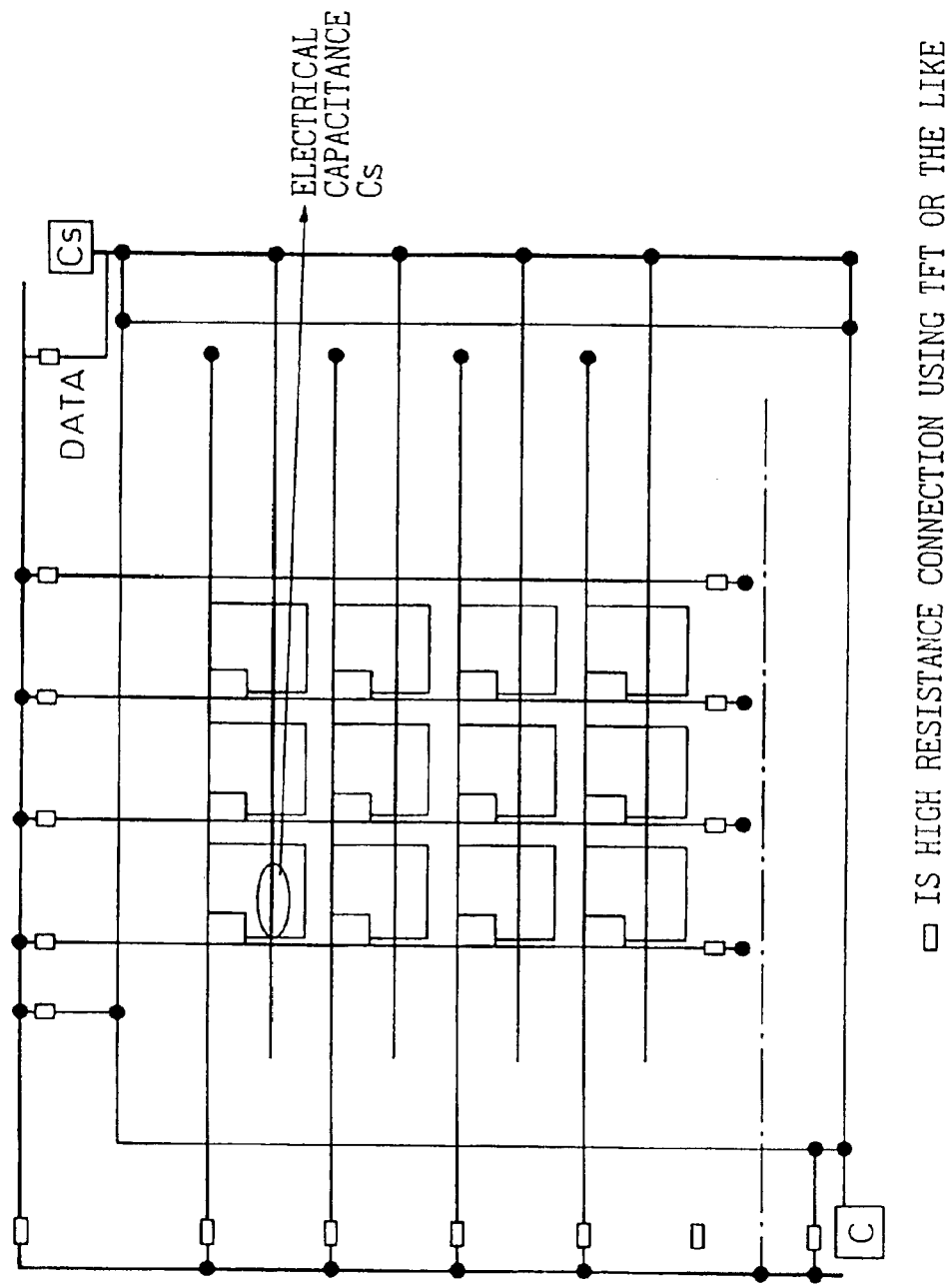
FIG. 5 is a schematic plan view showing one example of electrical coupling in a prior art TFT liquid crystal panel.

Usually, a TFT liquid crystal panel has electrical couplings such as shown in FIG. 5. At this time, the two electrodes, that is, the common electrode and the pixel electrode, form an electrical capacitance Clc by holding therebetween such materials as the liquid crystal and alignment film. The Cs bus line in the figure forms an electrical capacitance Cs between it and each pixel electrode, and controls the amount of voltage fluctuation and the amount of charge to be written to the pixel electrode.

Usually, the writing of a charge to the pixel electrode is done via a thin-film transistor (TFT), and to achieve this, the gate bus line that acts as a switch for writing and the data bus line used to write a voltage to the pixel electrode are arranged in a matrix form in such a manner as to sandwich the pixel electrode between them.

Figure 6:
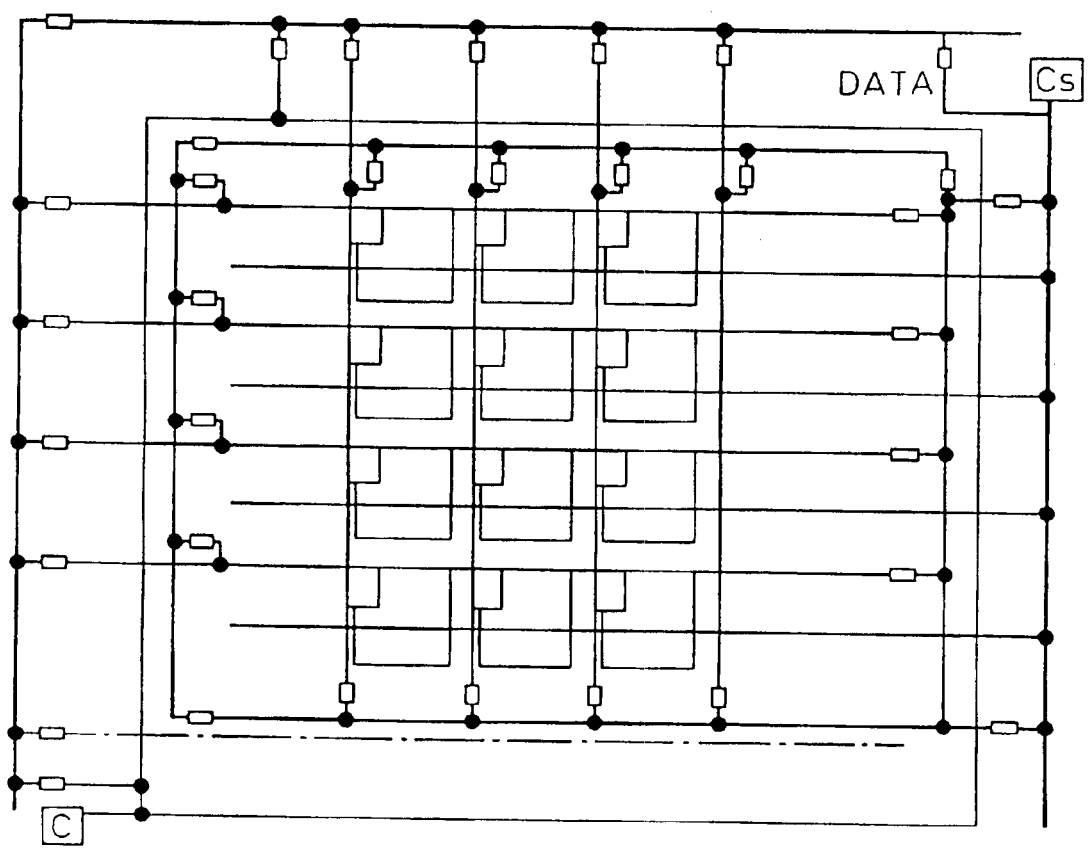
FIG. 6 is a schematic plan view showing another example of electrical coupling in a prior art TFT liquid crystal panel.

Fatal pattern defects (wiring defects) that can occur in the TFT liquid crystal panel include:

a. Gate bus line breakage
b. Data bus line breakage
c. Cs bus line breakage
d. Intra-layer short between gate bus line and Cs bus line
e. Interlayer short between gate bus line and data bus line
f. Interlayer short between Cs bus line and data bus line These defects decrease fabrication yields. To counter these defects, redundant design techniques are employed, and repairs are frequently done not only immediately after the formation of the pattern but also after the cell is completed by injecting the liquid crystal. Since the defects a, c, and d are defects introduced in the first layer formed on the substrate, rework is easy, and usually they are not defects that require reworking after the cell has been completed. In particular, for the defect c, since the Cs bus line is a common electrode, it is easy to form a redundant pattern, for example, by bundling the lines at both ends of the LCD panel, as shown in FIG. 6, and if the electrical conductivity of the film is higher than a certain value, this defect can be avoided. On the other hand, the defects b, e, and f are defects that often require reworking after the cell has been completed and, when radiating light to the liquid crystal, the liquid crystal cannot be driven normally by applying a write voltage via the data bus line.

In view of this, in the method of the invention based on the first concept, writing is performed by applying a voltage between the two common electrodes, rather than applying a write voltage to the liquid crystal via the data bus line. The above-described problem that arises when writing via the data bus line can then be ignored to some degree.

The reason is that, as the pixel electrode is treated as a floating layer, it is unaffected by such defects as b and e. This is because the application of an AC voltage between the common electrode and the Cs bus line results in the formation of a circuit that applies an AC voltage across a series coupling where pixel potential is approximately Cls and Cs, the applied voltage to the liquid crystal part being given by $$\text{Applied voltage to liquid crystal part} = Zlc/(Zlc+Zc) \times \text{AC voltage}$$

where Zlc and Zc are the respective impedances.

At this time, if the gate bus line voltage is floating, the TFT is substantially OFF, and avoidance of the threshold value shift, another object of the invention, is automatically achieved. In practice, it is also possible to actively apply an OFF voltage to the gate bus line; in this case, the electrical capacitance Cgc that the gate bus line and the common electrode form and the capacitance Cgs that the gate bus line and the pixel electrode form affect the value of the applied voltage to the liquid crystal part.

The method of the invention based on the second concept proposes to avoid the defects b, e, and f by applying a DC voltage and holding the wiring lines and electrodes on the second substrate at the same potential as specified in the present invention.

For the defects e and f, in theory, a condition in which the short is completely invisible can be achieved if voltages on the data bus line, the Cs bus line, and the gate bus line are all the same. Of course, this is intended to be achieved only during exposure to light. For example, when a DC voltage of 0 V is applied to the common electrode and a DC voltage of 5 V to the data bus line, the Cs bus line, and the gate bus line, it follows that 5 V is applied to the pixel electrode. That is, though the data bus line and the pixel electrode are connected via the TFT, the charge gradually flows into the pixel electrode which is thus charged up to 5 V after a sufficient time. This means that the condition of common electrode (0 V)—pixel electrode (5 V) is achieved, and the voltage can thus be applied to the liquid crystal. Since liquid crystals used for TFT displays usually have high resistance, movement of ions in the liquid crystal layer can virtually be neglected.

According to the above concept, means for avoiding the defect b can also be obtained. That is, usually an ESD circuit (Electrostatic Discharge circuit) is formed in a TFT panel for protection against electrostatic discharge, as shown in FIG. 6. This is equivalent to achieving a condition in which the respective bus lines are connected via high resistance. As in the case of FIG. 6, even when there is a break in a data bus line, if there is any voltage input path on the opposite side, the desire voltage for application can be obtained after a sufficient time even if the connection is made by high resistance.

The method of the invention based on the third concept is aimed at radiating light to the liquid crystal by avoiding a wiring defect while directly preventing UV radiation to TFT channel portions. In this case, normal driving is possible when applying a voltage to the liquid crystal. This method, however, proposes to apply a voltage to the bus line from both ends thereof in order to avoid the effects of a line defect. This makes it possible to avoid the effects of the defect b.

Figure 7:
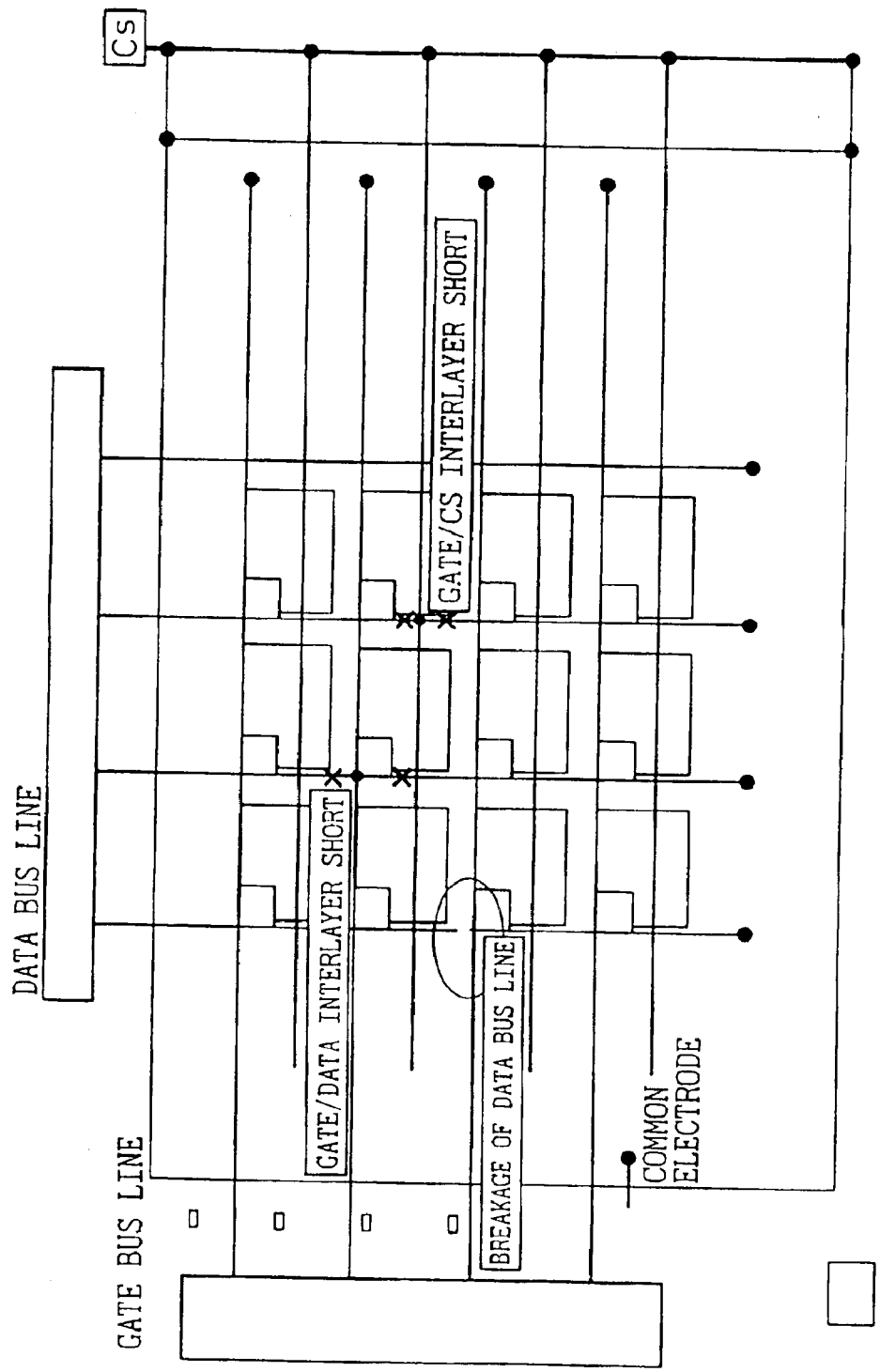
FIG. 7 is a schematic plan view for explaining one example of a fabrication method for a liquid crystal display device according to the present invention.

With advances in inspection techniques in recent years, it has become possible to detect defect coordinates with high accuracy before the cell is completed. If only defect coordinates can be confirmed, then a defect of type e or f can be converted to a defect of type b by the processing such as shown in FIG. 7. If this repair can be done before radiating light onto the liquid crystal, the effects of a line defect can be avoided by combining this technique with the method proposed here.

The method of the invention can also be applied to the following cases.

Figure 8:
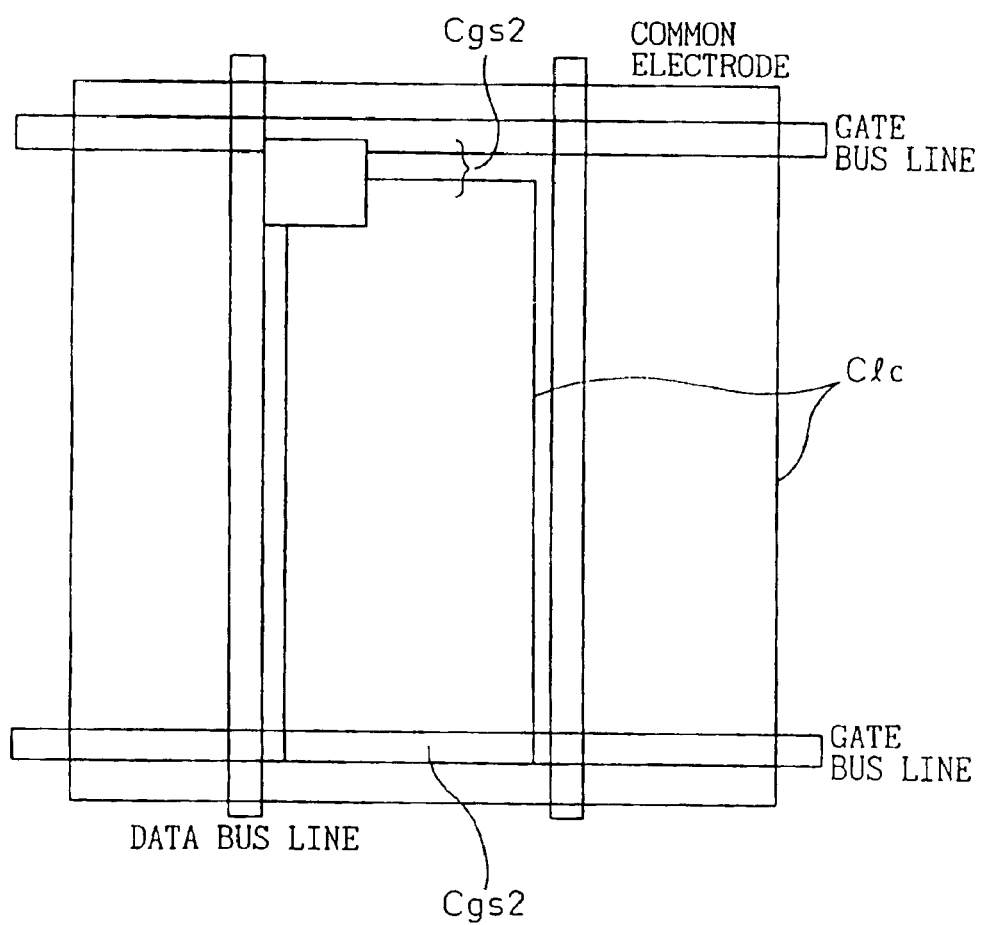
FIG. 8 is a schematic plan view for explaining one example of a fabrication method for a liquid crystal display device according to the present invention.

First, the method can be applied to the TFT design called the Cs-on-gate type, as shown in FIG. 8. Though the structure shown does not have Cs bus lines, the method of the invention based on the second or third concept can likewise be applied to this type of design. In the case of the method of the invention based on the first concept, when the capacitances formed by the pixel electrode and the respective gate bus lines are denoted by $Cgs1$ and $Cgs2$, it is expected that the applied voltage to the liquid crystal part is substantially determined by Applied voltage to the liquid crystal part=$Zlc/(Zlc+Zgs)$×AC voltage where $Zgs$ is the impedance.

Second, the method can be applied to the fabrication process of a liquid crystal display device in which a uniform DC voltage is applied to the liquid crystal during the fabrication thereof. For example, when determining the initial alignment of a ferroelectric liquid crystal, there are cases where it is required to apply a DC voltage uniformly over the entire surface; in such cases also, line defects may become a problem as in the case of the method of the present invention.

Third, the method can be applied to the case where the IPS mode is combined with a photosensitive material. In the case of IPS, the direction of the electric field formed at the time of exposure is assumed not only between the top and bottom substrates but also between the comb-shaped electrodes. Though the method of the invention assumes that the common electrode is formed on the first substrate, the method can also be applied to the case where a voltage is applied between the pixel electrode and the common electrode on the second substrate.

Figure 2:
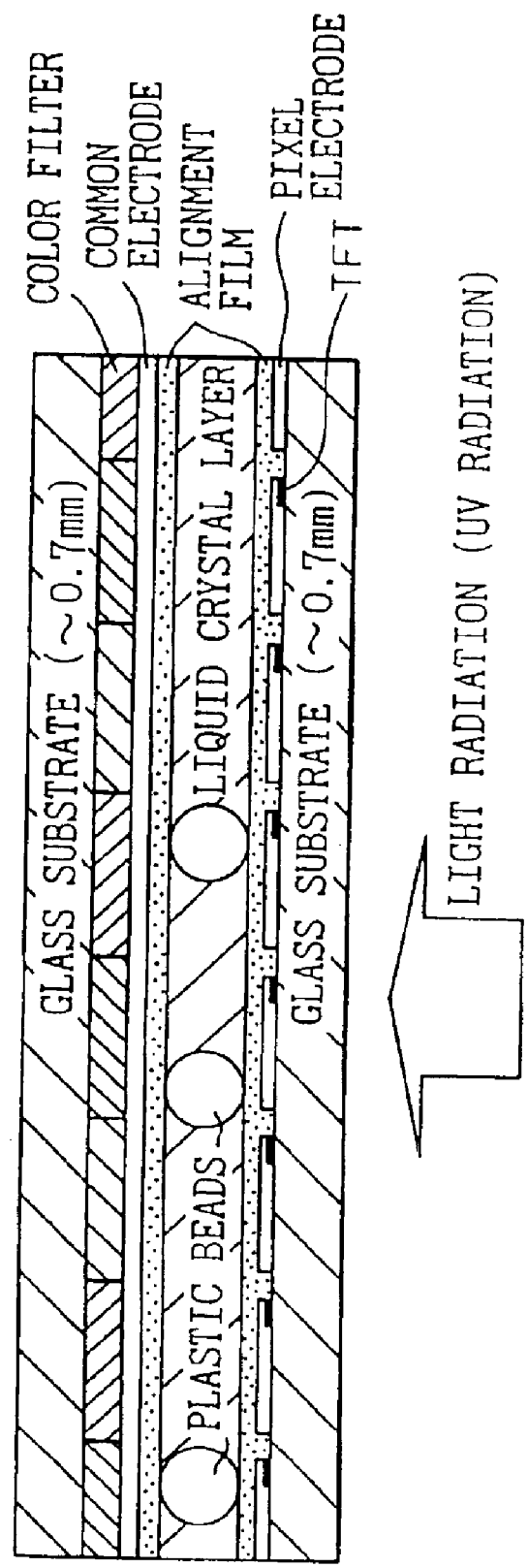
FIG. 2 is a schematic cross-sectional view of the liquid crystal display device of FIG. 1.
Figure 3:
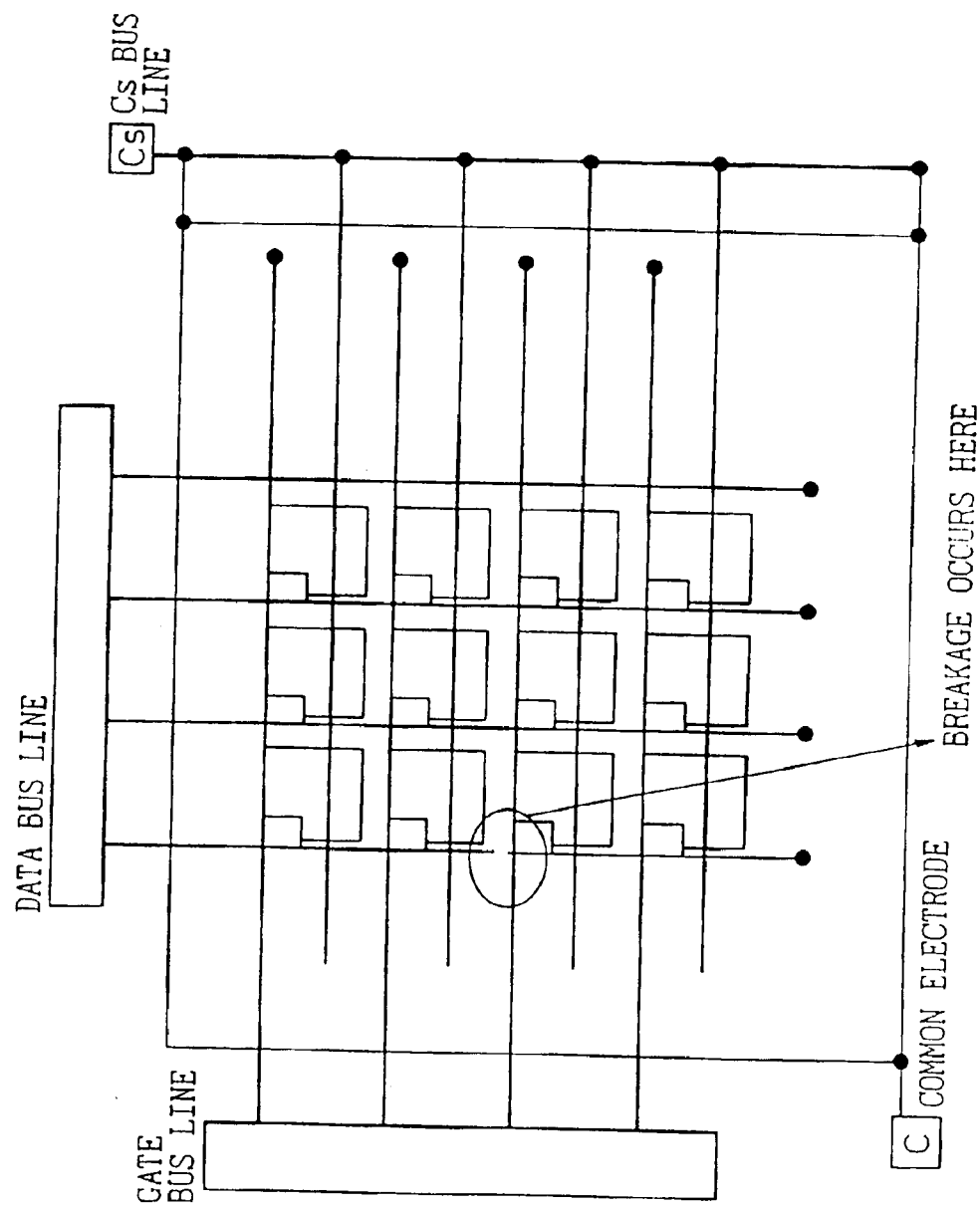
FIG. 3 is a schematic plan view showing one example of the liquid crystal display device fabricated according to the prior art.

In the liquid crystal display device fabricated according to the method of the present invention, generally, the spacing between the first and second substrates is maintained constant by means of a structure supporting them or by means of gap support members such as plastic beads as shown in FIG. 2, and the liquid crystal material held between the two substrates is sealed into the gap between them by fixing its periphery with an adhesive layer.

The second aspect of the invention discloses the following methods as specific implementations thereof.

1) The method described in above item (7) wherein, after a constant voltage not smaller than the threshold voltage but not greater than the threshold voltage+1 V is applied between the opposing transparent electrodes for a time not shorter than 10 seconds, the voltage is changed by applying a voltage not smaller than a voltage to be applied to produce a white display state and, while maintaining the voltage, the ultraviolet radiation or heat is applied to the liquid crystal composition to polymerize the monomer.

2) The method described in above item (7), wherein the transparent electrode on at least one of the substrates has a 0.5- to 5-micron fine slit structure.

3) The method described in above item (7), wherein the fine slit structure is formed from fine ITO slits formed in vertical direction.

4) The method described in above item (7), wherein the length of each of the fine ITO slits is approximately one half the vertical length of the pixel electrode.

5) The method described in above item (7), wherein the fine slit structure is formed from fine ITO slits formed in horizontal direction.

6) The method described in above item (7), wherein the length of each of the fine ITO slits is approximately equal to the horizontal length of the pixel electrode.

7) The method described in above item (7), wherein at least one of the substrates has 0.1- to 5-micron high protrusions protruding into the gap between the substrates.

Figure 30:
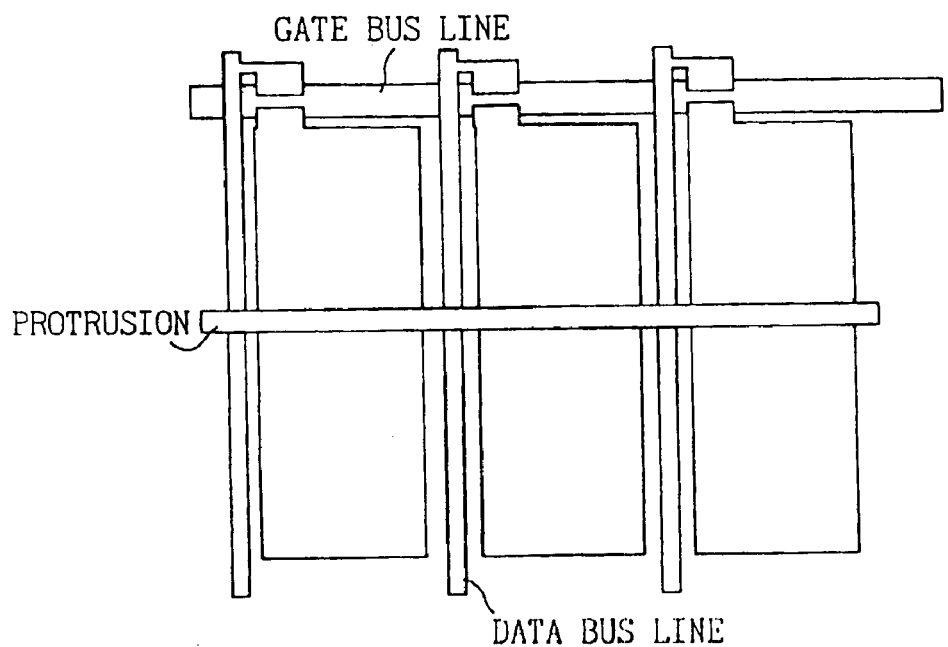
FIG. 30 is a schematic plan view for explaining a prior art example.
Figure 31:
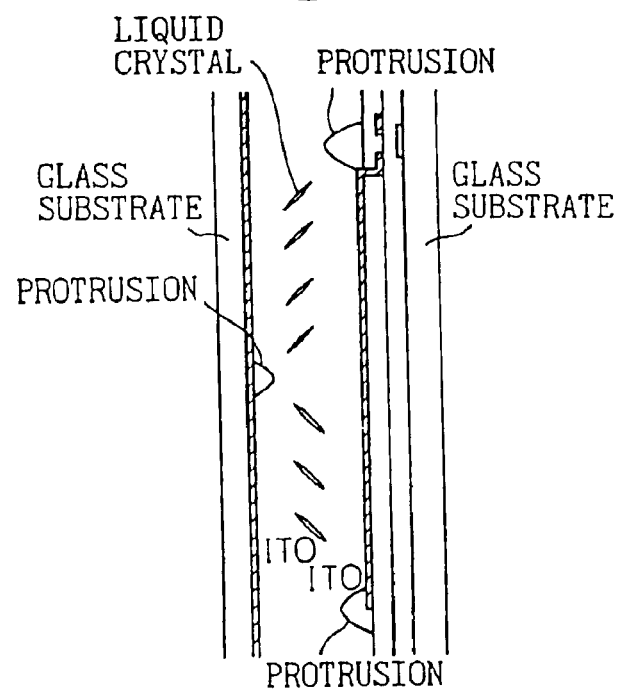
FIG. 31 is a schematic cross-sectional view showing the liquid crystal panel of FIG. 30.

In today's MVA, light transmittance is low because banks or ITO slits are arranged in complicated manner so that, to achieve a wider viewing angle, the liquid crystal molecules tilt in four different directions when a voltage is applied. To simplify this structure, a structure such as shown in FIGS. 30 and 31, in which the liquid crystal molecules tilt in two different directions when a voltage is applied, has been considered. In MVA, the direction in which the liquid crystal molecules tilt is sequentially defined by the electric field formed on the banks or ITO slits in the order of increasing distance from the banks or slits. If the spacing between the banks or ITO slits is very wide as shown in FIGS. 30 and 31, it takes time to propagate the molecular tilt throughout the liquid crystal, and this greatly slows the panel response when a voltage is applied.

In view of this, a technique has been employed in which a liquid crystal composition containing a polymerizable monomer is injected and, while applying a voltage, the monomer is polymerized, thereby fixing the direction in which the liquid crystal molecules tilt.

Figure 32:
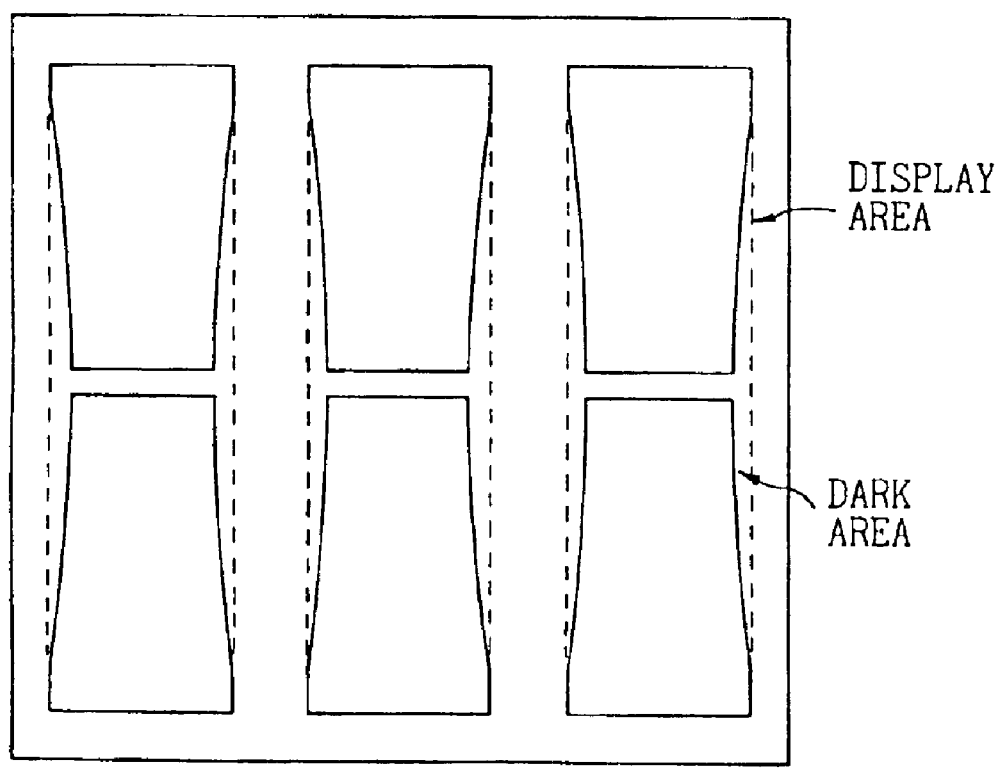
FIG. 32 is a schematic diagram for explaining a prior art example.

Another problem has been that since liquid crystal molecules are caused to tilt in a direction rotated 90° from the intended direction due to the electric field formed at a pixel electrode edge near the data bus line, a relatively large dark area is formed in the pixel, as illustrated in FIG. 32 which shows the pixel observed under a microscope. In view of this, fine slits are formed in the ITO pixel electrode on the TFT side substrate to control the molecular alignment by means of electric fields. When fine slits are formed in the ITO pixel electrode, the liquid crystal molecules tilt in parallel to the fine slits. Furthermore, since the alignment direction of all the liquid crystal molecules is determined by the electric fields, the effects of the electric field formed at the pixel edge can be minimized.

When a high voltage is applied abruptly, the liquid crystal molecules are caused to tilt wildly by electrostatic energy.

Those liquid crystal molecules that are tilted in the direction opposite to the direction in which they should have been tilted attempt to stand up and tilt in the right direction because the molecules in that state are unstable from the viewpoint of energy. It takes much elastic energy for them to stand up and tilt in the right direction because, in the process, they must overcome the electrostatic energy. If they cannot overcome the electrostatic force, the liquid crystal molecules tilted in the opposite direction will enter a metastable state and remain in that state. However, if a voltage slightly higher than the threshold is applied, the liquid crystal molecules tilted in the opposite direction can be caused to stand up and tilt in the right direction by overcoming the electrostatic energy with small elastic energy. Once the liquid crystal molecules are tilted in the right direction, they will not tilt in the opposite direction if the voltage is raised. Therefore, when the monomer is polymerized with the liquid crystal molecules tilted in the right direction, the state of alignment in the right direction is memorized, and when the voltage is applied next time, the liquid crystal molecules will not tilt in the opposite direction.

In view of this, after the alignment is set by applying a voltage slightly higher than the threshold voltage, if the voltage is raised to a prescribed level and, in this condition, the polymerizable monomer is polymerized, good molecular alignment can be achieved.

As for the fine ITO slits, if the slit width is too small, the slits may break, and conversely, if the slit width is made too large, the liquid crystal molecules may not tilt in the direction parallel to the slits. Further, if the fine ITO slits are made too close together, the risk of shorts between them increases, and conversely, if the slits are spaced too far apart, the liquid crystal molecules may not tilt in the direction parallel to the slits. It is therefore preferable that the fine slits and fine electrodes be each formed to have a width within a range of 0.5 microns to 5 microns.

The third aspect of the invention discloses the following methods as specific implementations thereof.

1) The method described in above item (8), wherein at least one of the plurality of light radiation steps is performed while applying a voltage to the liquid crystal layer.

2) The method described in above item (8), wherein the plurality of light radiation steps are performed without applying a voltage, either before or after or both before and after the light radiation that is performed in the presence of an applied voltage.

3) The method described in above item (8), wherein the plurality of light radiation steps are respectively performed with different light intensities.

4) The method described in above item (8), wherein the light radiation that is performed in the presence of an applied voltage is performed with a light intensity of 50 mW/cm$^2$ or higher.

5) The method described in above item (8), wherein the light radiation that is performed without applying a voltage is performed with a light intensity of 50 mW/cm$^2$ or lower.

6) The method described in above item (8), wherein the liquid crystal is an N-type liquid crystal, and the liquid crystal molecules are substantially vertically aligned in the absence of an applied voltage.

7) The method described in above item (8), wherein the liquid crystal display device is an active matrix LCD in which an array of TFTs as switching devices is formed on one of the two substrates.

8) The method described in above item (8), wherein the polymerizable monomer is a liquid crystalline or non-liquid-crystalline monomer, and is polymerized by ultraviolet radiation.

9) The method described in above item (8), wherein the polymerizable monomer is bifunctional acrylate or a mixture of bifunctional acrylate and monofunctional acrylate.

To prevent polymer image sticking, it is preferable that there be no residual monomers and all monomers be polymerized. It was experimentally found that if polymerization is performed with insufficient UV radiation or with strong UV radiation but for a short period, unreacted monomers will remain due to insufficient radiation time, and therefore that it is preferable to perform polymerization with low UV strength for a sufficient period of time. However, if the amount of radiation is increased enough that no unreacted monomers remain, then there arises the problem that the contrast decreases, but this problem occurs when the UV radiation is performed in the presence of an applied voltage. In view of this, in the present invention, the UV radiation for polymerization is performed in a plurality of steps. By performing the radiation steps, some in the presence of an applied voltage and others in the absence of an applied voltage, the residual monomer problem can be solved without excessively reducing the pretilt of liquid crystal molecules. It is also preferable to vary the UV radiation strength between the steps. For example, after performing the first radiation step with low UV strength, the second radiation is performed with high UV strength in the presence of an applied voltage, which is followed by the radiation performed with low UV strength. Since a plurality of panels can be processed together in the radiation step performed in the absence of an applied voltage, the increase in the radiation time in this step does not become a problem; this means that the radiation time in the step performed in the presence of an applied voltage, which is the rate-determining step, can be reduced by increasing the UV radiation strength.

In the method of the present invention, pretilt decreases during the UV radiation performed in the presence of an applied voltage, but no change occurs in the pretilt during the UV radiation performed in the absence of an applied voltage. Accordingly, the UV radiation process is divided into a plurality of steps, and the time of UV radiation is reduced when performing it in the presence of an applied voltage and increased when performing it in the absence of an applied voltage; by so doing, the pretilt angle is prevented from becoming too large, and the monomers can be completely polymerized, leaving no unreacted monomers. Alternatively, if preliminary radiation is performed to slightly promote the reaction of the monomers preparatory to the UV radiation performed in the presence of an applied voltage, unreacted residual monomers can be further reduced.

The effect of performing the UV radiation in intermittent fashion will be described below. In the case of a TFT-LCD, if UV is radiated from either the TFT side or the CF side, there remain unradiated portions because of the presence of light blocking portions. Unreacted monomers in these portions migrate into the display area as the time elapses, and eventually cause image sticking. However, when a time interval is provided between the radiation steps as described above, unreacted monomers are allowed to migrate into the display area during that interval, and are exposed to UV radiation, and eventually, almost all monomers hidden behind the light blocking portions are reacted, achieving an LCD substantially free from image sticking.

Thus, according to the present invention, a polymer-fixed MVA-LCD having high contrast and free from image sticking can be achieved, and besides, the time of the polymerization step can be reduced compared with the prior art.

The fourth aspect of the invention discloses the following devices as specific implementations thereof.

1) The device described in above item (9), wherein the injection ports are spaced away from a display edge by a distance not greater than two-fifths of the length of the side in which the injection ports are formed.

2) The device described in above item (10), wherein the area where the cell gap is not larger than the cell gap of the display area is spaced away from a cell forming seal by a distance not greater than 0.5 mm.

3) The device described in any one of the above items (9) to (12), wherein the liquid crystal composition contains a non-liquid-crystal component or a component whose molecular weight and surface energy are different from those of a liquid-crystal component.

In the device (9) of the present invention, to reduce display unevenness which could occur after polymerization of the polymerizable component due to separation of the liquid crystal and the polymerizable component, the liquid crystal composition must be thoroughly stirred at the initial stage of the injection process of the liquid crystal composition so that abnormal concentration portions of the polymerizable component and liquid crystal will not be formed, and so that localized increases in speed will not occur during the injection process. In the above device, this is achieved by optimizing the number of injection ports and the positions of the injection ports.

In the devices (10) and (11) of the present invention, to reduce display unevenness which could occur after polymerization of the polymerizable component due to separation of the liquid crystal and the polymerizable component, it becomes necessary, at the initial stage of the liquid crystal injection process, to prevent abnormal concentration portions of the polymerizable component and liquid crystal from forming and migrating from the frame edge into the display area resulting in agglomeration of the abnormal portions, and also to prevent the separation of the liquid crystal and polymerizable component due to increases in speed in the frame edge portion. In the above devices, therefore, to reduce the display unevenness, the cell thickness at the frame edge is made not greater than that of the display area, the distance between the frame edge and the seal is made not greater than a predetermined value, and the frame edge portion is filled with the auxiliary seal.

In the device (12) of the present invention, any abnormal concentration portion of the polymerizable component and liquid crystal is guided outside the display area before polymerizing the polymerizable component, thereby preventing the occurrence of display unevenness.

According to the invention, in the liquid crystal display device in which the polymerizable component dispersed in the liquid crystal is photopolymerized or thermally polymerized while applying a voltage, thereby defining the direction in which the liquid crystal molecules tilt in the presence of an applied voltage, display unevenness does not occur near the side where the injection ports for the liquid crystal composition are formed. Accordingly, the liquid crystal display device of the invention can achieve high display quality.

The fifth aspect of the invention discloses the following methods as specific implementations thereof.

1) The method described in above item (13), wherein the step of radiating the ultraviolet light to the liquid crystal composition injected between the two substrates is divided in two or more steps and performed by using ultraviolet light of different intensities.

2) The method described in above item (13), wherein the step of radiating the ultraviolet light to the liquid crystal composition injected between the two substrates is divided in two steps consisting of the step of radiating the ultraviolet light while applying to the liquid crystal molecules a voltage not smaller than the threshold value of the liquid crystal molecules and the step of radiating the ultraviolet light without applying a voltage to the liquid crystal molecules.

3) The method described in above item (13), wherein the step of radiating the ultraviolet light to the liquid crystal composition injected between the two substrates is divided in two steps and performed by applying respectively different voltages to the liquid crystal molecules.

4) The method described in above item (13), wherein the step of radiating the ultraviolet light for polymerizing the ultraviolet polymerizable resin contained in the liquid crystal composition injected between the two substrates is divided in two or more steps and performed by using a plurality of ultraviolet radiation units of different light intensities.

5) The method described in above item (13), wherein the ultraviolet radiation to the liquid crystal composition injected between the two substrates is applied from the array substrate side.

6) The method described in above item (13), wherein the second substrate is constructed from an array substrate on which the color filter layer is formed, the common electrode being formed on the first substrate, and the ultraviolet radiation to the liquid crystal composition injected between the two substrates is applied from the first substrate side.

According to the present invention, the polymer material added to control the tilt angle and azimuth angle of the liquid crystal molecules can take a structure that suitably controls the tilt angle of the liquid crystal molecules.

For example, if light is radiated sufficiently in the presence of an applied voltage, a rigid cross-linked structure can be formed, but processing takes too much time, and the cost increases because the number of processing units must be increased for mass production or because the processing capacity decreases.

As described above, according to the present invention, a fast response liquid crystal display device can be achieved that is free from image sticking, has a wide viewing angle made possible by reliable four-domain technology, provides high contrast by vertical alignment, and has the alignment of the liquid crystal molecules controlled using a polymer.

The sixth aspect of the invention discloses the following devices as specific implementations thereof.

1) The device described in any one of the above items (14) to (21), wherein the liquid crystal layer is sandwiched between a substrate in which a color filter layer of red, blue, and green is formed on a TFT substrate, and a substrate on which a common electrode is formed.

In the devices (14) to (16) of the present invention, to prevent the formation of an abnormal domain in the liquid crystal and to align the liquid crystal in the desired direction, it is essential that any area where the cell thickness varies, which could become the start point of an abnormal domain, be located at a domain boundary when the liquid crystal is aligned in the desired direction. This serves to alleviate the problems of low brightness, slow response speed, and display unevenness caused by the presence of an abnormal domain.

In the devices (17) and (18) of the present invention, if a liquid crystal domain occurs, the area of that domain must be minimized. To achieve this, provision must be made so that more than one structure that could become the start point of an abnormal domain will not be contained in the same alignment sub-region. This serves to alleviate the problems of low brightness, slow response speed, and display unevenness caused by the presence of an abnormal domain.

In the device (19) of the present invention, the number of contact holes that could become the start points of abnormal domains is reduced to one, thus making it possible to reduce the number of abnormal domains and increase the numerical aperture.

In the device (20) of the present invention, to prevent the numerical aperture from decreasing due to the presence of the metal electrode within the display pixel, it is effective to wire the metal electrode along the region within the pixel electrode that will appear as a dark line even in the presence of an applied voltage.

In the device (21) of the present invention, to prevent the formation of an abnormal domain in the liquid crystal and to align the liquid crystal in the desired direction, it is essential that any electrode having the same potential as the pixel electrode be not formed in the slit portion of the pixel electrode. This prevents an abnormal domain from being formed by an electric field arising from the electrode having the same potential as the pixel electrode, and serves to alleviate the problems of low brightness, slow response speed, and display unevenness caused by the presence of an abnormal domain.

As described above, according to the present invention, in the liquid crystal display device in which the photopolymerizable component dispersed in the liquid crystal is photopolymerized while applying a voltage, thereby defining the direction in which the liquid crystal molecules tilt in the presence of an applied voltage, it becomes possible to prevent the formation of abnormal domains in the liquid crystal and align the liquid crystal in the desired direction, and the liquid crystal display device of the invention can thus achieve high display quality.

The seventh aspect of the invention discloses the following methods as specific implementations thereof.

1) The method described in above item (22), wherein the additional ultraviolet radiation is applied using ultraviolet light whose wavelength is different from that of the ultraviolet light used for the polymerization of the monomer before the application of the additional ultraviolet radiation.

2) The method described in above item (22), wherein the ultraviolet light used in the additional ultraviolet radiation has a spectrum having a maximum energy peak at 310 to 380 nm.

3) The method described in above item (22), wherein the ultraviolet light used in the additional ultraviolet radiation has a spectrum having a maximum energy peak at 350 to 380 nm.

4) The method described in above item (22), wherein the ultraviolet light used in the additional ultraviolet radiation has a spectrum having a maximum energy peak at 310 to 340 nm.

5) The method described in above item (22), wherein the additional ultraviolet radiation is applied for 10 minutes or longer.

6) The method described in above item (22), wherein substrate surfaces are treated for vertical alignment in accordance with a vertical alignment mode, and liquid crystals in a non-display area also are substantially vertically aligned.

In the method of the present invention, after performing the polymerization step for alignment control, additional ultraviolet radiation is applied as an aftertreatment to react residual monomers. The additional radiation is performed by only radiating ultraviolet light to the liquid crystal component, without driving the liquid crystal panel. The radiation should be applied for a relatively long time by using light that efficiently emits ultraviolet light only of a wavelength necessary for polymerization (i.e., the light that does not contain visible light components, etc.) and whose intensity is not very strong. Generally, a radiation time of 10 minutes to 24 hours is preferred, though it depends on the intensity of the ultraviolet light used. In this method, since the radiated light contains hardly any wavelength components longer than the ultraviolet light, the radiation does not cause a temperature rise and it becomes possible to radiate light at an effective wavelength with a relatively strong intensity. As a result, residual monomers can be polymerized without causing a temperature rise, and a panel virtually free from image sticking can be achieved. Furthermore, since the additional ultraviolet radiation does not require driving the panel but can be implemented using a simple apparatus, many such radiation apparatuses can be installed so that many panels can be treated at the same time even when radiation takes a long time; accordingly, the additional ultraviolet radiation does not affect the overall time of the panel fabrication process and degrade the productivity.

EMBODIMENTS

The first aspect of the invention will be described further with reference to specific embodiments thereof.

Embodiment 1

Figure 9:
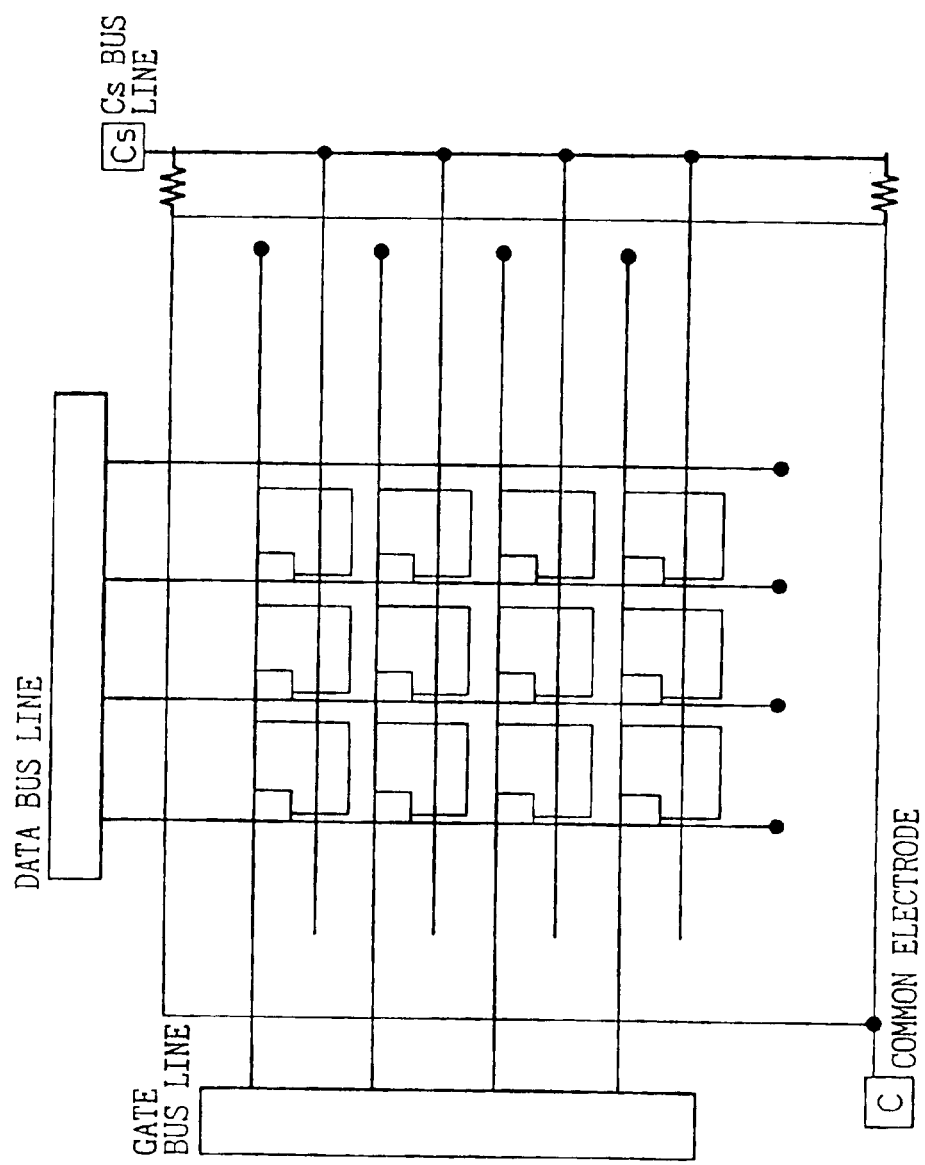
FIG. 9 is a schematic plan view showing a liquid crystal display device according to a first embodiment.

As shown in FIG. 9, gate bus lines and data bus lines are arranged in an matrix array on a first substrate, and the respective bus lines are bundled at one end. A TFT is located at each intersection of the bus lines, and a pixel electrode is formed via the TFT. On a second substrate on the opposite side is formed a common electrode which forms an electrical capacitance to each of the pixel electrodes, and a pad for applying a voltage to it is drawn out in the lower left corner.

The pixel electrodes also form a layer called a Cs bus line and an auxiliary capacitance Cs within the first substrate. It can be said that the Cs bus line is another common electrode. The Cs bus line is drawn out as a pad (Cs) in the upper right corner.

The cross section of the thus constructed liquid crystal panel is the same as that shown in FIG. 2; here, the first substrate corresponds to the bottom substrate and the second substrate to the substrate on which color filters are deposited.

On the surface of each substrate is formed an alignment film that determines the initial alignment of the liquid crystal (the liquid crystal alignment before the liquid crystal is exposed to light radiation); in the illustrated example, a polyimide alignment film exhibiting vertical alignment is used.

Here, a liquid crystal material that has a negative dielectric anisotropy $\Delta\epsilon$ of −3 to −5, and to which a trace amount (0.1 to 1.0%) of liquid crystalline acrylic material exhibiting photosensitivity has been added, is used as the liquid crystal.

In the thus constructed liquid crystal panel, when an AC voltage (rectangular wave) of ±20 V is applied to the common electrode pad (C) and 0 V to the pad (Cs), the voltage applied to the liquid crystal part, as earlier described, is given by $$Zlc/(Zlc+Zc) \times AC \text{ voltage}$$

If the liquid crystal capacitance Clc=250 fF and the auxiliary capacitance Cs=250 fF, then it can be seen from calculation that a voltage of about ±10 V has been applied to the liquid crystal part. When UV radiation is applied to the liquid crystal panel in this condition, the liquid crystalline acrylic material polymerizes by tilting in the direction in which the liquid crystal molecules are tilted.

Figure 10:
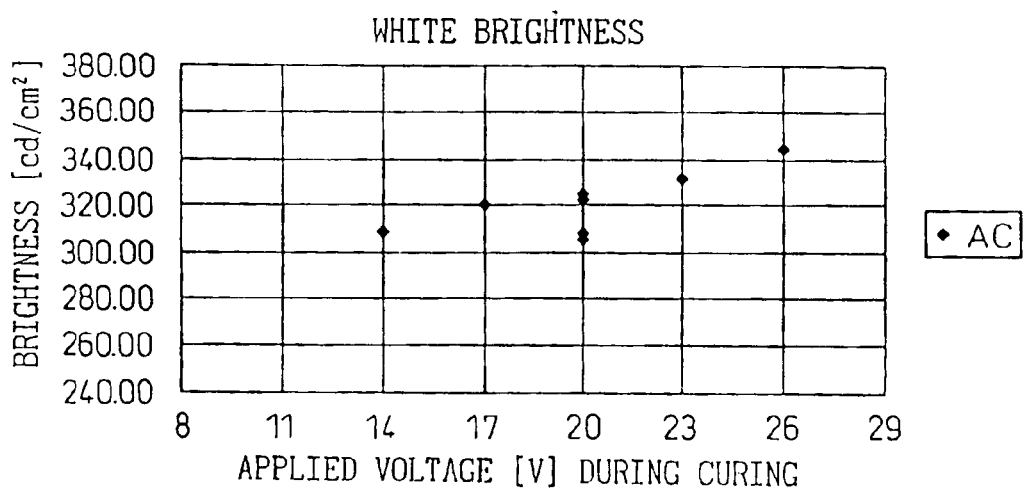
FIG. 10 is a graph showing the display characteristics of the liquid crystal display device according to the first embodiment.
Figure 11:
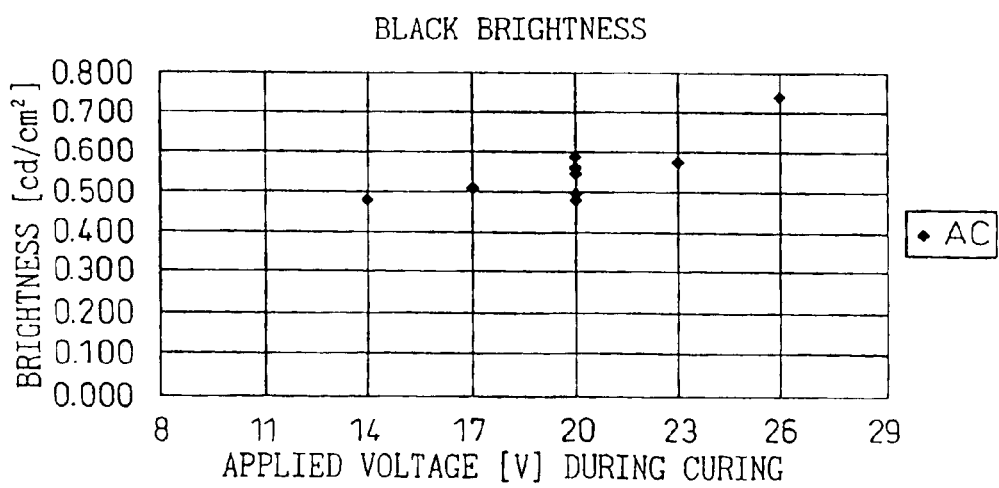
FIG. 11 is a graph showing the display characteristics of the liquid crystal display device according to the first embodiment.

By removing the applied voltage after the radiation, a condition in which the initial alignment is slightly tilted from the vertical alignment can be achieved. The display characteristics of the completed panel are shown in FIGS. 10 and 11; as can be seen, the characteristics are influenced by the voltage applied when polymerizing the liquid crystalline acrylic material, and when the AC voltage (rectangular wave) of ±20 V is applied, a panel having a white brightness of 320 cd/m$^2$ and a black brightness of 0.53 cd/m$^2$ (backlight of 5000 cd/m$^2$) can be obtained.

Embodiment 2

Figure 1:
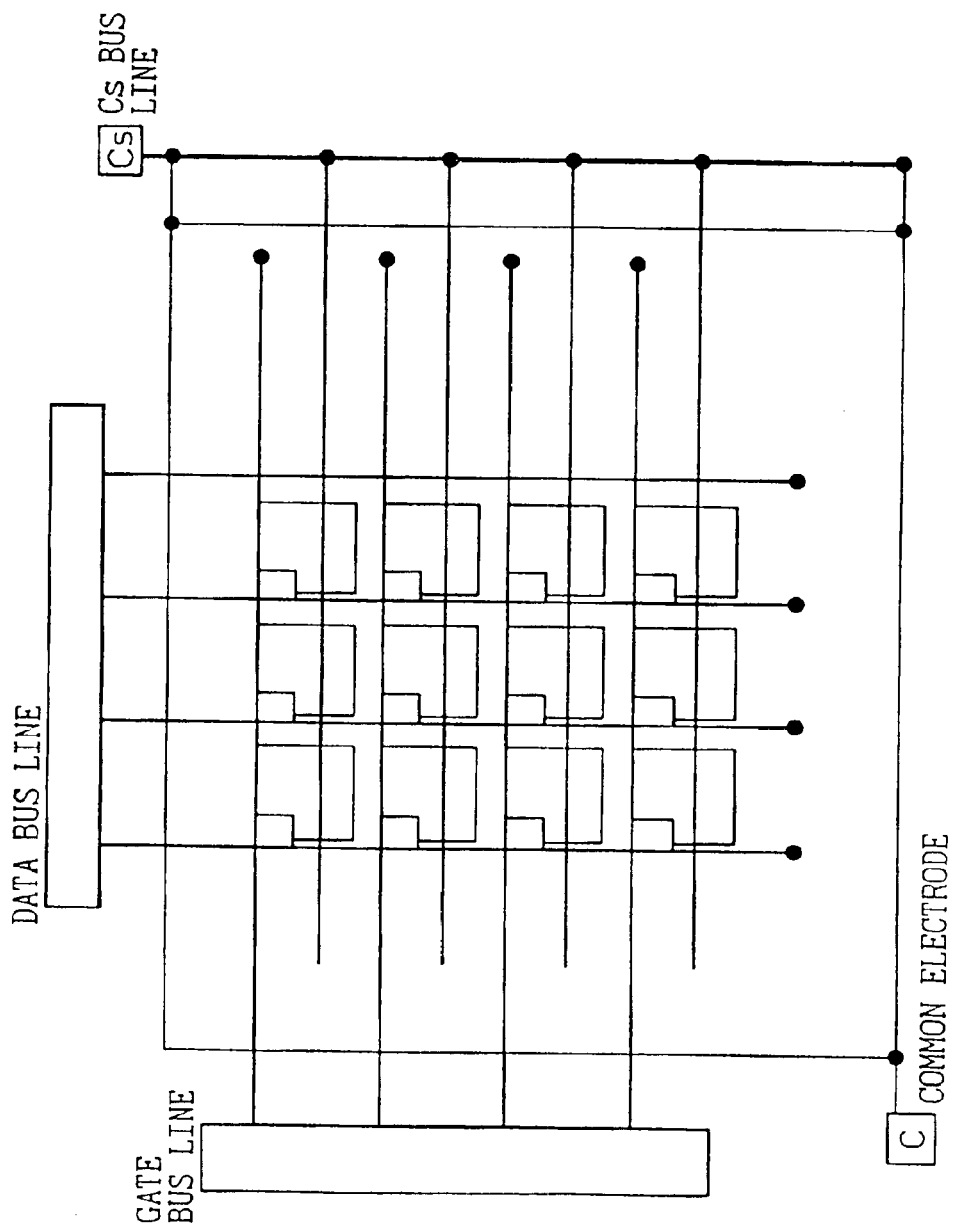
FIG. 1 is a schematic plan view showing one example of a liquid crystal display device fabricated according to the prior art.
Figure 12:
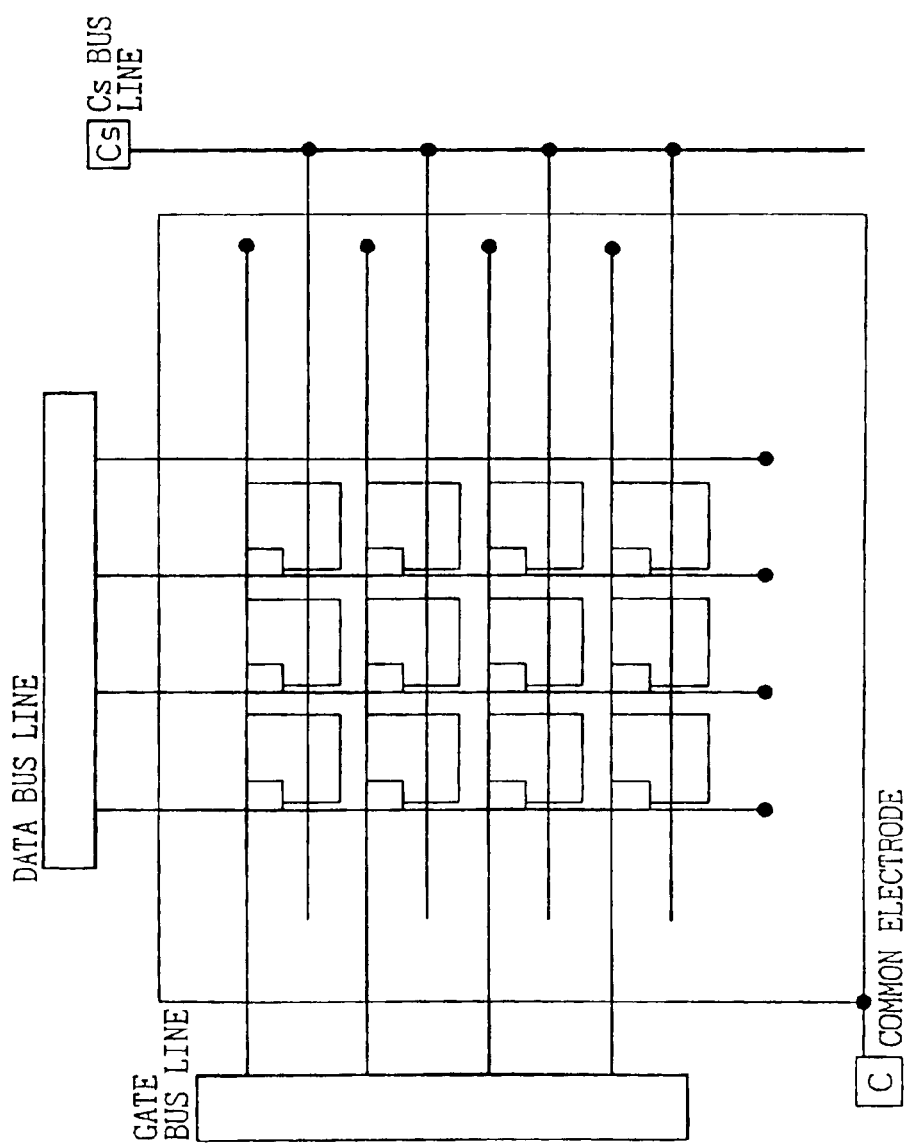
FIG. 12 is a schematic plan view showing a liquid crystal display device according to a second embodiment.

Compared with the structure of the first embodiment shown in FIG. 1, the common electrode and the Cs bus line are completely insulated from each other in the structure shown in FIG. 12 (generally, they are short-circuited using conductive particles or silver paste). It is preferable to completely insulate the common electrode from the Cs bus line as illustrated here, because deterioration of the applied AC voltage can then be alleviated.

In particular, the resistance per Cs bus line is often of the order of several thousand ohms and, depending on the magnitude of leakage, the applied voltage drops.

Embodiment 3

As described above, it is desirable that the common electrode and the Cs bus line be electrically insulated from each other, considering the voltage application when exposing the liquid crystal to radiation. This method, however, requires that a separate pattern from the voltage supply pattern to the Cs bus line be formed for the common electrode that needs to be supplied with currents from the four sides.

In view of this, if the common electrode is shorted to the Cs bus line after the radiation, as shown in the example shown here, supply of currents from the four sides can be easily accomplished.

Figure 13:
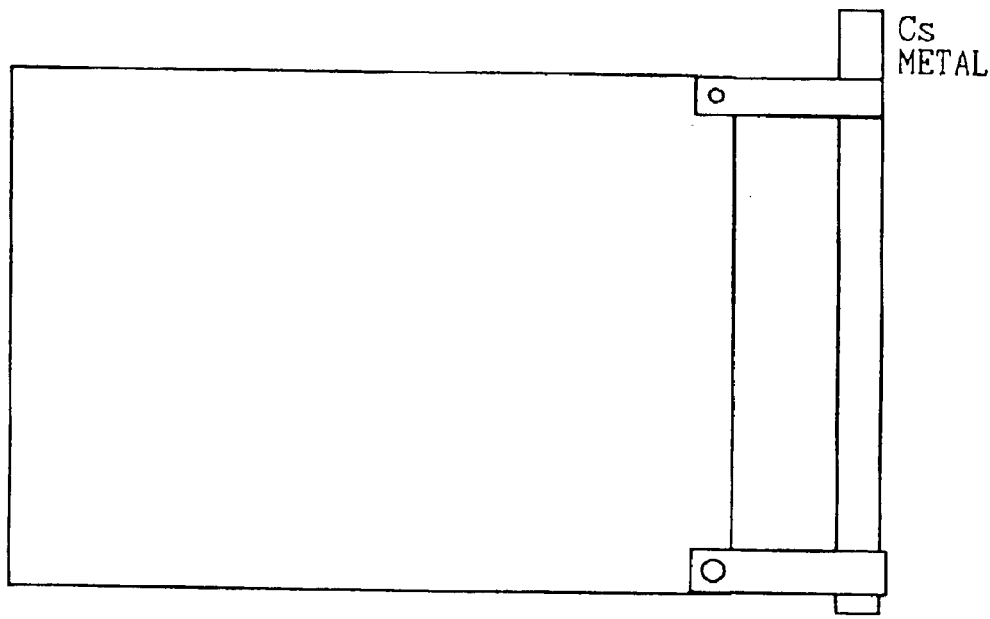
FIG. 13 is a diagram for explaining one method used in a third embodiment to short a Cs bus line to a common electrode.

More specifically, as shown in the example of FIG. 13, portions that can be shorted using a laser are provided in advance within the panel structure. For this purpose, it is generally practiced to electrically connect the top and bottom substrates by using silver paste or conductive spacer means.

Figure 14:
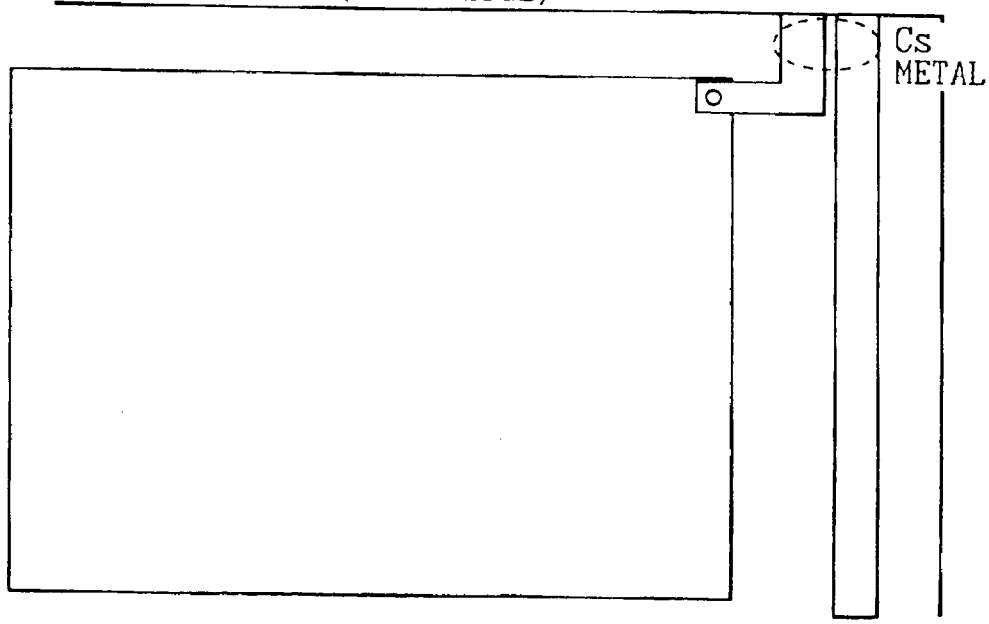
FIG. 14 is a diagram for explaining another method used in the third embodiment to short the Cs bus line to the common electrode.

On the other hand, in the example shown in FIG. 14, the connection is made at the terminal side. In the example shown here, the connection between the common electrode and the Cs bus line is made outside the panel.

Embodiment 4

Figure 15:
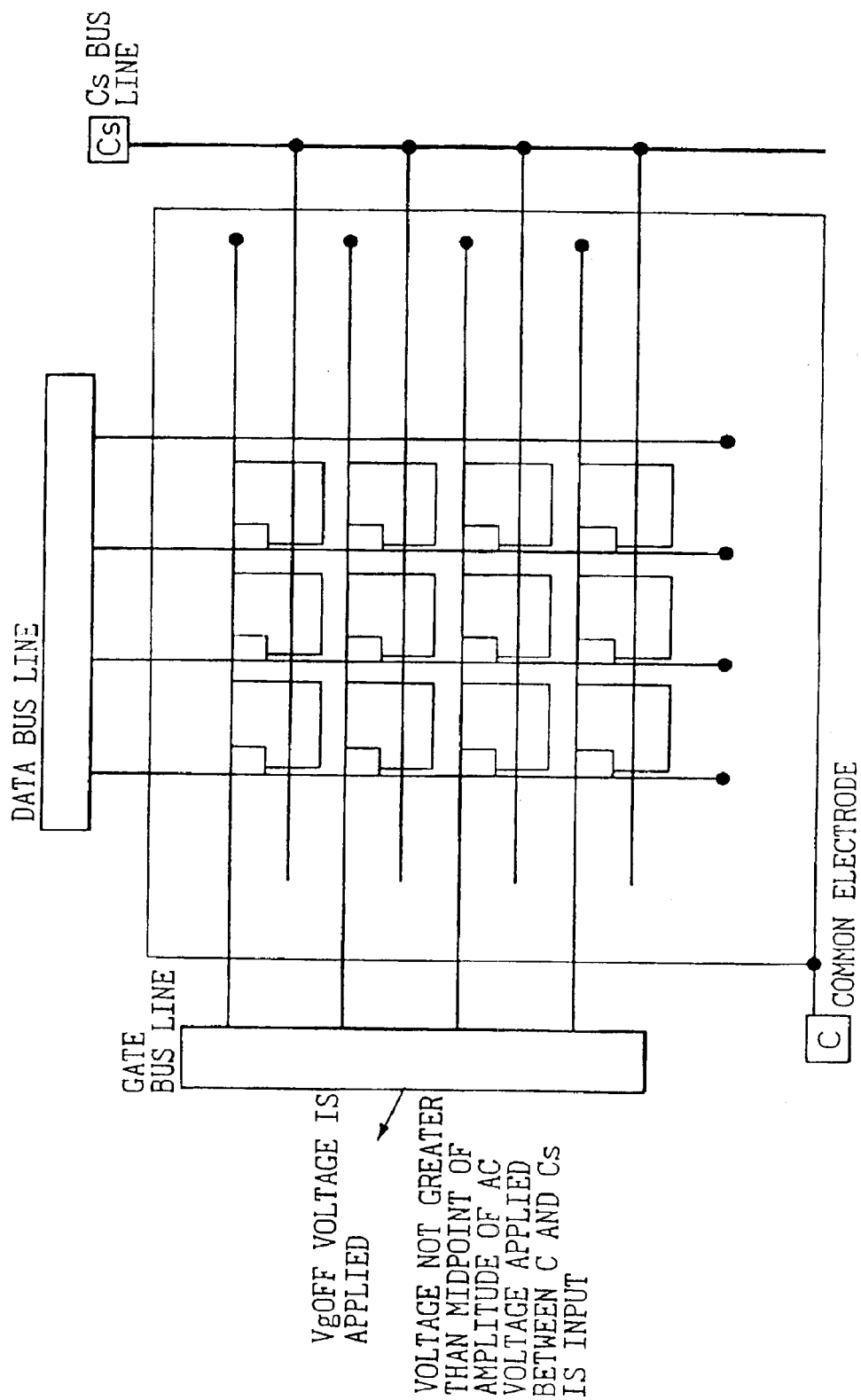
FIG. 15 is a schematic plan view showing a liquid crystal display device according to a fourth embodiment.

In a liquid crystal panel having the structure shown in FIG. 15 which is similar to that of the first embodiment, an AC voltage (rectangular wave) of ±8 V is applied to the common electrode pad (C) and 0 V to the pad (Cs), and further, −5 V is applied to the gate bus line.

As earlier described, the voltage applied to the liquid crystal part is given by $Zlc/(Zlc+Zc) \times AC$ voltage With the voltage applied to the gate bus line, the current that flows from the transistor to the data bus line can be suppressed.

As in the first embodiment, when UV radiation is applied to the liquid crystal panel, the liquid crystalline acrylic material polymerizes by being dragged in the direction in which the liquid crystal molecules are tilted.

Embodiment 5

The foregoing embodiments have been described specifically dealing with the case of the liquid crystal to which a liquid crystalline acrylic material has been added. It will, however, be recognized that any of the methods described in the above embodiments can be applied to a panel, such as a polymer-dispersed liquid crystal display panel, that contains a photosensitive material, or to ferroelectric panel that needs treatment for alignment.

Embodiment 6

Figure 16:
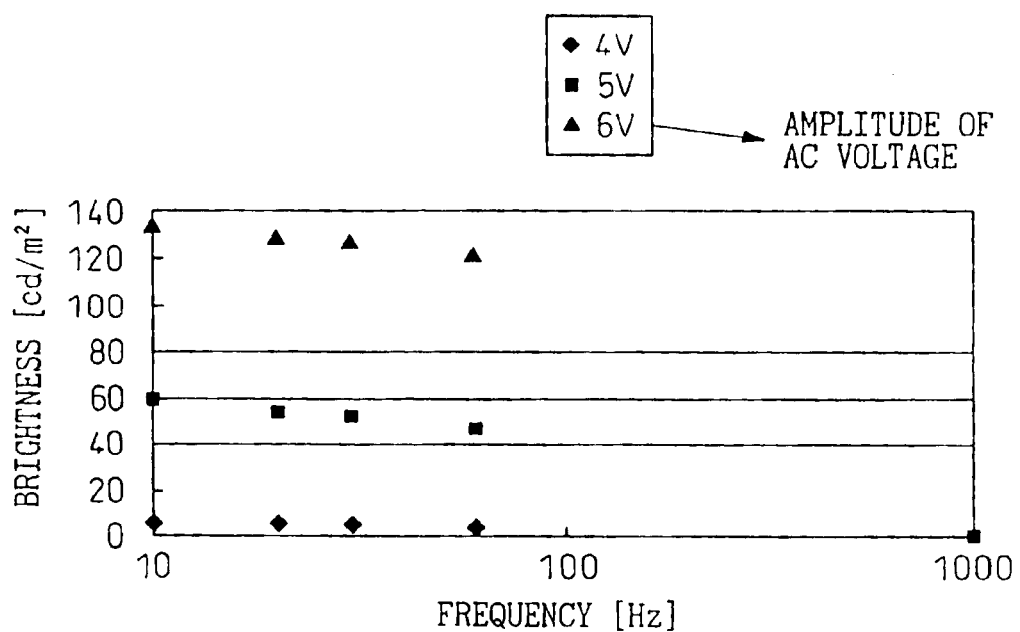
FIG. 16 is a graph showing results in a sixth embodiment.
Figure 17:
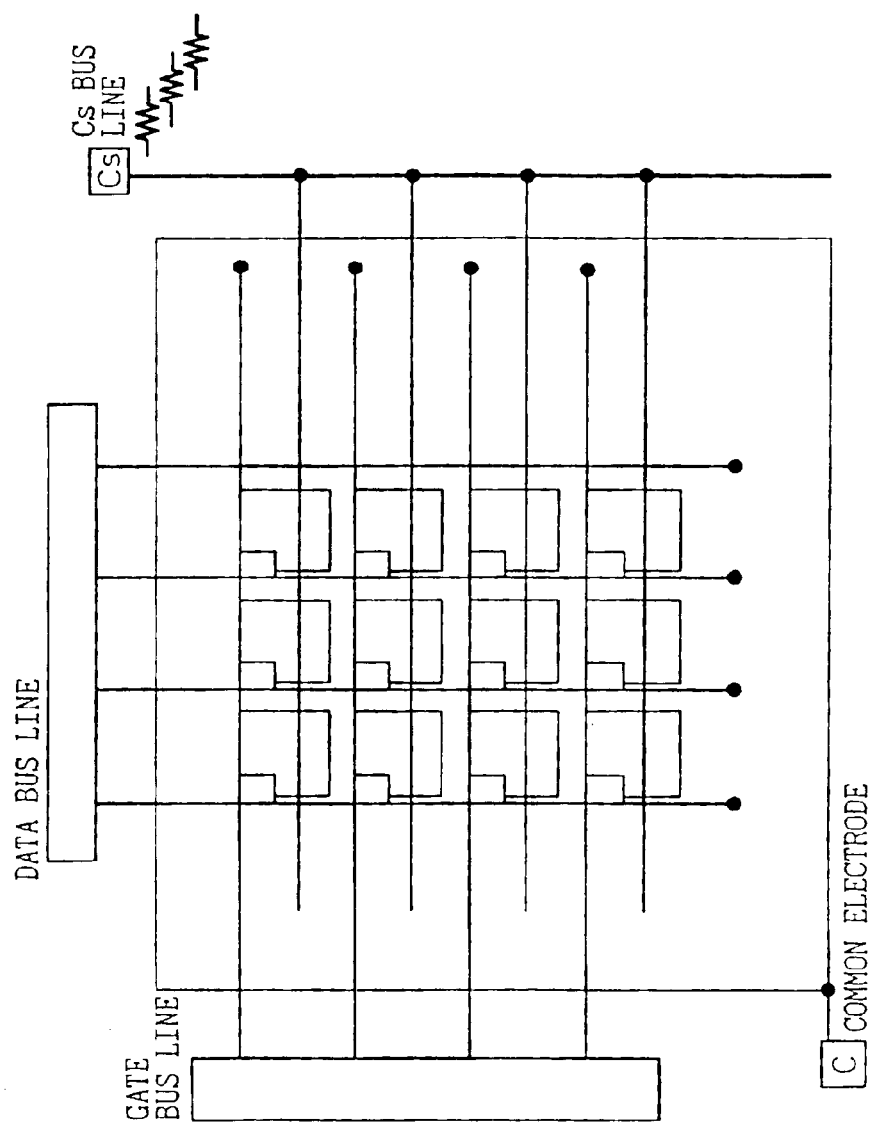
FIG. 17 is a schematic plan view showing a liquid crystal display device according to a seventh embodiment.

In the method of the first embodiment, if the frequency of the AC voltage applied is high, the high resistance of the Cs bus line becomes a problem, and insufficient writing results. Conversely, if the frequency is low, voltage leaks occur at high resistance connection portions, resulting in an inability to write a uniform voltage over the entire surface of the panel. Considering that the wiring resistance varies depending on the material, etc., the relationship between the frequency and brightness was measured while varying the applied AC voltage. The results are shown in FIG. 16. As can be seen, it is preferable to set the AC frequency of the AC voltage within the range of about 1 Hz to 1 kHz.

Embodiment 7

This embodiment concerns an example in which a wiring defect is made invisible by applying a DC voltage while holding the wiring lines and electrodes on the second substrate at the same potential.

In this example, the DC voltage is applied between the common electrode and the three bus lines. Here, 10 V is applied to the common electrode, and 0 V is applied to the three bus lines. Then, as the voltage actually applied to the liquid crystal is the same as the model explained in the description of the first embodiment, a panel having substantially the same display characteristics (white brightness of 320 cd/m$^2$ and black brightness of 0.53 cd/m$^2$) can be obtained. Needless to say, in this case, shorts between the bus lines, etc. do not present any problem because they are held at the same voltage.

Embodiment 8

Figure 18:
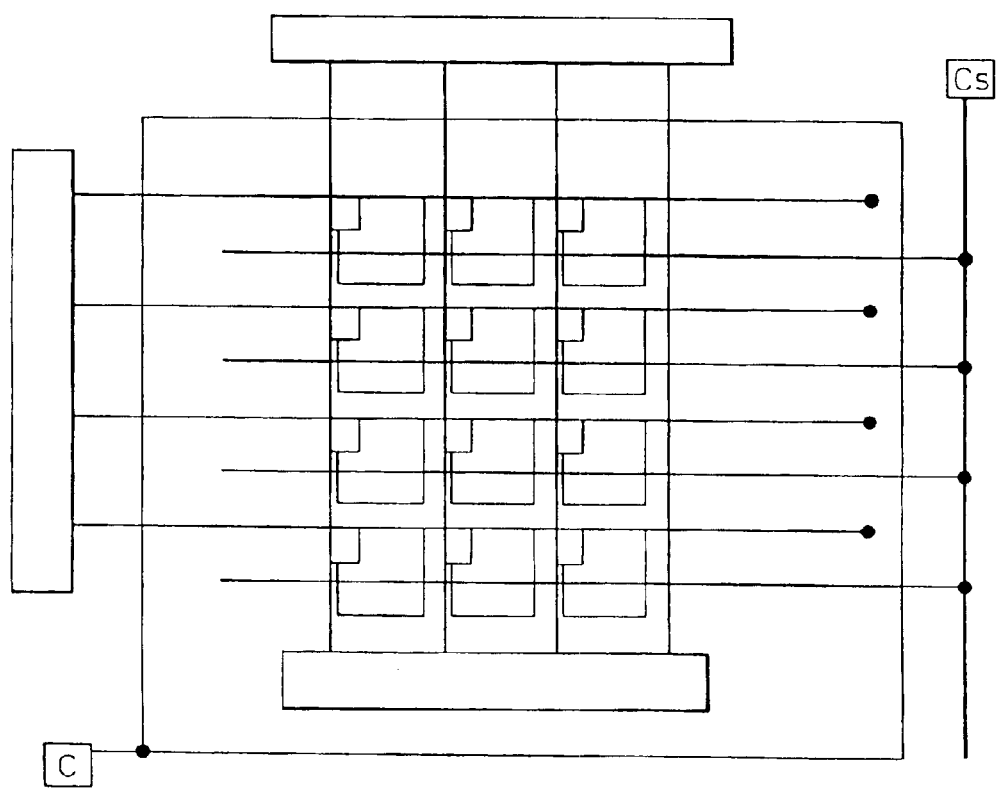
FIG. 18 is a schematic plan view showing a liquid crystal display device according to an eighth embodiment.

This embodiment is the same as the seventh embodiment, except that the data bus lines are bundled at the opposite ends as well, as shown in FIG. 18. With this arrangement, if there is a break in a data bus line, the voltage can be supplied from the opposite end. In this case, the bundled portion should be separated afterwards by cutting the glass.

Embodiment 9

Figure 19:
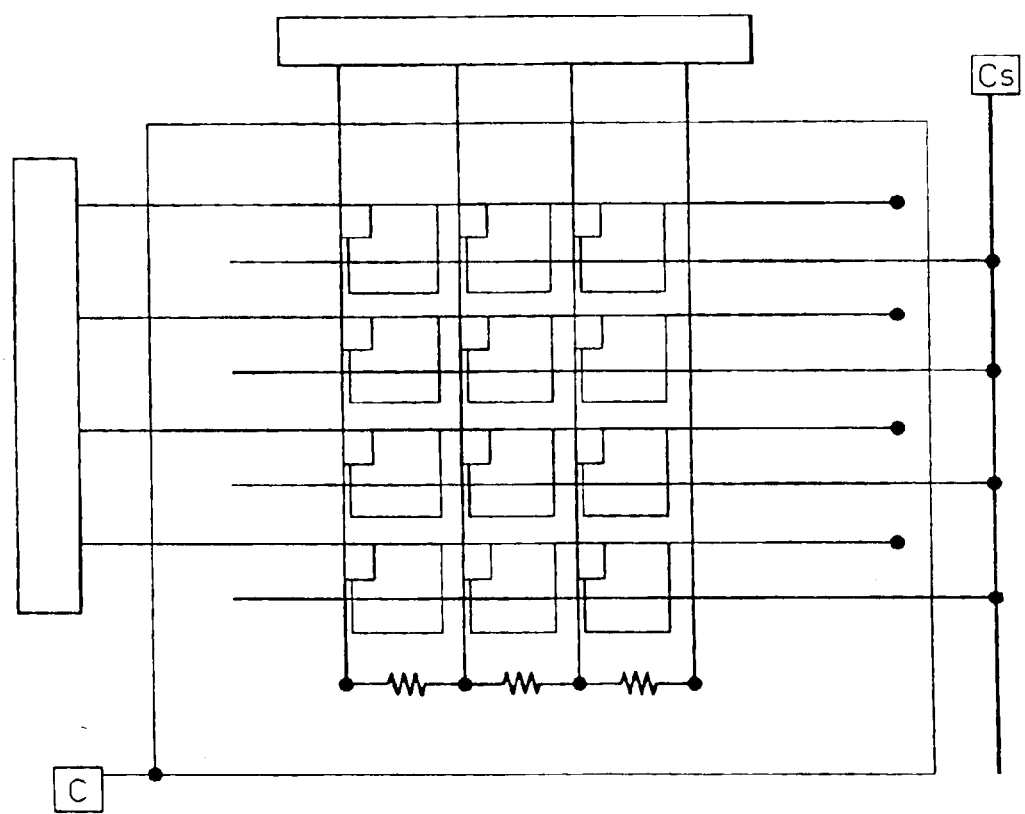
FIG. 19 is a schematic plan view showing a liquid crystal display device according to a ninth embodiment.

One method of avoiding the cutting process in the eighth embodiment is to connect the data bus lines via high resistance at the opposite end as shown in FIG. 19, instead of bundling them together. In the case of a DC voltage, if a sufficient time elapses, the potential can be equalized despite the presence of high resistance connections, as explained in connection with FIG. 5. Using this, it is also possible to apply a Dc voltage by forming a pattern such as shown in FIG. 20 or 21.

Figure 20:
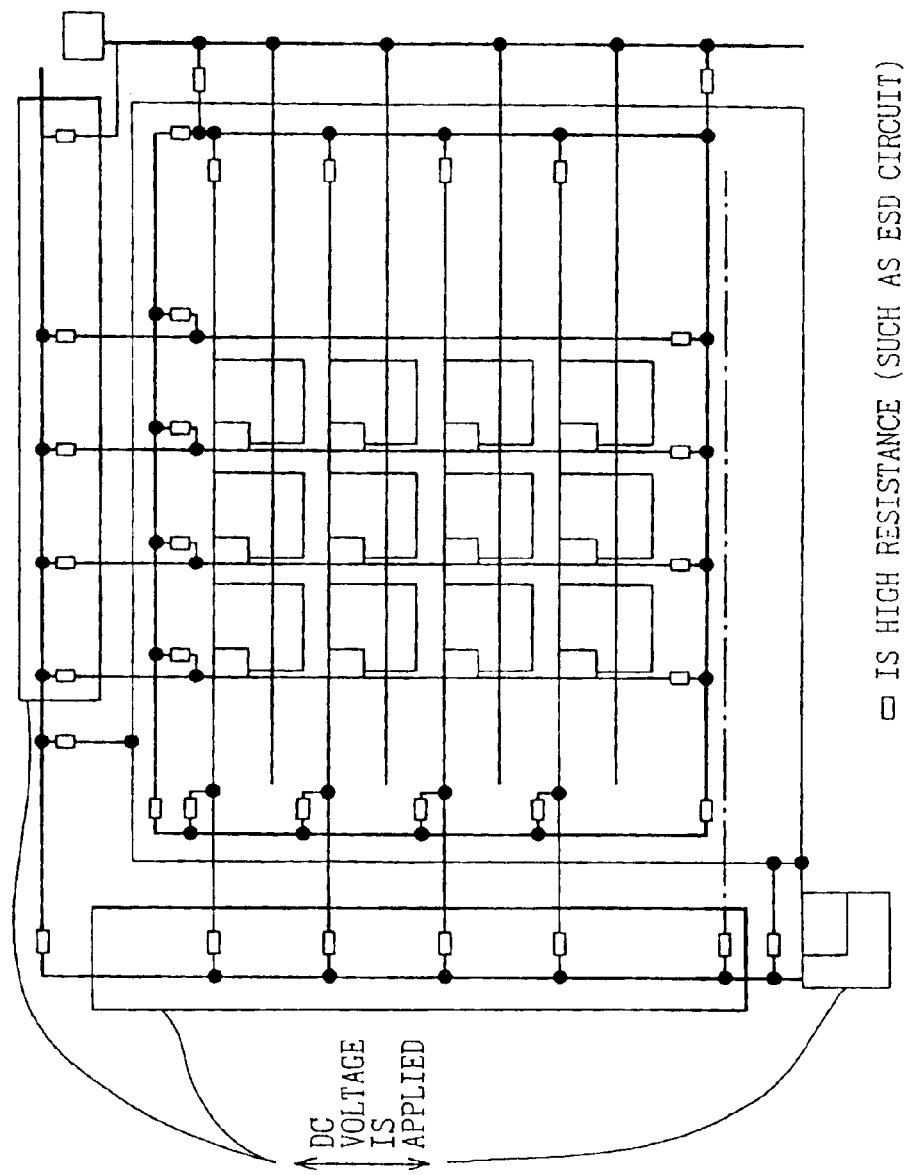
FIG. 20 is a schematic plan view showing another example of the liquid crystal display device according to the ninth embodiment.

In FIG. 20, the data bus lines, the gate bus lines, the Cs bus lines (including the repair line described later), and the common electrode are all connected via high resistance such as ESD circuits. In this example, radiation is applied to the liquid crystal while applying 10 V to the data bus lines, 10

V to the gate bus lines (including the repair line described later), and 0 V to the common electrode.

Figure 21:
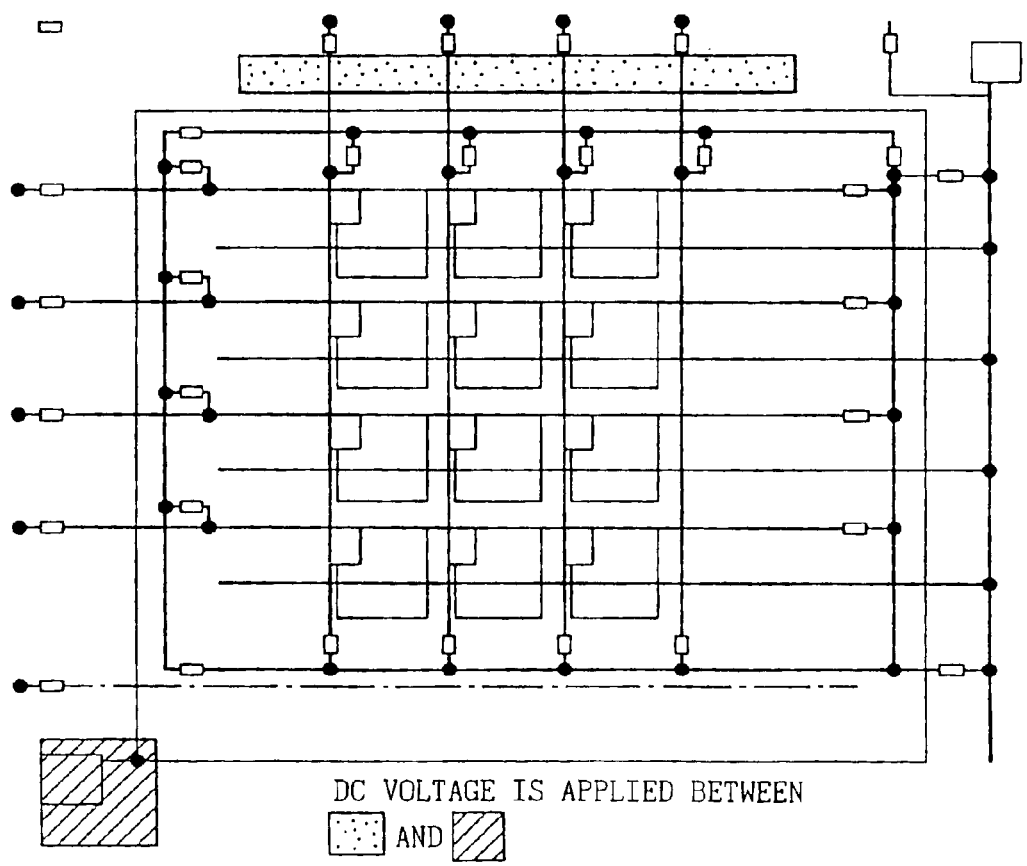
FIG. 21 is a schematic plan view showing another example of the liquid crystal display device according to the ninth embodiment.

In FIG. 21, the data bus lines, the gate bus lines, and the Cs bus lines (including the repair line described later) are all connected via high resistance such as ESD circuits. However, these bus lines are insulated from the common electrode. In this example, radiation is applied to the liquid crystal while applying 10 V to the data bus lines, and 0 V to the common electrode.

In each of the examples of FIGS. 20 and 21, the bus lines on the second substrate are all held at the same potential.

Embodiment 10

Figure 22:
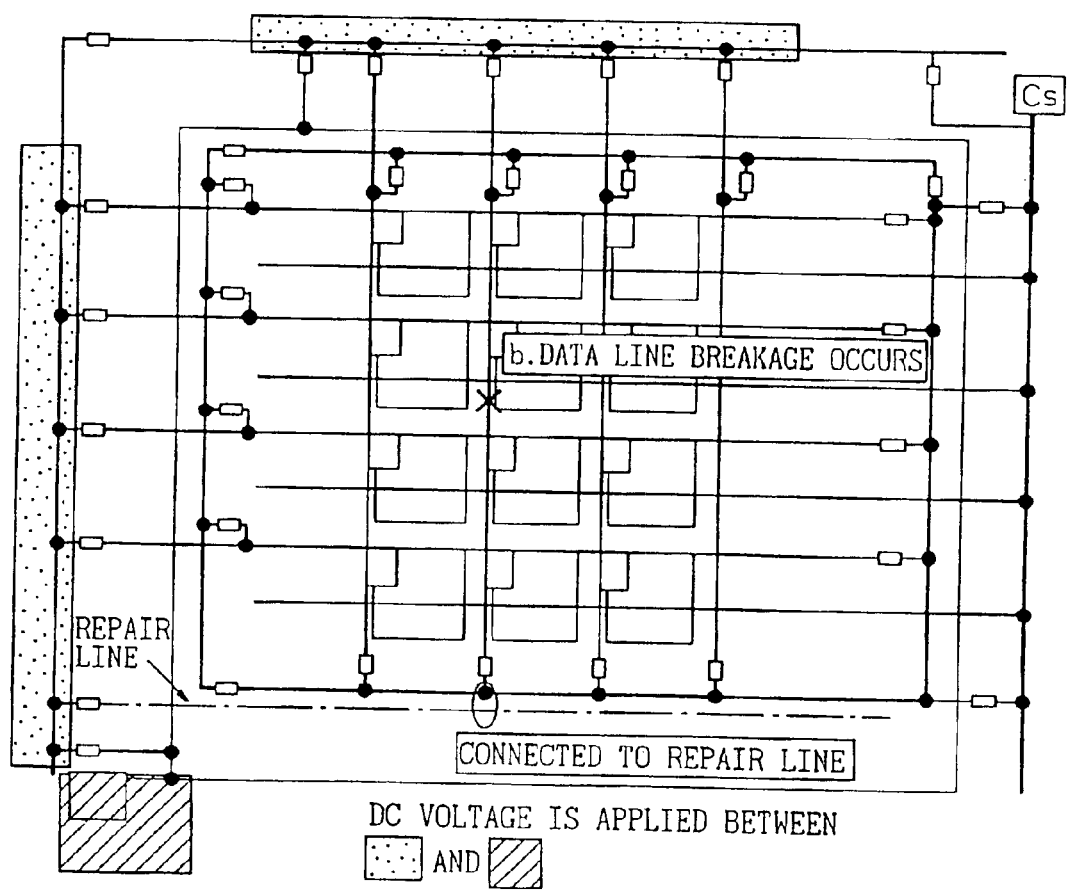
FIG. 22 is a schematic plan view showing a liquid crystal display device according to a 10th embodiment.

In this embodiment, voltages are applied not only to the data bus lines, gate bus lines, Cs bus lines, and common electrode, but also to the repair line, as shown in FIG. 22.

The repair line is usually formed at both ends of the data bus lines or at the end opposite from the signal input end. In the device shown in the figure, the repair line is located at the end opposite from the signal input end.

In a typical example of repair, any defect, including a line defect caused by an interlayer short, is converted to a defect of type b (data bus line breakage), as explained with reference to FIG. 7, and the defective line is connected to the repair line, as shown in FIG. 20. In this case, since the voltage from the signal input end does not propagate beyond the broken point, the voltage may be rerouted via an ESD circuit or the like within the panel, as in other embodiments earlier described, but compared with that method, applying a voltage directly to the repair line is a much more reliable method.

Based on the above concept, in the device of FIG. 22, a voltage is applied to the repair line directly or via a high resistance connection. In the figure, the bus lines and the TFTs are arranged on the second substrate. A transparent electrode as the common electrode is formed on the first substrate. An alignment film is formed on each substrate by printing, spinning, or other techniques. Liquid crystal with a trace amount of liquid crystalline acrylic material added to it is sandwiched between the two substrates.

Next, 0 V is applied to the common electrode, while a DC voltage of 10 V is applied to the portions connected via high resistance to the gate bus lines, data bus lines, and repair line. After applying the voltage to the liquid crystal in this way, UV radiation is applied to the liquid crystal part.

Embodiment 11

Figure 4:
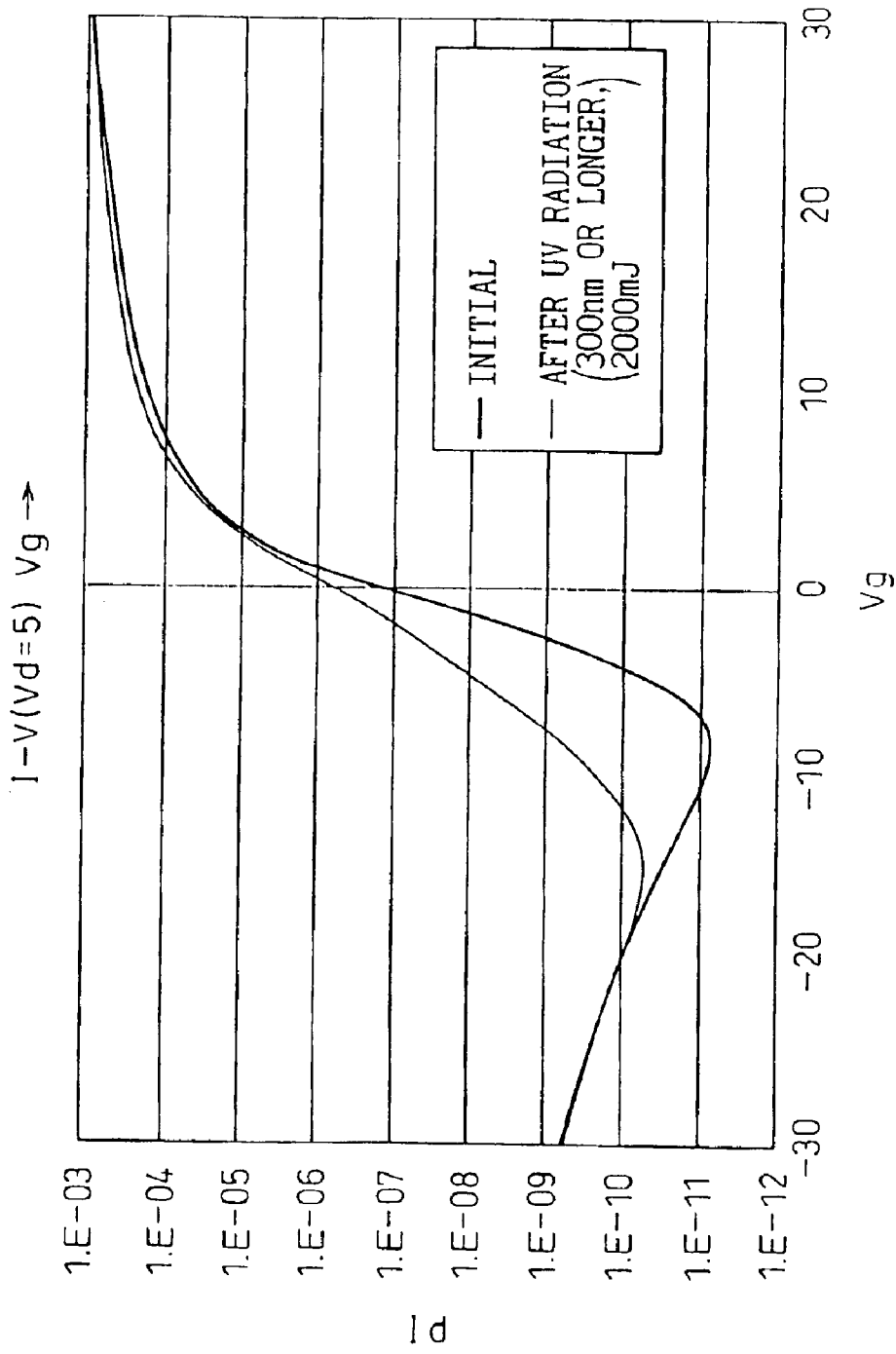
FIG. 4 is a graph showing one example of a TFT threshold value shift as observed in the liquid crystal display device fabricated according to the prior art.
Figure 23:
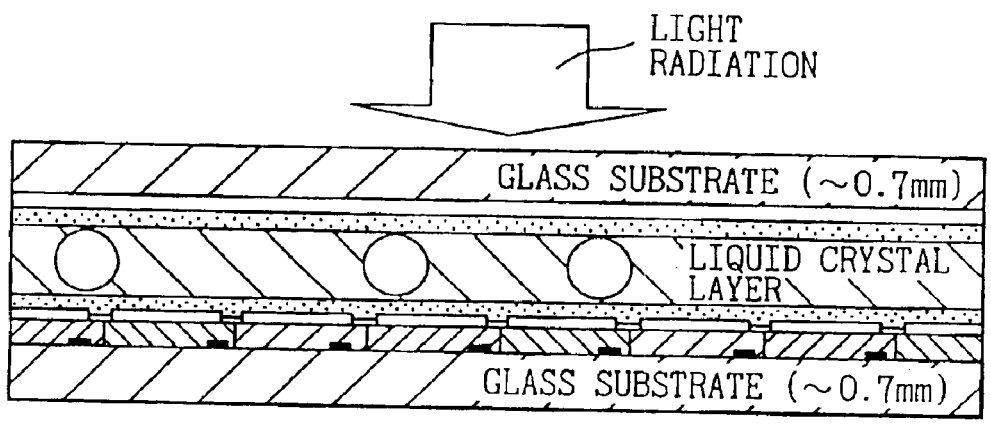
FIG. 23 is a schematic cross-sectional view showing a liquid crystal display device according to an 11th embodiment.

This embodiment concerns an example in which a CF-ON-TFT structure is employed as the panel structure, as shown in FIG. 23. As previously shown in FIG. 4, a shift in TFT threshold value occurs when ultraviolet radiation is directly applied when the TFTs are ON. When color filters are formed on the TFT substrate in such a manner as to cover the TFTs, most of the ultraviolet radiation falling on the substrate can be cut off, as a result of which shifting in the threshold value can be suppressed.

In FIG. 23, the TFTs are arranged on the second substrate, and the color filters are formed over the TFTs, on top of which pixel electrodes are formed. A transparent electrode as the common electrode is formed on the first substrate. An alignment film is formed on each substrate by printing, spinning, or other techniques. Liquid crystal with a trace amount of liquid crystalline acrylic material added to it is sandwiched between the two substrates.

Next, 0 V is applied to the common electrode and 20 V to the gate bus lines, while an 30-Hz AC square wave voltage of ±10 V is applied to the data bus lines. The data bus lines are bundled at both ends, as shown in FIG. 18.

After applying the voltage to the liquid crystal in this way, UV radiation is applied from the first substrate side.

Embodiment 12

Figure 24:
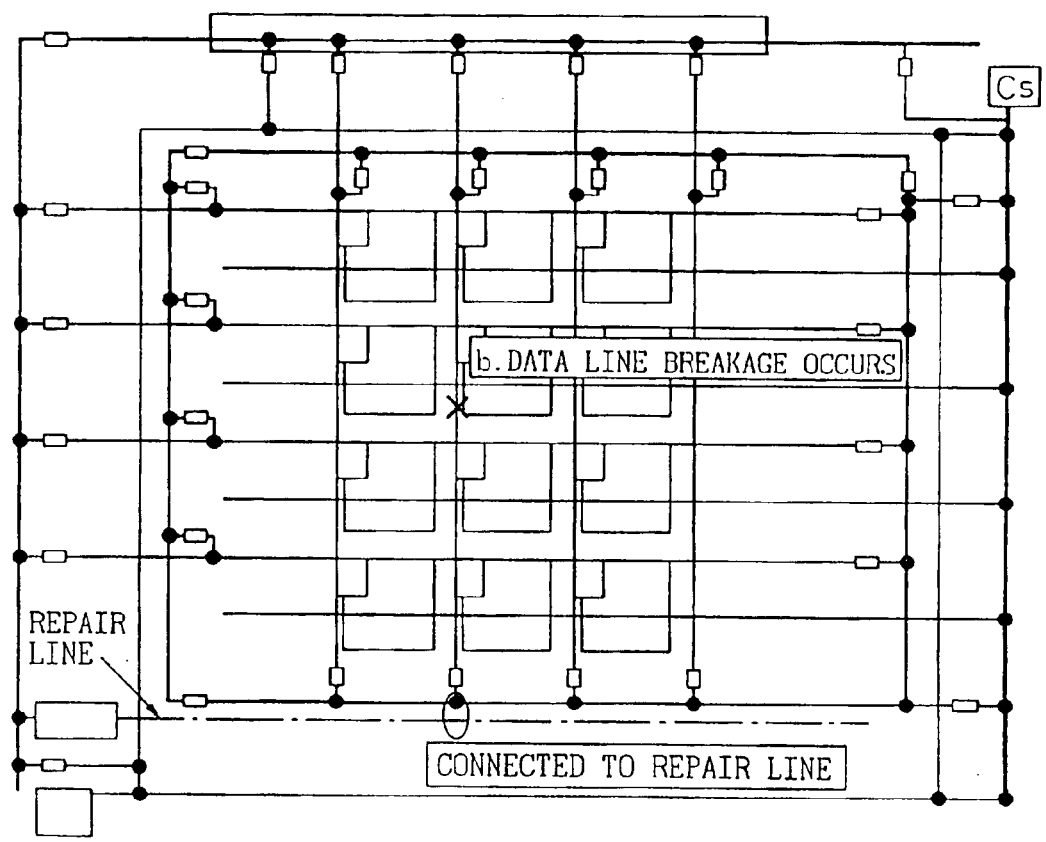
FIG. 24 is a schematic plan view showing a liquid crystal display device according to a 12th embodiment.

This embodiment concerns an example in which not only is a light blocking film formed on the TFTs in order to suppress the shifting in TFT threshold, but the same signal as input to the data bus lines is applied to the repair line, as shown in FIG. 24, in order to apply a voltage uniformly to a line defect portion as well. As in the 11th embodiment, the TFTs are arranged on the second substrate, and the color filters are formed over the TFTs, on top of which pixel electrodes are formed. A transparent electrode as the common electrode is formed on the first substrate. An alignment film is formed on each substrate by printing, spinning, or other techniques. Liquid crystal with a trace amount of liquid crystalline acrylic material added to it is sandwiched between the two substrates.

Next, 0 V is applied to the common electrode and 20 v to the gate bus lines, while an 30-Hz AC square wave voltage of ±10 V is applied to the repair line as well as to the data bus lines. Here, the repair line is connected to the bus line to be repaired.

After applying the voltage to the liquid crystal in this way, UV radiation is applied from the first substrate side.

Next, the second aspect of the invention will be described with reference to specific embodiments thereof. In each of the following embodiments, the display device uses vertical alignment films and a liquid crystal material having a negative dielectric anisotropy, and since the polarizers are arranged in a crossed Nicol configuration and attached to both sides of the liquid crystal panel, the display device is normally black. The polarization axis of each polarizer is oriented at 45° to the bus lines. The panel size is 15 inches in diagonal, and the resolution is XGA. Liquid crystalline acrylate monomer UCL-001 manufactured by Dainippon Ink and Chemicals, Inc. was used as the polymerizable monomer, and a liquid crystal material having negative $\Delta\epsilon$ was used as the liquid crystal.

Embodiment 13

Figure 25:
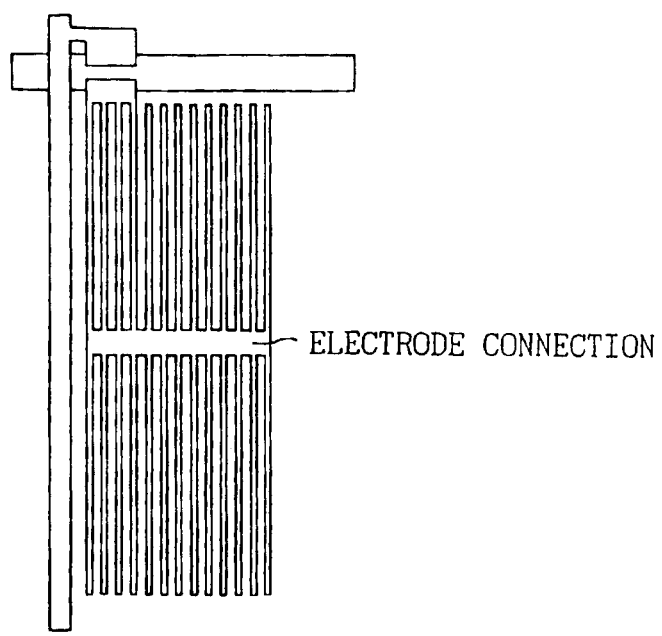
FIG. 25 is a schematic plan view of a liquid crystal panel fabricated according to a 13th embodiment.

A liquid crystal panel having an ITO pattern such as shown in FIG. 25 was fabricated.

Since the gap between the data bus line and the ITO is approximately equal to the width of each fine ITO slit, liquid crystal molecules tilt in the direction parallel to the data bus line even in the portion corresponding to the gap between the data bus line and the ITO, that is, all the liquid crystal molecules tilt in the same direction, preventing the formation of dark areas. To achieve symmetrical viewing angle characteristics, the area where the liquid crystal molecules tilt toward the top of FIG. 23 and the area where the liquid crystal molecules tilt toward the bottom of FIG. 25 are substantially equal in size.

Figure 26:
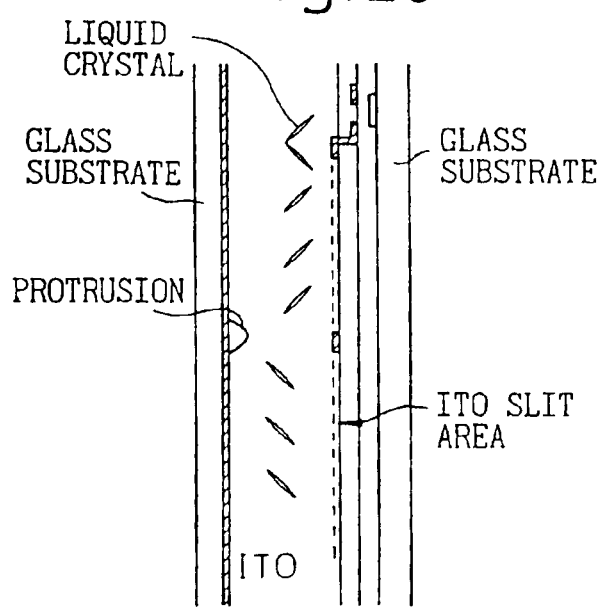
FIG. 26 is a schematic cross-sectional view showing one example of the liquid crystal panel of FIG. 25.
Figure 27:
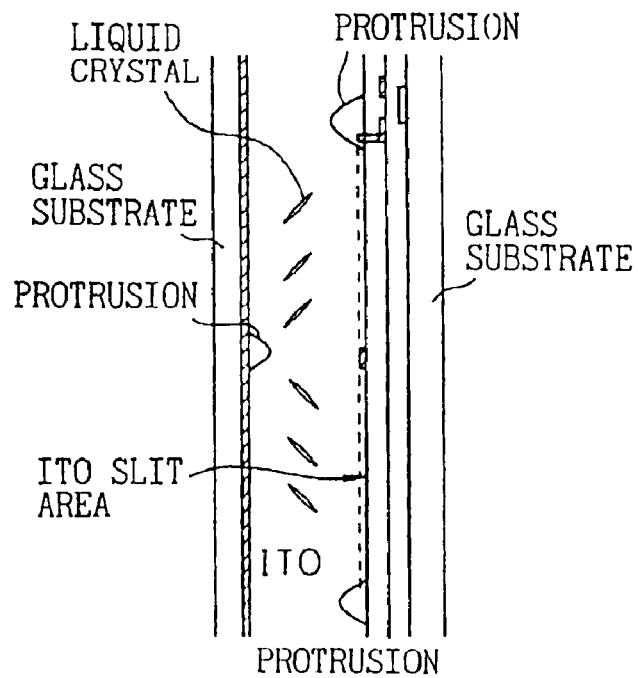
FIG. 27 is a schematic cross-sectional view showing another example of the liquid crystal panel of FIG. 25.

In FIG. 25, the fine electrodes are connected together at the center of the pixel. As shown in FIG. 26 which is a cross-sectional view showing one example of the device of FIG. 25, the direction in which the liquid crystal molecules tilt can be controlled by an electric field alone, but as shown in FIG. 27 which is a cross-sectional view showing another example of the device of FIG. 25, protruding banks may be formed in order to more clearly define the direction in which the liquid crystal molecules tilt. Instead of providing the banks, the alignment film may be rubbed in the direction shown, or an optical alignment technique may be used.

A voltage 0.1 V higher than the threshold voltage was applied to the liquid crystal composition filled into the panel, and one minute was allowed to pass; then, after confirming by observation under a microscope that the alignment had been controlled in the desired direction, the voltage was raised to 3 V at a rate of 0.01 V per second, and then to 10 V at a rate of 0.1 V per second, and with the voltage of 10 V applied, ultraviolet radiation was applied to polymerize the monomer. The fabrication of a liquid crystal panel free from alignment disruptions was thus achieved.

Embodiment 14

Figure 28:
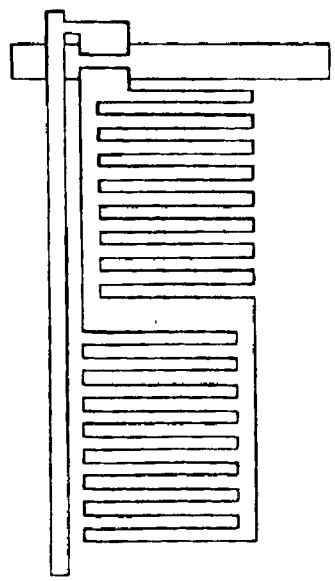
FIG. 28 is a schematic plan view of a liquid crystal panel fabricated according to a 14th embodiment.
Figure 29:
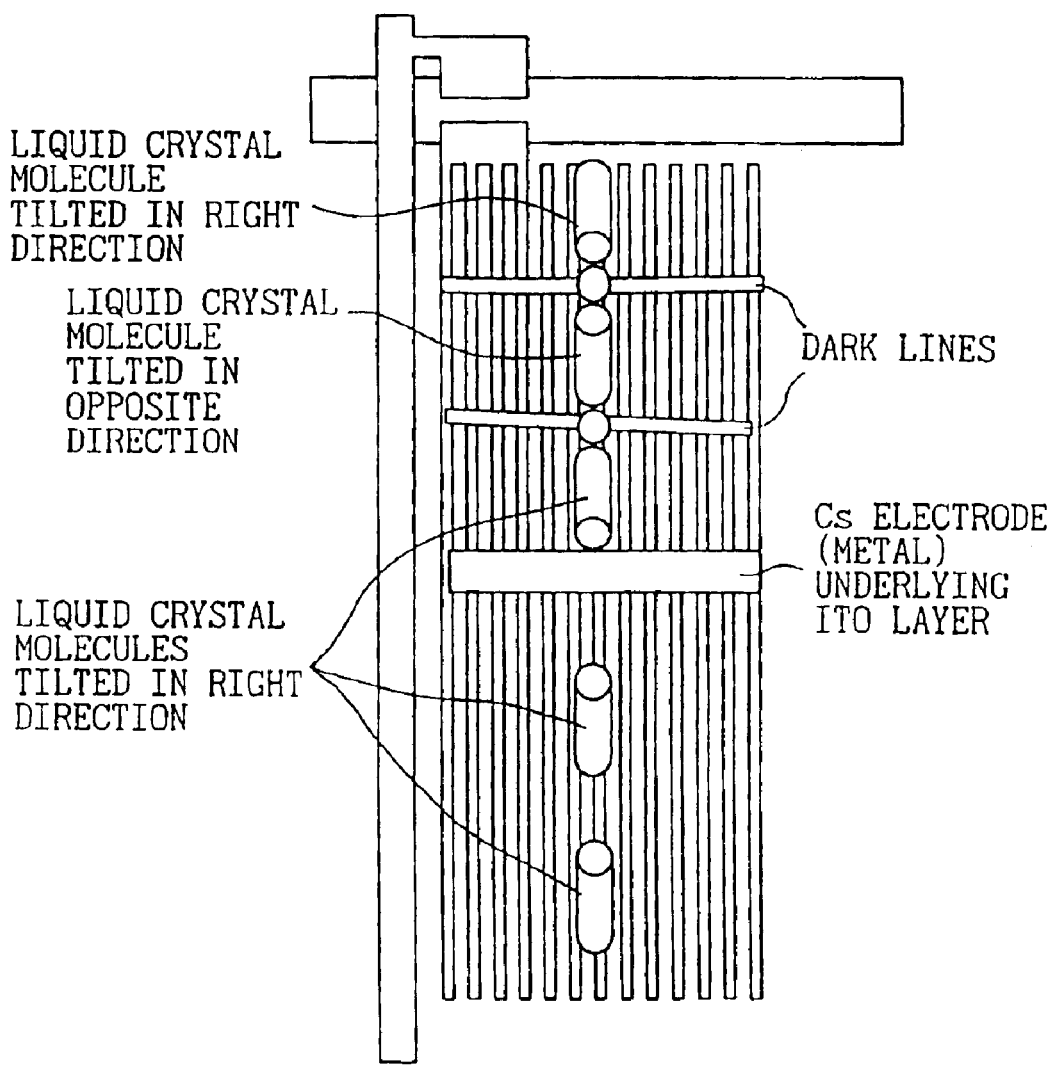
FIG. 29 is a schematic plan view for explaining a prior art example.

A liquid crystal panel having an ITO pattern such as shown in FIG. 28 was fabricated.

A voltage 0.1 V higher than the threshold voltage was applied to the liquid crystal composition filled into the panel, and one minute was allowed to pass to allow the alignment of the liquid crystal molecules to stabilize; after that, the voltage was raised to 3 V at a rate of 0.01 V per second, and then to 10 V at a rate of 0.1 V per second, and with the voltage of 10 V applied, ultraviolet radiation was applied to polymerize the monomer. The fabrication of a liquid crystal panel free from alignment disruptions was thus achieved.

Next, the third aspect of the invention will be described with reference to specific embodiments thereof.

Embodiments 15 to 17 and Comparative Examples 1 and 2

Figure 33:
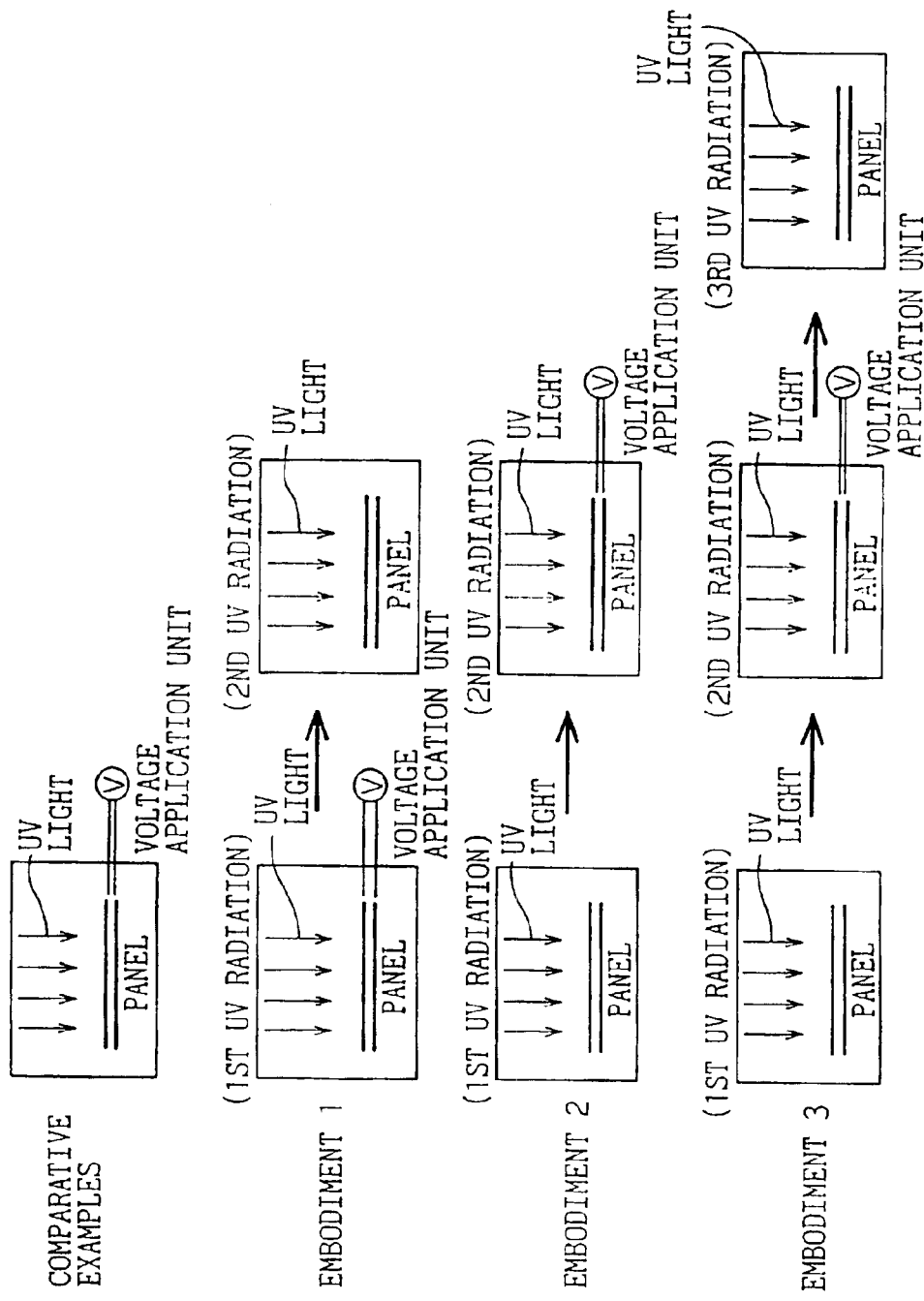
FIG. 33 is a schematic diagram showing UV radiation methods used in first and second comparative examples and 15th to 17th embodiments.

Embodiments of the present invention, each using a 15-inch XGA-LCD, are shown in FIG. 33 for comparison with comparative examples fabricated according to the prior art method. An N-type liquid crystal material having negative $\Delta \epsilon$ was used as the liquid crystal. Liquid crystalline acrylate monomer UCL-001 manufactured by Dainippon Ink and Chemicals, Inc. was used as the polymerizable monomer. The concentration of the monomer in the liquid crystal composition was 0.1 to 2% by weight. A photopolymerization initiator was added at a concentration of 0 to 10% relative to the weight of the monomer. The UV radiation conditions and the obtained results are shown in Table 1.

TABLE 1

| EXAMPLE NO. | Run | 1ST UV RADIATION | | | 2ND UV RADIATION | | |
|---|---|---|---|---|---|---|---|
| | | VOLTAGE (V) | UV INTENSITY (mW/cm$^2$) | AMOUNT OF UV RADIATION (mJ/cm$^2$) | VOLTAGE (V) | UV INTENSITY (mW/cm$^2$) | AMOUNT OF UV RADIATION (mJ/cm$^2$) |
| EMBODIMENT 15 | ① | 10 | 100 | 4000 | 0 | 10 | 4000 |
| | ② | 10 | 100 | 4000 | 0 | 10 | 6000 |
| | ③ | 10 | 100 | 4000 | 0 | 10 | 8000 |
| | ④ | 10 | 10 | 2000 | 0 | 100 | 4000 |
| | ⑤ | 10 | 10 | 2000 | 0 | 100 | 6000 |
| | ⑥ | 10 | 10 | 2000 | 0 | 100 | 8000 |
| EMBODIMENT 16 | ⑦ | 0 | 10 | 500 | 10 | 100 | 4000 |
| | ⑧ | 0 | 10 | 1000 | 10 | 100 | 4000 |
| EMBODIMENT 17 | ⑨ | 0 | 10 | 500 | 10 | 100 | 4000 |
| | ⑩ | 0 | 10 | 500 | 10 | 100 | 4000 |
| | ⑪ | 0 | 10 | 500 | 10 | 100 | 4000 |
| COMPARATIVE EXAMPLE 1 | | 10 | 10 | 4000 | — | — | — |
| COMPARATIVE EXAMPLE 2 | | 10 | 10 | 8000 | — | — | — |

| EXAMPLE NO. | Run | 3RD UV RADIATION | | | BURN-IN | CON-TRAST | RADIATION TIME WITH APPLIED VOLTAGE |
|---|---|---|---|---|---|---|---|
| | | VOLTAGE (V) | UV INTENSITY (mW/cm$^2$) | AMOUNT OF UV RADIATION (mJ/cm$^2$) | | | |
| EMBODIMENT 15 | ① | — | — | — | 7% | 600 | 40 |
| | ② | — | — | — | 6% | 600 | 40 |
| | ③ | — | — | — | 6% | 600 | 40 |
| | ④ | — | — | — | 8% | 700 | 200 |
| | ⑤ | — | — | — | 7% | 700 | 200 |
| | ⑥ | — | — | — | 7% | 700 | 200 |
| EMBODIMENT 16 | ⑦ | — | — | — | 9% | 700 | 40 |
| | ⑧ | — | — | — | 9% | 700 | 40 |
| EMBODIMENT 17 | ⑨ | 0 | 10 | 4000 | 7% | 700 | 40 |
| | ⑩ | 0 | 10 | 6000 | 6% | 700 | 40 |
| | ⑪ | 0 | 10 | 8000 | 6% | 700 | 40 |
| COMPARATIVE EXAMPLE 1 | | — | — | — | 18% | 600 | 400 |
| COMPARATIVE EXAMPLE 2 | | — | — | — | 6% | 300 | 800 |

In the first comparative example, the applied voltage during UV radiation was 10 V, the UV intensity was 10 mW/cm$^2$, and the amount of radiation was 4000 mJ/cm$^2$. The radiation time was about 400 seconds, and a contrast of about 600 was obtained, but residual monomers were left and the image sticking was as large as 18%. When the amount of UV radiation was increased to 8000 mJ/cm$^2$, as in the second comparative example, the image sticking decreased to 6%; however, in this case, the contrast decreases, and the radiation time becomes as long as about 800 seconds.

The method of the 15th embodiment is a method in which a voltage of 10 V is applied during the first radiation to provide a desired pretilt, and the second radiation is performed without applying an electric field to eliminate residual monomers. As shown in Table 1, the first radiation was performed by applying high intensity UV in some examples and low intensity UV in others; in the case of the high intensity UV radiation (100 mW/m$^2$), the radiation time, with an applied voltage, was about 40 seconds, and good results were obtained for both the image sticking and the contrast. On the other hand, in the case of the low intensity UV radiation (10 mW/m$^2$), the radiation time, with an applied voltage, increased up to 200 seconds, but it was not longer than one half the time required in the comparative examples, and good results were obtained for both the image sticking and the contrast.

In the method of the 16th embodiment, the first radiation is performed without applying an electric field, but the second radiation is performed while applying a voltage. More specifically, the first radiation is performed by applying a small amount of radiation to cause the monomers to react to a certain extent, thereby making the monomers in unradiated areas easier to react and, thereafter, UV radiation is applied in the presence of an applied voltage. Since post-radiation is not performed, the image sticking somewhat increases, but the contrast is further improved.

In the method of the 17th embodiment, both the post-radiation and pre-radiation are performed. Good results were obtained for both the image sticking and the contrast.

Next, the fourth aspect of the invention will be described with reference to specific embodiments thereof.

Embodiment 18

Figure 34:
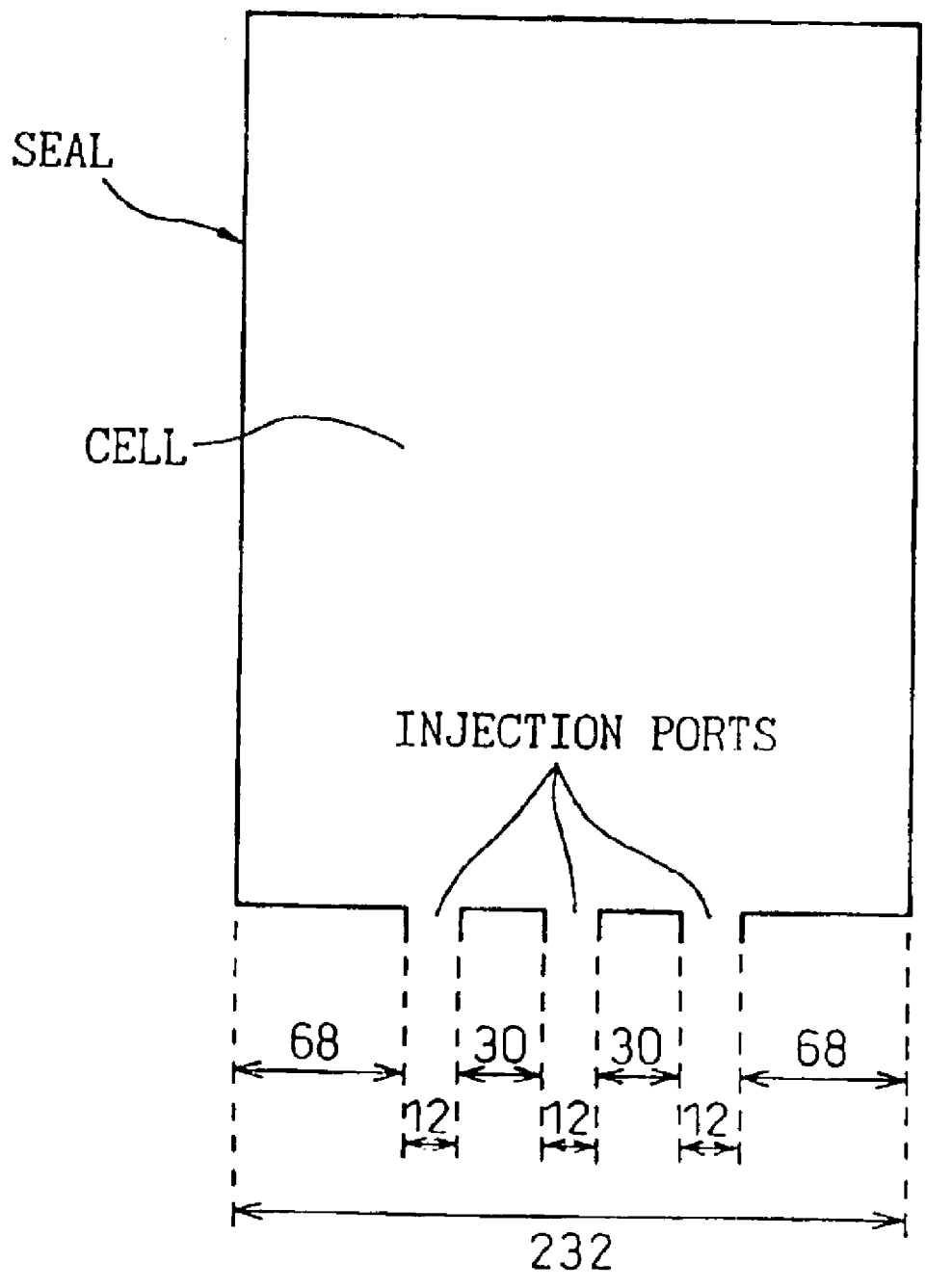
FIG. 34 is a schematic plan view showing a liquid crystal panel according to an 18th embodiment.

TFT devices, data bus lines, gate bus lines, and pixel electrodes were formed on one substrate. A color layer and a common electrode were formed on the other substrate. An empty cell was fabricated by laminating the two substrates together with 4-$\mu$m diameter spacers interposed therebetween. An acrylic photopolymerizable component exhibiting the nematic liquid crystalline state was mixed in an amount of 0.3 weight percent into a negative-type liquid crystal material), and the thus prepared liquid crystal composition containing the photopolymerizable component was injected into the cell to fabricate a liquid crystal panel. As shown in FIG. 34, the panel was provided with three injection ports which were formed in positions 68 mm to 80 mm, 110 mm to 122 mm, and 152 mm to 164 mm, respectively, on a 232-mm long side.

A gate voltage of 30 VDC, a data voltage of 10 VDC, and a common voltage of 5 VDC were applied to the panel to cause the liquid crystal molecules in the panel to tilt, and in this condition, 300-nm to 450-nm ultraviolet radiation of 2000 mJ/cm$^2$ was applied from the common substrate side. The ultraviolet polymerizable monomer was thus polymerized. Next, polarizers were attached to complete the fabrication of the liquid crystal panel. It was confirmed that the thus fabricated liquid crystal panel achieved a high display quality free from display defects such as display unevenness in the corners.

Embodiment 19

Figure 35:
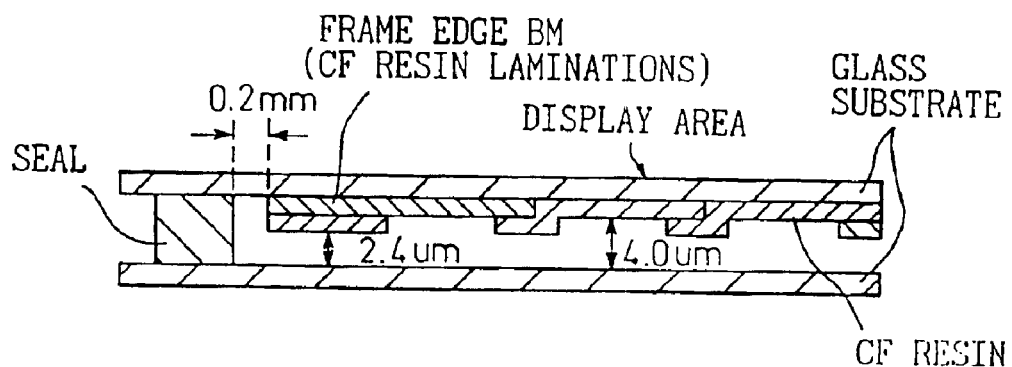
FIG. 35 is a schematic cross-sectional view showing a liquid crystal panel according to a 19th embodiment.

TFT devices, data bus lines, gate bus lines, and pixel electrodes were formed on one substrate. A color layer and a common electrode were formed on the other substrate. An empty cell was fabricated by laminating the two substrates together with 4-$\mu$m diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. As shown in FIG. 35, the BM portion of the panel frame edge was formed by laminating CF resin layers; the cell gap at this portion was 2.4 $\mu$m (the cell gap in the display area was 4.0 $\mu$m) and the distance to the seal was 0.2 mm.

A gate voltage of 30 VDC, a data voltage of 10 VDC, and a common voltage of 5 VDC were applied to the panel to cause the liquid crystal molecules in the panel to tilt, and in this condition, 300-nm to 450-nm ultraviolet radiation of 2000 mJ/cm$^2$ was applied from the common substrate side. The ultraviolet polymerizable monomer was thus polymerized. Next, polarizers were attached to complete the fabrication of the liquid crystal panel. It was confirmed that the thus fabricated liquid crystal panel achieved a high display quality free from display defects such as display unevenness in the corners.

In the above structure, it will be appreciated that the same effect can be obtained if a CF resin film is deposited on a metal BM of Cr or the like instead of forming the panel BM portion by laminating the resin layers.

Embodiment 20

Figure 36:
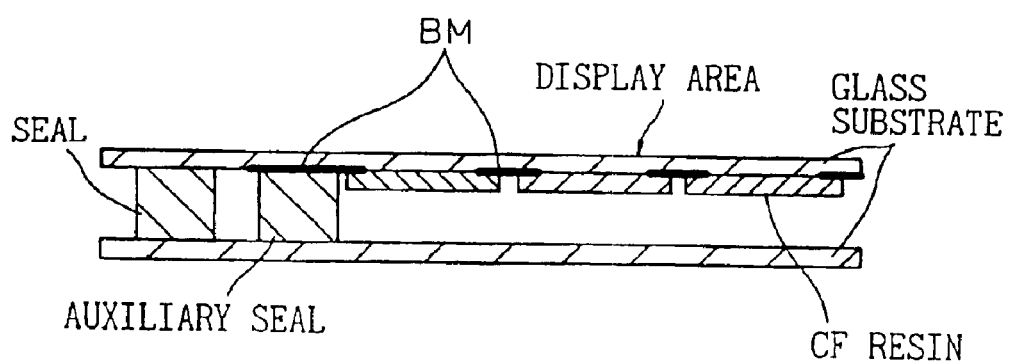
FIG. 36 is a schematic cross-sectional view showing a liquid crystal panel according to a 20th embodiment.

TFT devices, data bus lines, gate bus lines, and pixel electrodes were formed on one substrate. A color layer and a common electrode were formed on the other substrate. An empty cell was fabricated by laminating the two substrates together with 4-$\mu$m diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. As shown in FIG. 36, an auxiliary seal was formed on the BM portion of the panel frame edge, to eliminate the cell gap at the BM portion of the frame edge.

A gate voltage of 30 VDC, a data voltage of 10 VDC, and a common voltage of 5 VDC were applied to the panel to cause the liquid crystal molecules in the panel to tilt, and in this condition, 300-nm to 450-nm ultraviolet radiation of 2000 mJ/cm$^2$ was applied from the common substrate side. The ultraviolet polymerizable monomer was thus polymerized, and a polymer network was formed within the panel. Next, polarizers were attached to complete the fabrication of the liquid crystal panel. It was confirmed that the thus fabricated liquid crystal panel achieved a high display quality free from display defects such as display unevenness in the corners.

Embodiment 21

Figure 37:
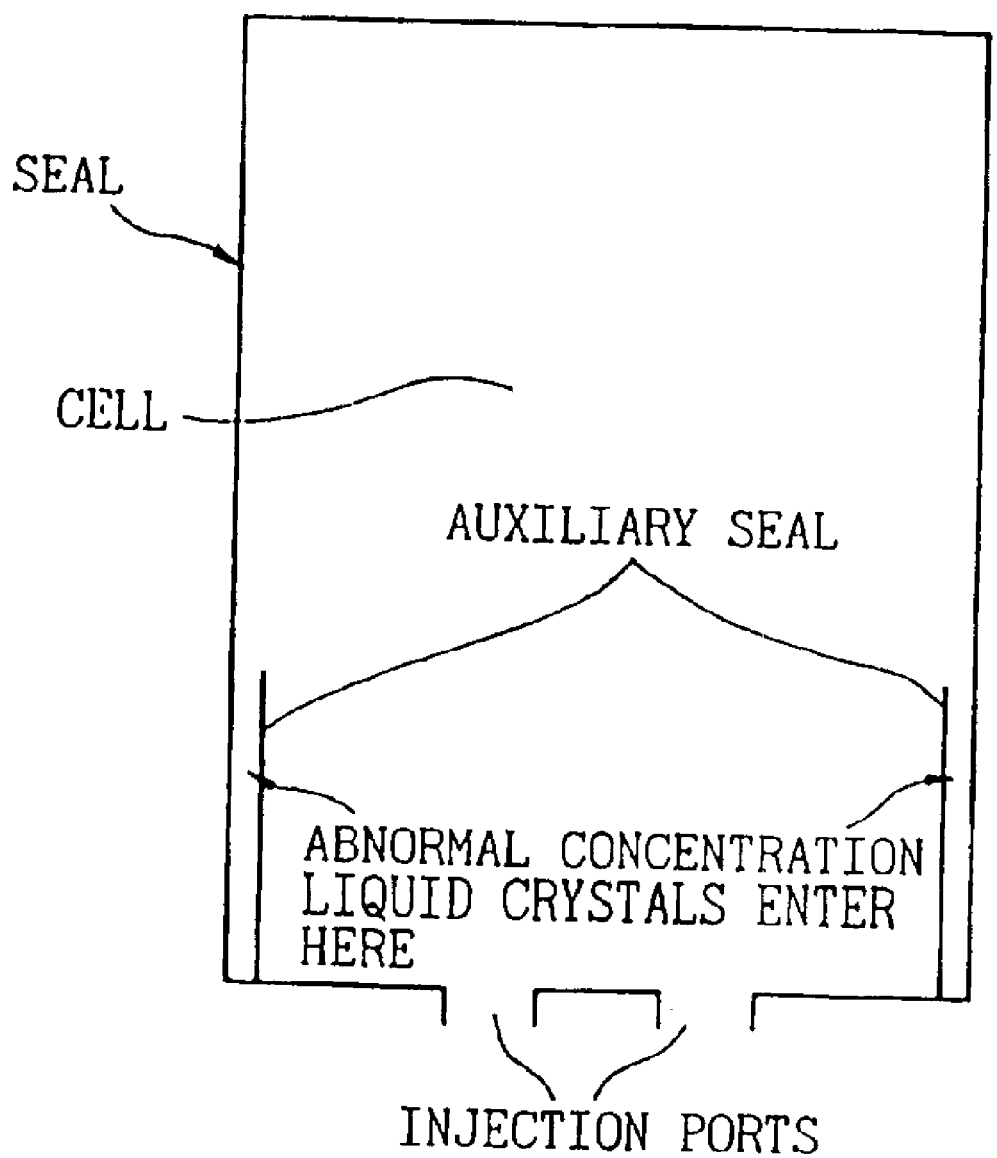
FIG. 37 is a schematic plan view showing a liquid crystal panel according to a 21st embodiment.

TFT devices, data bus lines, gate bus lines, and pixel electrodes were formed on one substrate. A color layer and a common electrode were formed on the other substrate. An empty cell was fabricated by laminating the two substrates together with 4-µm diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. As shown in FIG. 37, pockets were formed in the BM portion of the panel frame edge by using auxiliary seals, to allow liquid crystals of abnormal concentrations to enter these pockets.

A gate voltage of 30 VDC, a data voltage of 10 VDC, and a common voltage of 5 VDC were applied to the panel to cause the liquid crystal molecules in the panel to tilt, and in this condition, 300-nm to 450-nm ultraviolet radiation of 2000 mJ/cm$^2$ was applied from the common substrate side. The ultraviolet polymerizable monomer was thus polymerized. Next, polarizers were attached to complete the fabrication of the liquid crystal panel. It was confirmed that the thus fabricated liquid crystal panel achieved a high display quality free from display defects such as display unevenness in the corners.

Next, the fifth aspect of the invention will be described with reference to specific embodiments thereof.

Embodiment 22

Figure 38:
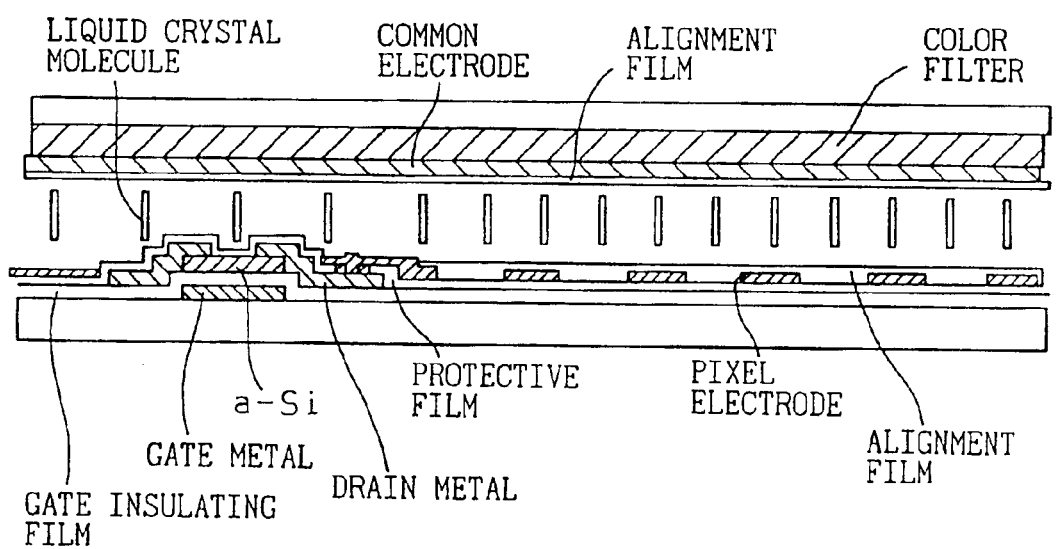
FIG. 38 is a schematic cross-sectional view showing a liquid crystal panel according to a 22nd embodiment.
Figure 39:
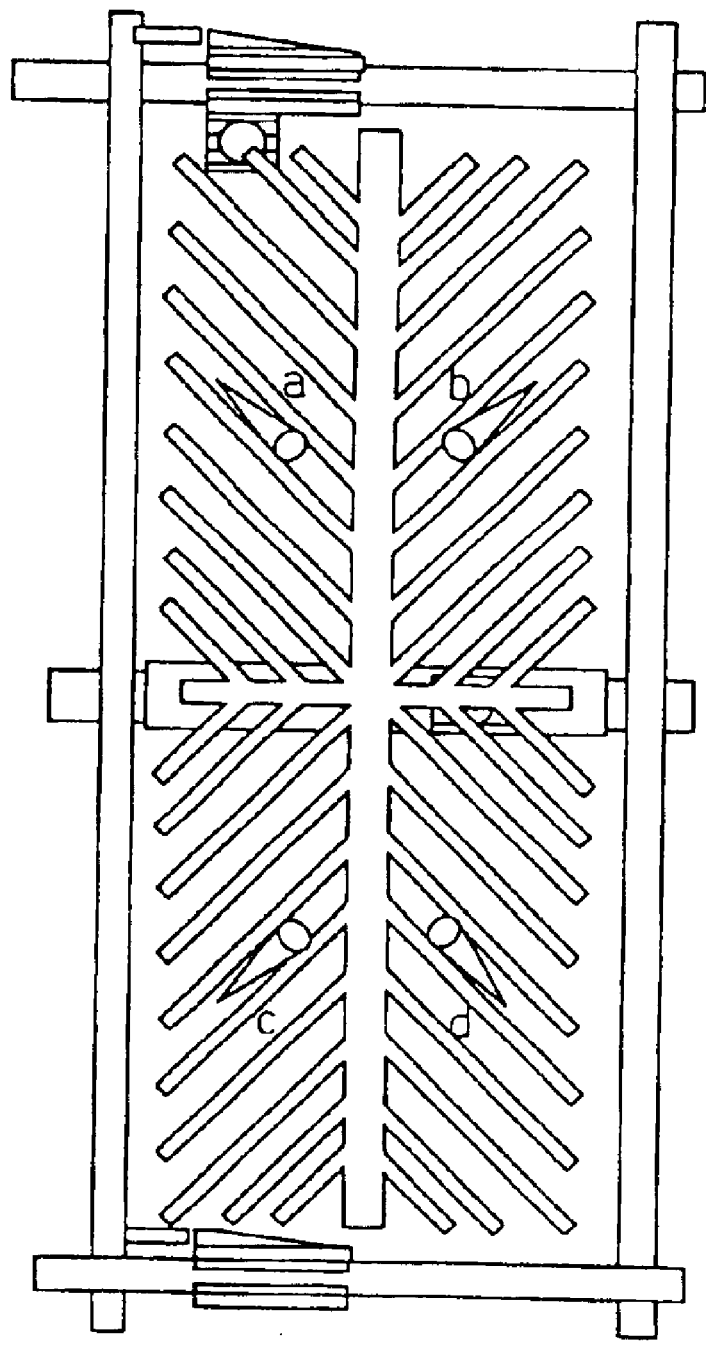
FIG. 39 is a schematic plan view of the liquid crystal panel according to the 22nd embodiment.
Figure 40:
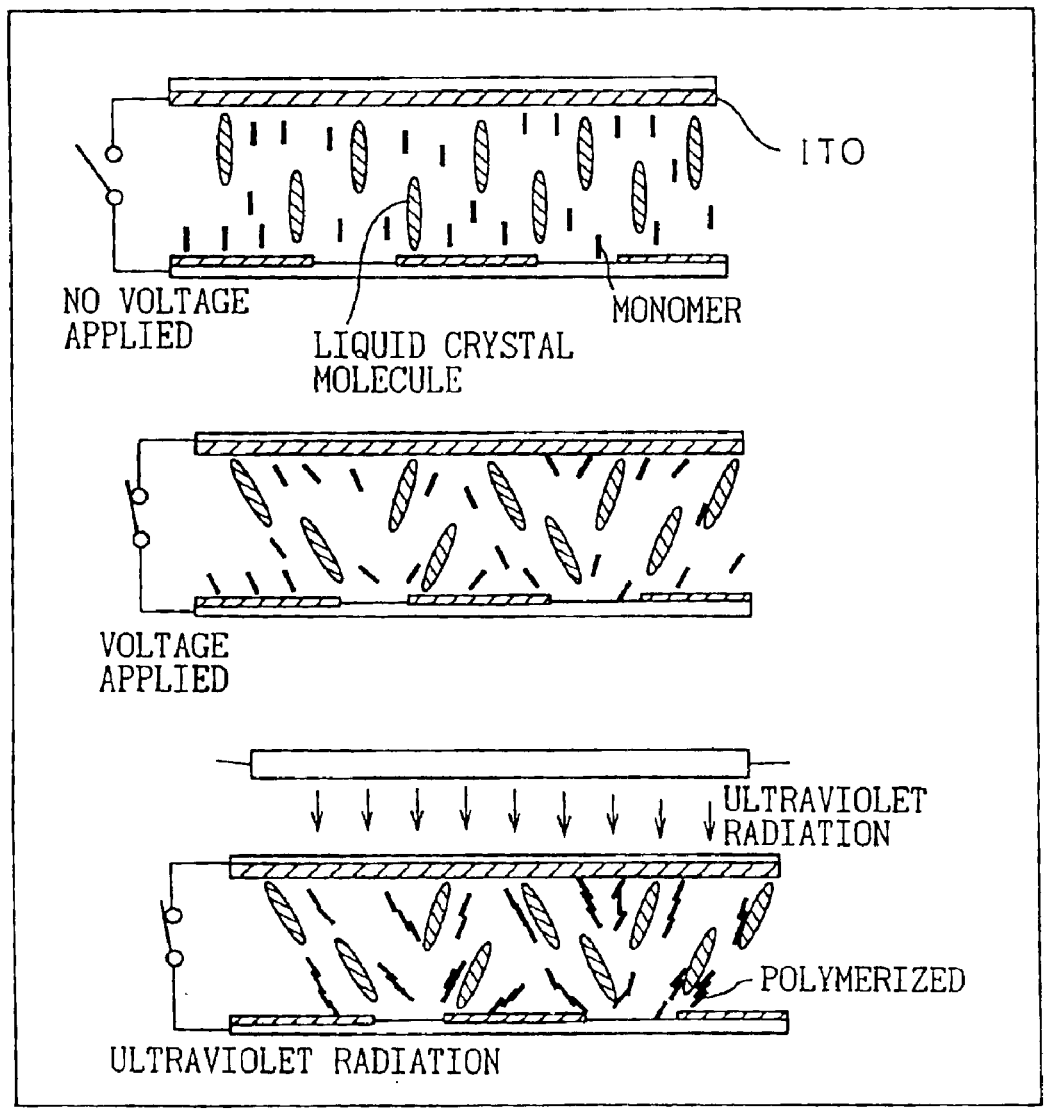
FIG. 40 is a schematic diagram for explaining how the alignments of liquid crystal molecules are controlled in the 22nd embodiment.

A cross-sectional view of the panel of this embodiment is shown in FIG. 38. The layer structure of the TFT substrate comprises, from the bottom to the top, a gate metal layer of Al—Nd/MoN/Mo, a gate insulating film of SiN, an a-Si layer, a drain metal layer of n+/Ti/Al/MoN/Mo, a protective film layer of SiN, and a pixel electrode layer of ITO. The structure of the CF substrate comprises a color filter layer of red, blue, and green and an ITO film layer that forms the common electrode. FIG. 39 shows a plan view of this panel. According to this pixel electrode pattern, when a voltage is applied, liquid crystal molecules tilt in four different directions a, b, c, and d, as shown in the figure. This achieves a wide viewing angle. The common electrode made of ITO is formed on one of the opposing substrates. A vertical alignment film was deposited on each of the two substrates, spacer beads were applied to one of the substrates, a panel periphery seal was formed on the other substrate, and the two substrates were laminated together. Liquid crystal was injected into the thus fabricated panel. A negative-type liquid crystal material having a negative dielectric anisotropy, with 0.2 weight percent of ultraviolet curable monomer added to it, was used as the liquid crystal. Ultraviolet radiation was applied to the panel, in the presence of an applied voltage, to control the alignment of the liquid crystal. FIG. 40 shows how the liquid crystal alignment is controlled by the polymer. In the initial state where no voltage is applied, the liquid crystal molecules are aligned vertically, and monomers exist as monomers. When a voltage is applied, the liquid crystal molecules tilt in the directions defined by the fine pattern of the pixel electrode, and the monomers tilt in like manner. When ultraviolet radiation is applied in this condition, the tilted monomers are polymerized, thus controlling the alignment of the liquid crystal molecules.

Figure 41:
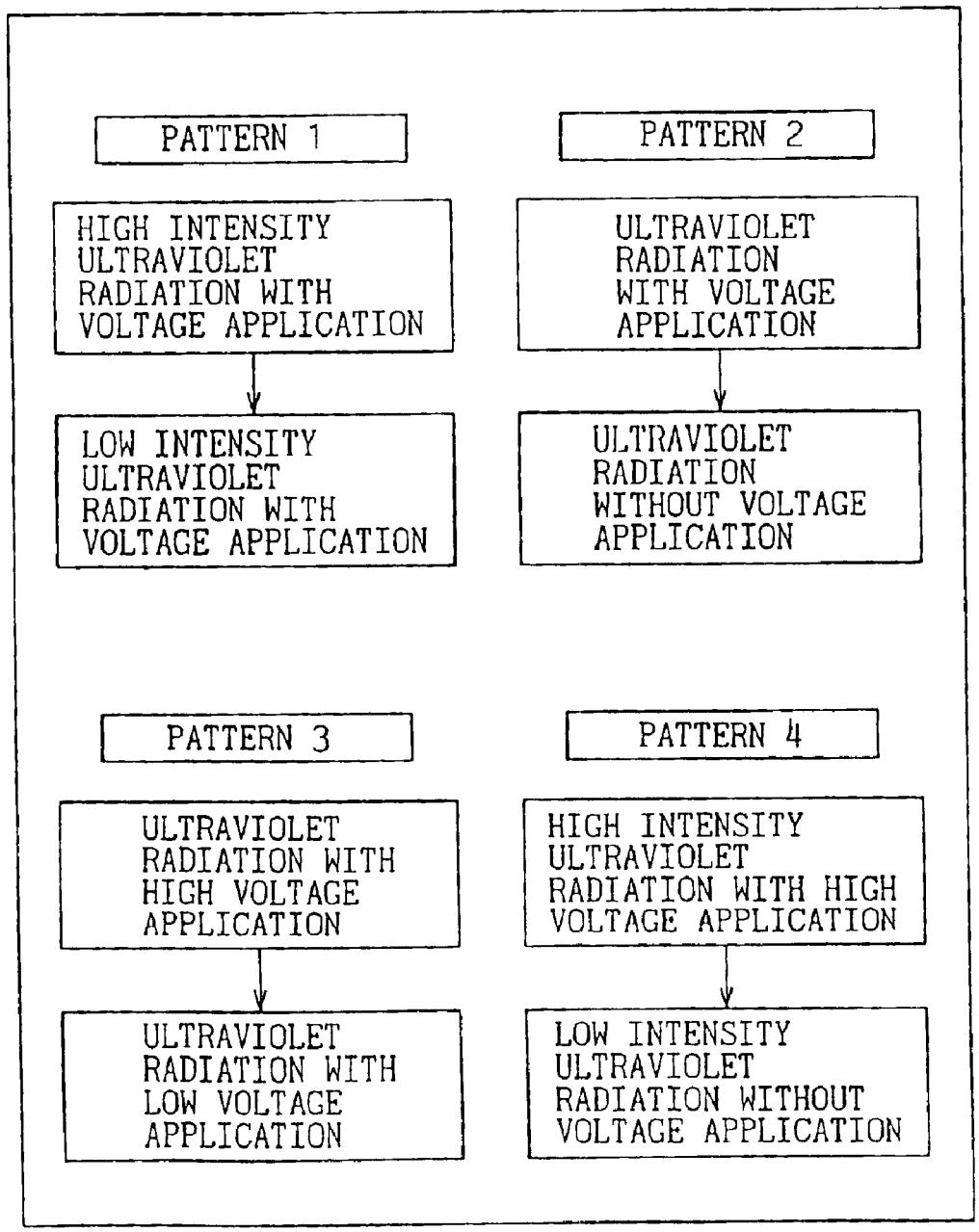
FIG. 41 is a process flow diagram of the 22nd embodiment.

Voltage application and ultraviolet radiation patterns such as shown in FIG. 41 can be employed here. In the figure, high intensity ultraviolet radiation refers to the radiation of 300-nm to 450-nm ultraviolet light with an intensity of 30 mW or higher, and low intensity ultraviolet radiation refers to the ultraviolet radiation with an intensity of 30 mW or lower. Further, a high voltage means a voltage applied to the liquid crystal layer that is equal to or greater than the threshold voltage of the liquid crystal, and low voltage means a voltage that is equal to or lower than the threshold voltage of the liquid crystal, or means no application of voltage.

The thus fabricated liquid crystal panel was a high quality panel having high brightness and wide viewing angle and free from image sticking.

Embodiment 23

Figure 42:
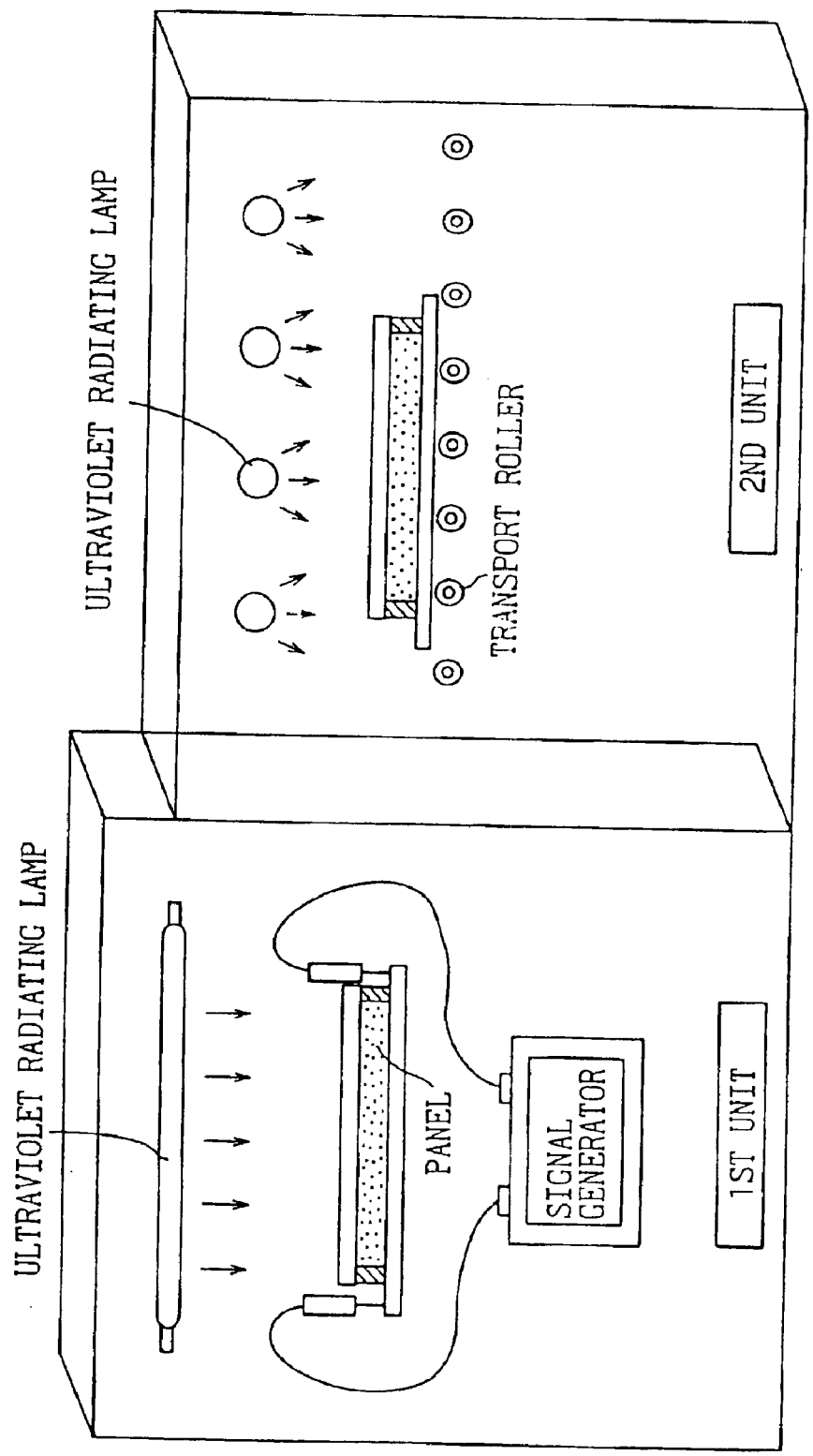
FIG. 42 is a schematic diagram showing equipment used in a 23rd embodiment.

To implement the panel fabrication method of the 22nd embodiment, manufacturing equipment comprising two ultraviolet radiation units connected together was used as shown in FIG. 42; here, the first unit can radiate ultraviolet light while applying a voltage, and the second unit has a structure that applies ultraviolet radiation to the panel while transporting the panel on transport rollers. With this equipment, a high throughput, space-saving fabrication of the panel can be achieved.

Embodiment 24

Figure 43:
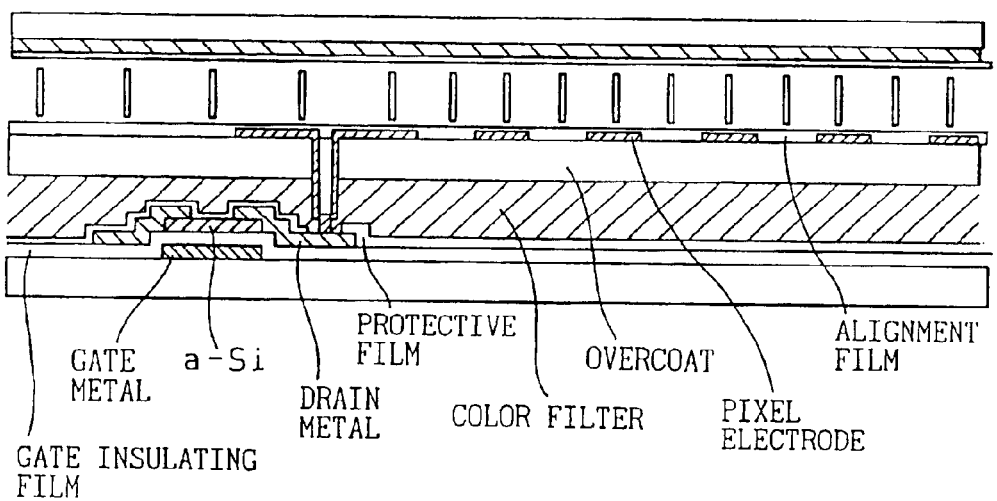
FIG. 43 is a schematic cross-sectional view showing a liquid crystal panel according to a 24th embodiment.
Figure 44:
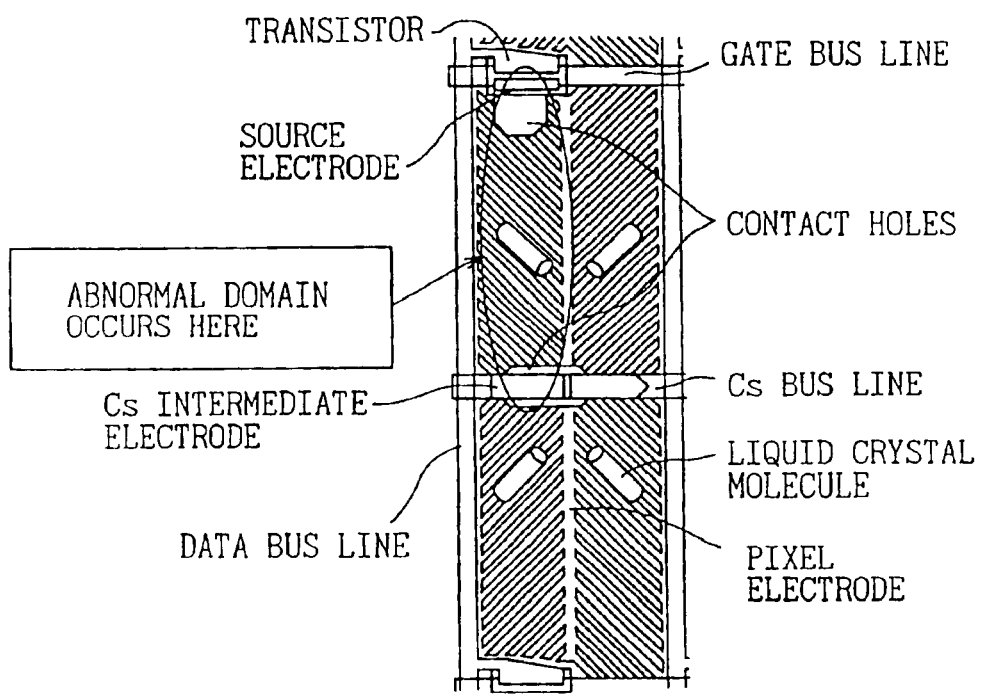
FIG. 44 is a plan view showing a pixel in a prior art liquid crystal display device.

A cross-sectional view of the panel of this embodiment is shown in FIG. 43. A color filter layer and an overcoat layer are formed over the TFT array, and high transmittance of light can be achieved with this structure.

Next, the sixth aspect of the invention will be described with reference to specific embodiments thereof.

Embodiment 25

Figure 45:
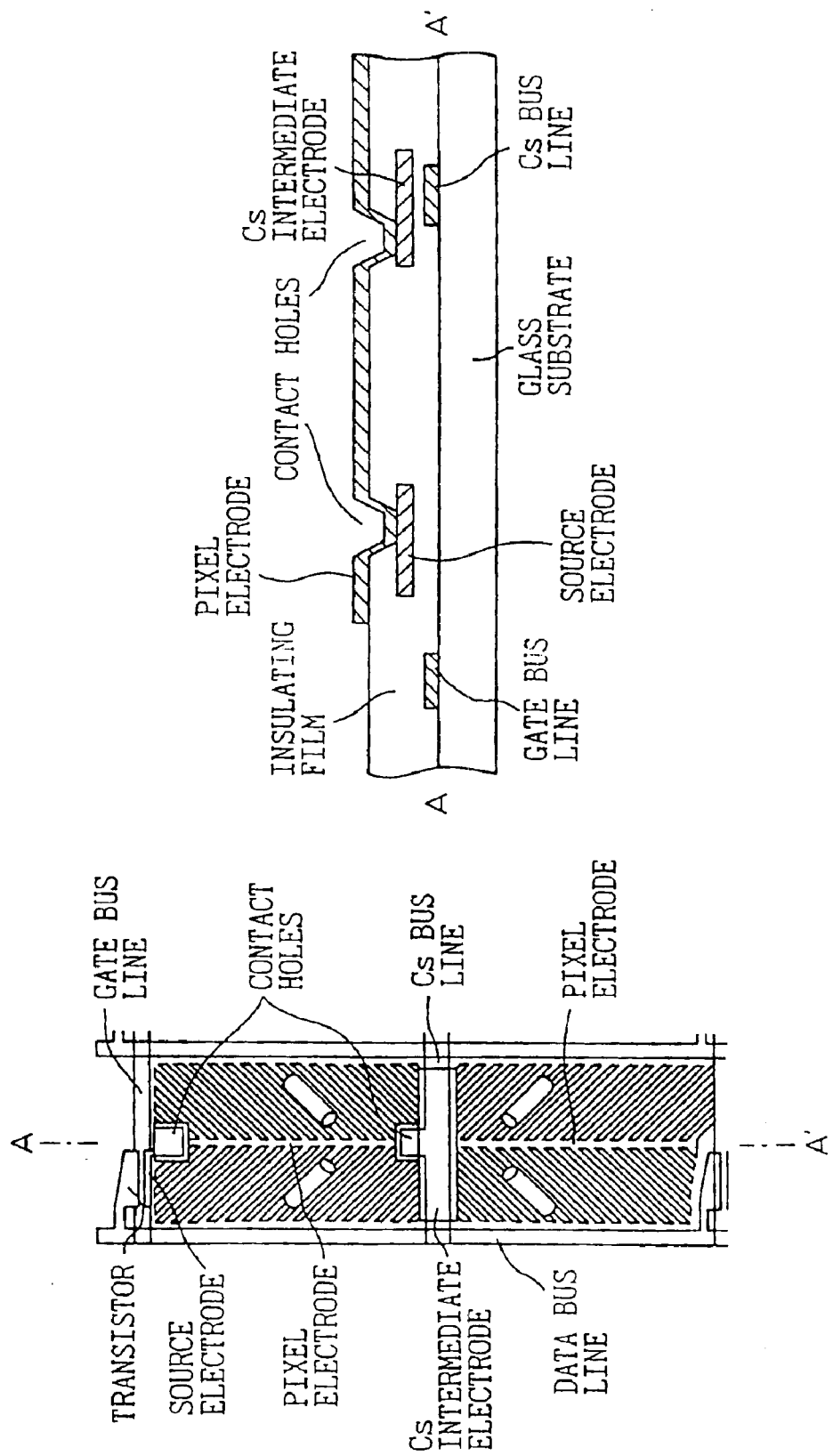
FIG. 45 is a diagram showing a plan view and a cross-sectional view of a pixel in a liquid crystal display device according to a 25th embodiment.

TFT devices, data bus lines, gate bus lines, and pixel electrodes were formed on one substrate. A color layer and a common electrode were formed on the other substrate. An empty cell was fabricated by laminating the two substrates together with 4-µm diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. FIG. 45 shows a plan view and a cross-sectional view of a pixel in the thus fabricated panel; as shown, the source electrode/pixel electrode contact hole and the Cs intermediate electrode/pixel electrode contact hole are both located at a liquid crystal domain boundary formed by pixel slits. This structure serves to prevent the formation of abnormal domains resulting from the contact holes, and the thus fabricated liquid crystal display device does not contain any abnormal domains and has a high display quality free from display unevenness and degradations in brightness and response speed characteristics.

Embodiment 26

Figure 46:
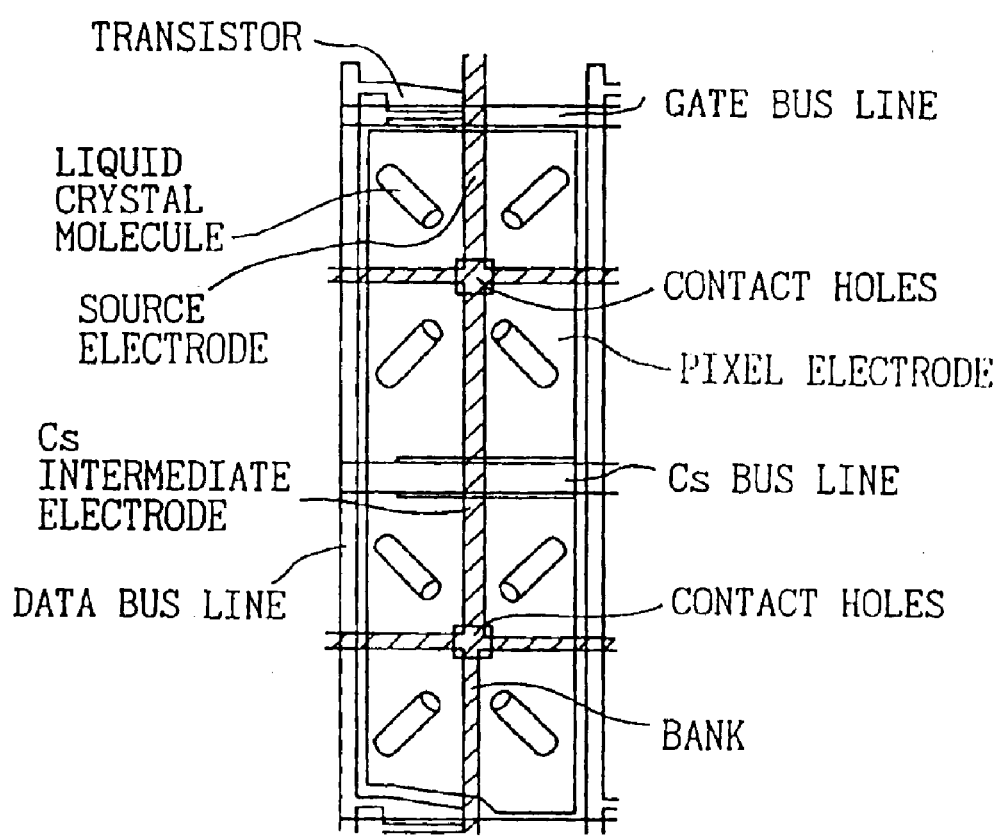
FIG. 46 is a diagram showing a plan view of a pixel in a liquid crystal display device according to a 26th embodiment.

TFT devices, data bus lines, gate bus lines, and pixel electrodes were formed on one substrate. A color layer, a common electrode, and alignment controlling banks were formed on the other substrate. An empty cell was fabricated by laminating the two substrates together with 4-µm diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. FIG. 46 shows a plan view of a pixel in the thus fabricated panel; as shown, the source electrode/pixel electrode contact hole and the Cs intermediate electrode/pixel electrode contact hole are both located at the crossing portions of the banks which correspond to the boundaries of the liquid crystal domains. The portions of the source electrode and the Cs intermediate electrode which are extended into the display area run along the liquid crystal domain boundaries deliberately formed by the pixel electrode slits, and these portions do not cause abnormal domains, nor do they lower the numerical aperture. The thus fabricated liquid crystal display device does not contain any abnormal domains and has a high display quality free from display unevenness and degradations in brightness and in response speed characteristics.

Embodiment 27

Figure 47:
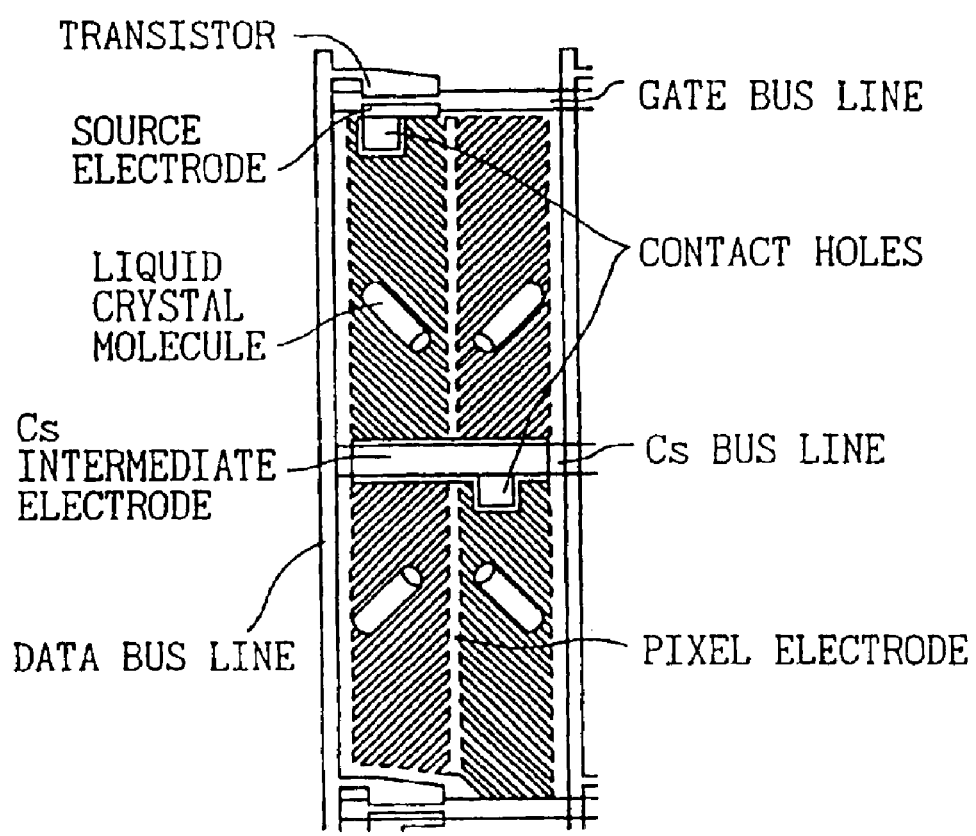
FIG. 47 is a diagram showing a plan view of a pixel in a liquid crystal display device according to a 27th embodiment.

A liquid crystal panel was fabricated in the same manner as in the 25th embodiment. FIG. 47 shows a plan view of a pixel; as shown, the source electrode/pixel electrode contact hole and the Cs intermediate electrode/pixel electrode contact hole are located in different alignment sub-regions, and if any of them becomes a starting point of an abnormal domain, it will not cause interactions that could lead to the formation of an abnormal domain over a wider area. The thus fabricated liquid crystal display device contains few abnormal domains and has a high display quality virtually free from display unevenness and degradations in brightness and in response speed characteristics.

Embodiment 28

Figure 48:
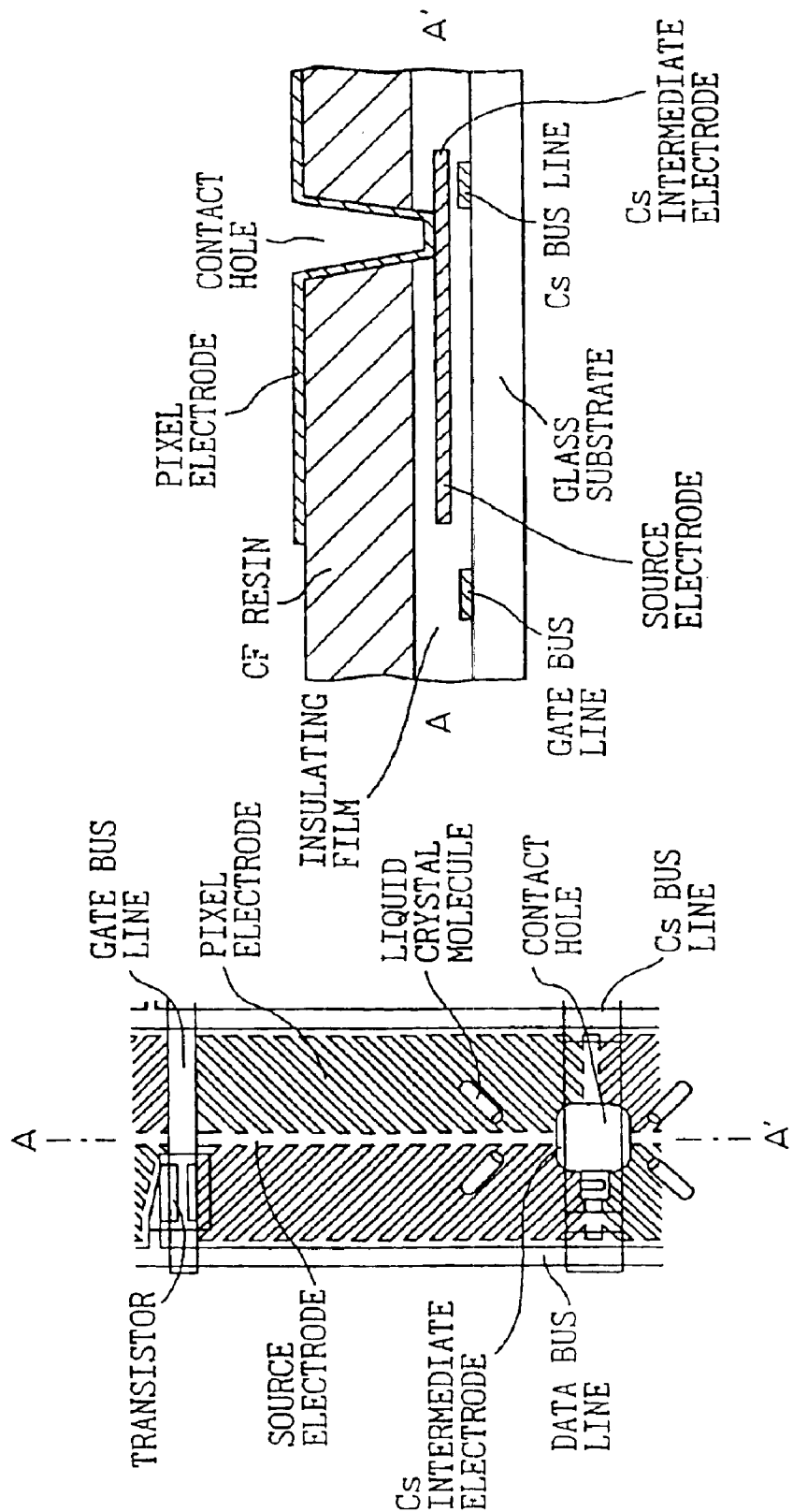
FIG. 48 is a diagram showing a plan view and a cross-sectional view of a pixel in a liquid crystal display device according to a 28th embodiment.

TFT devices, data bus lines, gate bus lines, a color layer, and pixel electrodes were formed on one substrate. A common electrode was formed on the other substrate. An empty cell was fabricated by laminating the two substrates together with 4-$\mu$m diameter spacers interposed therebetween. An acrylic photopolymerizable component exhibiting the nematic liquid crystalline state was mixed in an amount of 0.3 weight percent into a negative-type liquid crystal material, and the thus prepared liquid crystal composition containing the photopolymerizable component was injected into the cell to fabricate a liquid crystal panel. FIG. 48 shows a plan view and a cross-sectional view of a pixel in the thus fabricated panel; as shown, a contact hole where cell thickness varies, which could cause an abnormal domain, is located at a liquid crystal domain boundary. Further, the pixel electrode, the source electrode, and the Cs intermediate electrode are connected via one contact hole and, thus, the cause of abnormal domains is eliminated and the numerical aperture increased. The source electrode is wired along a liquid crystal domain boundary deliberately formed by pixel electrode slits and located outside the pixel slit area, and this therefore does not cause an abnormal domain, nor does it lower the numerical aperture. The thus fabricated liquid crystal display device does not contain any abnormal domains and has a high display quality free from display unevenness and degradations in brightness and response speed characteristics.

Next, the seventh aspect of the invention will be described with reference to specific embodiments thereof.

Embodiment 29

A panel comprising a TFT substrate and a color filter substrate, with a vertically aligned liquid crystal of negative $\Delta\epsilon$ sandwiched between the two substrates, was used. Liquid crystalline acrylate monomer UCL-001 manufactured by Dainippon Ink and Chemicals, Inc. was added in an amount of 0.25 weight percent into the liquid crystal layer. While driving the liquid crystal by applying a drive voltage having an effective value of 5.0 V to the liquid crystal layer, ultraviolet light having a maximum energy peak at wavelength 365 nm is projected for 300 seconds to the panel, thereby polymerizing and curing the monomer in a prescribed liquid crystal alignment state. A polyamic acid alignment film exhibiting vertical alignment was used here. The panel cell gap was set at 4.0 $\mu$m. The liquid crystal driving mode was normally black mode.

Figure 49:
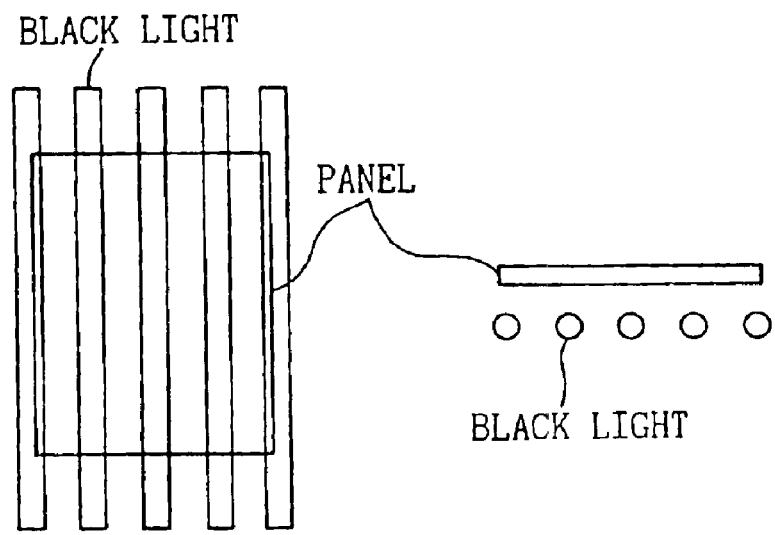
FIG. 49 is a schematic diagram showing a plan view and a side view illustrating a method of additional ultraviolet radiation according to a 29th embodiment.

Next, as shown in FIG. 49, additional ultraviolet radiation was applied to the panel. Commercially available black lamps (manufactured by Toshiba Lighting and Technology Corporation) were used as the light source for the additional radiation. The maximum energy peak wavelength was 352 nm, and five lamps were arranged, spaced 10 cm apart from each other, to form a surface-area light source, and light was radiated from a distance of 10 cm with an intensity of 5mW/cm$^2$. When the image sticking ratio of the panel was measured before and after the additional ultraviolet radiation, the image sticking ratio of the panel before the additional ultraviolet radiation was 12%, while the image sticking ratio of the panel after the radiation was reduced to 3%. When the tested panels were left idle for 24 hours, the former was never restored to the original condition, but in the latter, the image sticking was completely erased.

Figure 50:
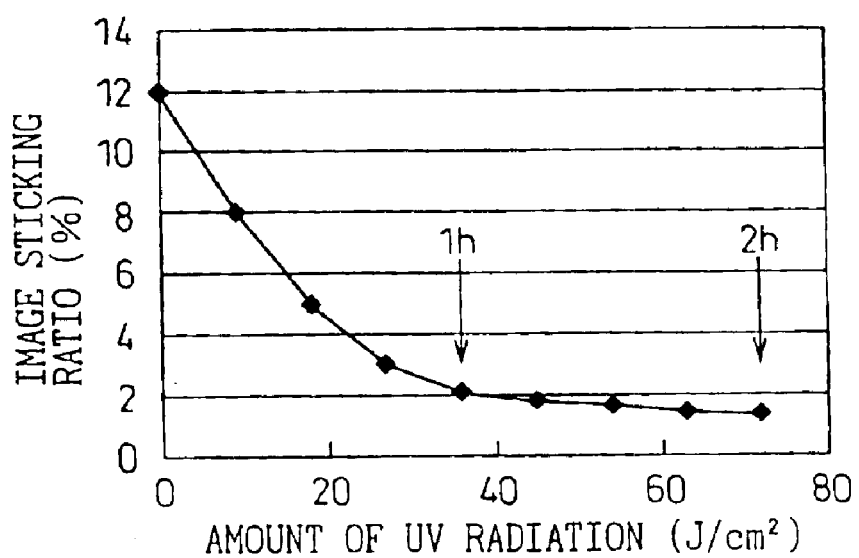
FIG. 50 is a graph showing the relationship between the amount of additional ultraviolet radiation and the image sticking ratio according to the 29th embodiment.

Further, the relationship between the amount of ultraviolet radiation and the image sticking ratio was obtained by varying the amount of additional ultraviolet radiation to be applied to the panel. The result is shown in FIG. 50. As can be seen, the image sticking ratio reduces as the amount of ultraviolet radiation increases.

Here, the image sticking ratio was obtained in the following manner. A black and white checkered pattern was displayed for 48 hours in the display area. After that, prescribed halftone dots (gray) were displayed over the entire display area, and the difference between the brightness $\beta$ of the area that was displayed in white and the brightness $\gamma$ of the area that was displayed in black ($\beta-\gamma$) was divided by the brightness $\gamma$ of the area that was displayed in black, to obtain the image sticking ratio.

Image sticking ratio $\alpha=((\beta-\gamma)/\gamma)\times100(\%)$

Embodiment 30

The process described in the 29th embodiment was repeated with the difference that commercially available UV-B fluorescent lamps (manufactured by Tozai Densan, Ltd.) ware used instead of the black lamps. The maximum energy peak frequency of this fluorescent lamp was 310 nm. In the panel subjected to the additional ultraviolet radiation of this embodiment, the image sticking ratio was reduced to 2.5%, and when the panel was left idle for 24 hours, the image sticking was completely erased.

The fabrication method for the liquid crystal display device according to the first aspect of the invention described above can be summarized as follows:

(Item 1)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween; and radiating light onto the liquid crystal layer while applying an AC voltage between the common electrode and the pixel electrode by applying AC voltages to the common electrode and the Cs bus line.

(Item 2)

A method of fabricating a liquid crystal display device as described in item 1, wherein the common electrode and the Cs bus line are insulated from each other or connected via high resistance when radiating the light onto the liquid crystal layer.

(Item 3)

A method of fabricating a liquid crystal display device as described in item 1, wherein after radiating the light onto the liquid crystal layer, the common electrode and the Cs bus line are electrically connected together.

(Item 4)

A method of fabricating a liquid crystal display device as described in item 1 wherein, initially, the liquid crystal layer is vertically aligned and, by radiating the light while applying a voltage to the liquid crystal composition containing the photosensitive material, the average angle of the liquid crystal to an alignment film is set smaller than a polar angle of 90°.

(Item 5)

A method of fabricating a liquid crystal display device as described in item 1, wherein AC frequency when applying the AC voltage is set within a range of 1 to 1000 Hz.

(Item 6)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance with the pixel electrode;

forming a liquid crystal layer by filling a liquid crystal composition, containing a photosensitive material, into a gap between the first substrate and the second substrate;

forming an electrical capacitance using the common electrode and the pixel electrode by sandwiching the liquid crystal layer therebetween;

insulating the common electrode from the three bus lines, or connecting the common electrode to the three bus lines via high resistance; and radiating light to the liquid crystal layer while applying a DC voltage between the common electrode and the pixel electrode by applying a DC voltage between the common electrode and the three bus lines (the gate bus line, the data bus line, and the Cs bus line) formed on the second substrate.

(Item 7)

A method of fabricating a liquid crystal display device as described in item 1, wherein adjacent gate bus lines or data bus lines are electrically connected together at both ends thereof.

(Item 8)

A method of fabricating a liquid crystal display device as described in item 7, wherein after radiating the light onto the liquid crystal layer, the common electrode and the Cs bus line are electrically connected together.

(Item 9)

A method of fabricating a liquid crystal display device as described in item 6 wherein, initially, the liquid crystal layer is vertically aligned and, by radiating the light while applying a voltage to the liquid crystal composition containing the photosensitive material, the average angle of the liquid crystal to an alignment film is set smaller than a polar angle of 90°.

(Item 10)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, a Cs bus line that forms an electrical capacitance to the pixel electrode, and a repair line intersecting with at least one of the data bus and gate bus lines;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween; and radiating light to the liquid crystal layer while applying a DC voltage between the common electrode and the pixel electrode by applying a DC voltage between the common electrode and the four bus lines (the gate bus line, the data bus line, the Cs bus line, and the repair line) formed on the second substrate.

(Item 11)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance with the pixel electrode;

forming a liquid crystal layer by filling a liquid crystal composition, containing a photosensitive material, into a gap between the first substrate and the second substrate;

forming an electrical capacitance using the common electrode and the pixel electrode by sandwiching the liquid crystal layer therebetween; and connecting the common electrode via high resistance to the three bus lines (the gate bus line, the data bus line, and the Cs bus line,) formed on the second substrate, and radiating light to the liquid crystal layer while applying a DC voltage between the common electrode and the pixel electrode by applying a DC voltage between the common electrode and at least one of the bus lines.

(Item 12)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, and a Cs bus line that forms an electrical capacitance to the pixel electrode;

forming a CF resin or a light blocking pattern on a channel portion of the thin-film transistor;

forming a liquid crystal layer by filling a liquid crystal composition, containing a photosensitive material, into a gap between the first substrate and the second substrate;

forming an electrical capacitance using the common electrode and the pixel electrode by sandwiching the liquid crystal layer therebetween;

electrically connecting adjacent data bus lines at both ends thereof; and radiating light onto the liquid crystal layer while applying an AC voltage between the common electrode and the pixel electrode by applying a transistor ON voltage to the gate bus line and an AC voltage between the common electrode and the data bus line.

(Item 13)

A method of fabricating a liquid crystal display device, comprising:

forming on a first substrate a common electrode for applying a voltage over an entire surface of the substrate;

forming on a second substrate a gate bus line and a data bus line arranged in a matrix array, a thin-film transistor located at an intersection of the two bus lines, a pixel electrode connecting to the thin-film transistor, a Cs bus line that forms an electrical capacitance to the pixel electrode, and a repair line intersecting with the data bus line;

forming a CF resin or a light blocking pattern on a channel portion of the thin-film transistor;

forming a liquid crystal layer by filling a liquid crystal composition, containing a photosensitive material, into a gap between the first substrate and the second substrate;

forming an electrical capacitance by the common electrode and the pixel electrode by sandwiching the liquid crystal layer therebetween;

connecting at least one data bus line with at least one repair line by laser radiation or other method; and radiating light onto the liquid crystal layer while applying an AC voltage between the common electrode and the pixel electrode by applying a transistor ON voltage to the gate bus line and an AC voltage between the common electrode and the data bus line and repair line (the repair line is at the same potential as the data bus line).

(Item 14)

A liquid crystal display device fabricated by a method described in any one of items 1 to 13.

The fabrication method for the liquid crystal display device according to the second aspect of the invention can be summarized as follows:

(Item 15)

A method of fabricating a vertical alignment liquid crystal display device, comprising:

forming a liquid crystal layer by filling a liquid crystal composition into a gap between two substrates each having a transparent electrode and an alignment control film for causing liquid crystal molecules to align vertically, the liquid crystal composition having a negative dielectric anisotropy and containing a polymerizable monomer; and polymerizing the monomer while applying a voltage between opposing transparent electrodes, and thereby providing a pretilt angle to the liquid crystal molecules, and wherein:

before polymerizing the monomer, a constant voltage not smaller than a threshold voltage but not greater than a saturation voltage is applied between the opposing transparent electrodes for a predetermined period of time and, thereafter, the voltage is changed to a prescribed voltage and, while maintaining the prescribed voltage, ultraviolet radiation or heat is applied to the liquid crystal composition to polymerize the monomer.

(Item 16)

A method of fabricating a liquid crystal display device as described in item 15, wherein after a constant voltage not smaller than the threshold voltage but not greater than the threshold voltage+1 V is applied between the opposing transparent electrodes for a time not shorter than 10 seconds, the voltage is changed by applying a voltage not smaller than a voltage to be applied to produce a white display state and, while maintaining the voltage, the ultraviolet radiation or heat is applied to the liquid crystal composition to polymerize the monomer.

(Item 17)

A method of fabricating a liquid crystal display device as described in item 15 or 16, further comprising the step of forming a slit structure in the transparent electrode on at least one of the substrates.

(Item 18)

A method of fabricating a liquid crystal display device as described in any one of items 15 to 17, further comprising the step of forming, on at least one of the substrates, a protrusion protruding into the gap between the substrates.

(Item 19)

A liquid crystal display device fabricated by a method described in any one of items 15 to 18.

The fabrication method for the liquid crystal display device according to the third aspect of the invention can be summarized as follows:

(Item 20)

A method of fabricating a liquid crystal display device, comprising:

forming a liquid crystal layer by filling a liquid crystal composition containing a polymerizable monomer into a gap between two substrates each having a transparent electrode; and polymerizing the monomer while applying a voltage between opposing transparent electrodes, and thereby providing a pretilt angle to liquid crystal molecules while, at the same time, controlling the direction in which the liquid crystal molecules tilt in the presence of an applied voltage, and wherein:

light radiation for polymerizing the polymerizable monomer is performed in at least two steps.

(Item 21)

A method of fabricating a liquid crystal display device as described in item 20, wherein at least one of the plurality of light radiation steps is performed while applying a voltage to the liquid crystal layer.

(Item 22)

A method of fabricating a liquid crystal display device as described in item 20 or 21, wherein the plurality of light radiation steps are performed without applying a voltage, either before or after or both before and after the light radiation that is performed in the presence of an applied voltage.

(Item 23)

A method of fabricating a liquid crystal display device as described in any one of items 20 to 22, wherein the plurality of light radiation steps are respectively performed with different light intensities.

(Item 24)

A method of fabricating a liquid crystal display device as described in any one of items 20 to 23, wherein the light radiation that is performed in the presence of an applied voltage is performed with a light intensity of 50 mW/cm$^2$ or higher.

(Item 25)

A method of fabricating a liquid crystal display device as described in any one of items 20 to 24, wherein the light radiation that is performed without applying a voltage is performed with a light intensity of 50 mW/cm$^2$ or lower.

(Item 26)

A method of fabricating a liquid crystal display device as described in any one of items 20 to 25, wherein the polymerizable monomer is a liquid crystalline or non-liquid-crystalline monomer, and is polymerized by ultraviolet radiation.

(Item 27)

A method of fabricating a liquid crystal display device as described in any one of items 20 to 26, wherein the polymerizable monomer is bifunctional acrylate or a mixture of bifunctional acrylate and monofunctional acrylate.

(Item 28)

A liquid crystal display device fabricated by a method described in any one of items 20 to 27.

The liquid crystal display device according to the fourth aspect of the invention can be summarized as follows:

(Item 29)

A liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein a plurality of injection ports for injecting therethrough the liquid crystal composition containing the polymerizable component are formed in one side of the liquid crystal display device, and spacing between the respective injection ports is not larger than one-fifth of the length of the side in which the injection ports are formed.

(Item 30)

A liquid crystal display device as described in item 29, wherein the injection ports are spaced away from a display edge by a distance not greater than two-fifths of the length of the side in which the injection ports are formed.

(Item 31)

A liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein a cell gap in a frame edge BM area is not larger than the cell gap of a display area.

(Item 32)

A liquid crystal display device as described in item 31, wherein the area where the cell gap is not larger than the cell gap of the display area is spaced away from a cell forming seal by a distance not greater than 0.5 mm.

(Item 33)

A liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein a main seal or an auxiliary seal is formed in a frame edge BM area to eliminate cell gap in the frame edge BM area.

(Item 34)

A liquid crystal display device in which a liquid crystal composition containing a photopolymerizable or thermally polymerizable component is sandwiched between substrates and the polymerizable component is polymerized while applying a voltage, thereby defining the direction in which liquid crystal molecules tilt in the presence of an applied voltage, wherein an auxiliary seal is formed so that a material whose concentration of the polymerizable material relative to liquid crystal is abnormal is guided into a BM area.

(Item 35)

A liquid crystal display device as described in any one of items 29 to 34, wherein the liquid crystal composition contains a non-liquid-crystal component or a component whose molecular weight and surface energy are different from those of a liquid-crystal component.

The fabrication method for the liquid crystal display device according to the fifth aspect of the invention can be summarized as follows:

(Item 36)

A method of fabricating a liquid crystal display device, comprising:

forming a common electrode and a color filter layer on a first substrate;

constructing a second substrate from an array substrate on which are formed a gate bus line layer, a gate insulating film layer, a drain bus line layer, a protective film layer, and a pixel electrode layer;

forming fine slits in the pixel electrode layer in such a direction that a pixel is divided by the slits into at least two sub-regions;

forming on each of the two substrates a vertical alignment film for vertically aligning liquid crystal molecules;

forming a liquid crystal layer by filling an n-type liquid crystal composition having a negative dielectric anisotropy into a gap between the two substrates, the liquid crystal composition containing an ultraviolet curable resin having a liquid crystal backbone;

radiating ultraviolet light while applying to the liquid crystal molecules a voltage not smaller than a threshold value of the liquid crystal molecules, thereby defining the direction in which the liquid crystal molecules tilt in the presence of an applied voltage; and arranging two polarizers on top and bottom surfaces of the liquid crystal display device in a crossed Nicol configuration with the absorption axes thereof oriented at an angle of 45 degrees to the alignment directions of the liquid crystal molecules.

(Item 37)

A method of fabricating a liquid crystal display device as described in item 36, wherein the step of radiating the ultraviolet light to the liquid crystal composition injected between the two substrates is divided in two or more steps and performed by using ultraviolet light of different intensities.

(Item 38)

A method of fabricating a liquid crystal display device as described in item 36, wherein the step of radiating the ultraviolet light to the liquid crystal composition injected between the two substrates is divided in two steps consisting of the step of radiating the ultraviolet light while applying to the liquid crystal molecules a voltage not smaller than the threshold value of the liquid crystal molecules and the step of radiating the ultraviolet light without applying a voltage to the liquid crystal molecules.

(Item 39)

A method of fabricating a liquid crystal display device as described in item 36, wherein the step of radiating the ultraviolet light to the liquid crystal composition injected between the two substrates is divided in two steps and performed by applying respectively different voltages to the liquid crystal molecules.

(Item 40)

A method of fabricating a liquid crystal display device as described in item 36, wherein the step of radiating the ultraviolet light for polymerizing the ultraviolet polymerizable component contained in the liquid crystal composition injected between the two substrates is divided in two or more steps and performed by using a plurality of ultraviolet radiation units of different light intensities.

(Item 41)

A method of fabricating a liquid crystal display device as described in item 36, wherein the ultraviolet radiation to the liquid crystal composition injected between the two substrates is applied from the array substrate side.

(Item 42)

A method of fabricating a liquid crystal display device as described in item 36, wherein the second substrate is constructed from an array substrate on which the color filter layer is formed, the common electrode being formed on the first substrate, and the ultraviolet radiation, onto the liquid crystal composition injected between the two substrates, is applied from the first substrate side.

(Item 43)

A liquid crystal display device fabricated by a method described in any one of items 36 to 42.

The liquid crystal display device according to the sixth aspect of the invention can be summarized as follows:

(Item 44)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein any portion where cell thickness varies by 10% or more due to design constraints is located at a liquid crystal domain boundary.

(Item 45)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a contact hole that connects between a source electrode and a pixel electrode is formed at a liquid crystal domain boundary.

(Item 46)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a contact hole that connects between a Cs intermediate electrode and a pixel electrode is formed at a liquid crystal domain boundary.

(Item 47)

A liquid crystal display device in which a liquid crystal layer is sandwiched between a pair of substrates having electrodes, a pretilt angle of liquid crystal molecules and a tilt direction thereof in the presence of an applied voltage are controlled by using a polymer that polymerizes by heat or light radiation, and liquid crystal alignment is divided between two or more sub-regions, wherein more than one portion where cell thickness varies by 10% or more due to design constraints does not exist.

(Item 48)

A liquid crystal display device in which a liquid crystal layer is sandwiched between a pair of substrates having electrodes, a pretilt angle of liquid crystal molecules and a tilt direction thereof in the presence of an applied voltage are controlled by using a polymer that polymerizes by heat or light radiation, and liquid crystal alignment is divided between two or more sub-regions, wherein more than one contact hole is not formed in the same sub-region.

(Item 49)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a pixel electrode, a source electrode, and a Cs intermediate electrode are connected by a single contact hole.

(Item 50)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein a metal electrode is added along a liquid crystal domain boundary within a display pixel.

(Item 51)

A liquid crystal display device in which a liquid crystal layer is sandwiched between a pair of substrates having electrodes, and a pretilt angle of liquid crystal molecules and a tilt direction thereof in the presence of an applied voltage are controlled by using a polymer that polymerizes by heat or light radiation, wherein an electrode having the same potential as a pixel electrode is not added in a slit portion of the pixel electrode within a display pixel.

(Item 52)

A liquid crystal display device as described in any one of items 44 to 51, wherein the liquid crystal layer is sandwiched between a substrate in which a color filter layer of red, blue, and green is formed on a TFT substrate, and a substrate on which a common electrode is formed.

The fabrication method for the liquid crystal display device according to the fifth aspect of the invention can be summarized as follows:

The fabrication method for the liquid crystal display device according to the seventh aspect of the invention can be summarized as follows:

(Item 53)

A method of fabricating a liquid crystal display device, comprising: forming a liquid crystal layer by filling a liquid crystal composition containing a polymerizable monomer into a gap between two substrates each having an electrode and an alignment film; and polymerizing the monomer by radiating ultraviolet light to the liquid crystal composition while applying a prescribed liquid crystal driving voltage between opposing electrodes, and wherein: after polymerizing the monomer, additional ultraviolet radiation is applied to the liquid crystal composition without applying the liquid crystal driving voltage or while applying a voltage of a magnitude that does not substantially drive the liquid crystal.

(Item 54)

A method of fabricating a liquid crystal display device as described in item 53, wherein the additional ultraviolet radiation is applied using ultraviolet light whose wavelength is different from that of the ultraviolet light used for the polymerization of the monomer before the application of the additional ultraviolet radiation.

(Item 55)

A method of fabricating a liquid crystal display device as described in item 53 or 54, wherein the ultraviolet light used in the additional ultraviolet radiation has a spectrum having a maximum energy peak at 310 to 380 nm.

(Item 56)

A method of fabricating a liquid crystal display device as described in item 55, wherein the ultraviolet light used in the additional ultraviolet radiation has a spectrum having a maximum energy peak at 350 to 380 nm.

(Item 57)

A method of fabricating a liquid crystal display device as described in item 55, wherein the ultraviolet light used in the additional ultraviolet radiation has a spectrum having a maximum energy peak at 310 to 340 nm.

(Item 58)

A method of fabricating a liquid crystal display device as described in any one of items 53 to 57, wherein the additional ultraviolet radiation is applied for 10 minutes or longer.

(Item 59)

A method of fabricating a liquid crystal display device as described in any one of items 53 to 58, wherein substrate surfaces are treated for vertical alignment in accordance with a vertical alignment mode, and liquid crystals in a non-display area also are substantially vertically aligned.

What we claim is:

1. A method of fabricating a liquid crystal display device, comprising:

forming a common electrode and a color filter layer on a first substrate;

constructing a second substrate from an array substrate on which are formed a gate bus line layer, a gate insulating film layer, a drain bus line layer, a protective film layer, and a pixel electrode layer;

forming fine slits in the pixel electrode layer in such a direction that a pixel is divided by the slits into at least two sub-regions;

forming on each of the two substrates a vertical alignment film for vertically aligning liquid crystal molecules;

forming a liquid crystal layer by filling an n-type liquid crystal composition having a negative dielectric anisotropy into a gap between the two substrates, the liquid crystal composition containing an ultraviolet curable resin having a liquid crystal backbone;

radiating ultraviolet light while applying to the liquid crystal molecules a voltage not smaller than a threshold value of the liquid crystal molecules, thereby defining the direction in which the liquid crystal molecules tilt in the presence of an applied voltage; and arranging two polarizers on top and bottom surfaces of the liquid crystal display device in a crossed Nicol configuration with the absorption axes thereof oriented at an angle of 45 degrees to the alignment directions of the liquid crystal molecules.

* * * * *